(12) United States Patent
Kerbauy et al.

(10) Patent No.: US 12,473,336 B2
(45) Date of Patent: Nov. 18, 2025

(54) METHODS FOR ACTIVATION AND EXPANSION OF NATURAL KILLER CELLS AND USES THEREOF

(71) Applicant: Board of Regents, The University of Texas System, Austin, TX (US)

(72) Inventors: Lucila Nassif Kerbauy, Houston, TX (US); Elizabeth Shpall, Houston, TX (US); Katy Rezvani, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1080 days.

(21) Appl. No.: 16/970,937

(22) PCT Filed: Feb. 21, 2019

(86) PCT No.: PCT/US2019/019019
§ 371 (c)(1),
(2) Date: Aug. 18, 2020

(87) PCT Pub. No.: WO2019/165121
PCT Pub. Date: Aug. 29, 2019

(65) Prior Publication Data
US 2020/0390816 A1    Dec. 17, 2020

Related U.S. Application Data

(60) Provisional application No. 62/633,592, filed on Feb. 21, 2018.

(51) Int. Cl.
*C07K 14/54* (2006.01)
*A61K 40/15* (2025.01)
(Continued)

(52) U.S. Cl.
CPC .......... *C07K 14/5434* (2013.01); *A61K 40/15* (2025.01); *A61K 40/31* (2025.01);
(Continued)

(58) Field of Classification Search
CPC .................................................. C07K 14/5434
See application file for complete search history.

(56) References Cited

U.S. PATENT DOCUMENTS 4,536,468 A    8/1985    Yasui et al.
4,981,784 A    1/1991    Evans et al.
(Continued)

FOREIGN PATENT DOCUMENTS

CA    2519535    2/2007
CA    2994751    2/2017
(Continued)

OTHER PUBLICATIONS

Denman et al. (Membrane-bound IL-21 promotes sustained ex vivo proliferation of human natural killer cells. PLoS One. 2012;7(1):e30264. doi: 10.1371/journal.pone.0030264, published 2012.*
(Continued)

*Primary Examiner* — Mark L Shibuya
(74) *Attorney, Agent, or Firm* — Norton Rose Fulbright US LLP

(57) ABSTRACT

Provided herein are methods for pre-activating and expanding an isolated population of NK cells. Further provided herein are methods for the treatment of cancer by administering the pre-activated and expanded NK cells.

16 Claims, 27 Drawing Sheets

(51) Int. Cl.
*A61K 40/31* (2025.01)
*A61K 40/35* (2025.01)
*A61K 40/42* (2025.01)
*C07K 14/55* (2006.01)
*C07K 14/705* (2006.01)
*C12N 5/0783* (2010.01)

(52) U.S. Cl.
CPC .......... *A61K 40/35* (2025.01); *A61K 40/4211* (2025.01); *A61K 40/4217* (2025.01); *C07K 14/5443* (2013.01); *C07K 14/55* (2013.01); *C07K 14/70592* (2013.01); *C07K 14/70596* (2013.01); *C12N 5/0646* (2013.01)

(56) References Cited

U.S. PATENT DOCUMENTS

| | | |
|---|---|---|
| 5,164,897 A | 11/1992 | Clark et al. |
| 5,171,671 A | 12/1992 | Evans et al. |
| 5,342,929 A | 8/1994 | Ernst et al. |
| 5,552,303 A | 9/1996 | Grabstein et al. |
| 5,571,696 A | 11/1996 | Evans et al. |
| 5,602,009 A | 2/1997 | Evans et al. |
| 5,686,281 A | 11/1997 | Roberts |
| 5,696,233 A | 12/1997 | Evans et al. |
| 5,707,798 A | 1/1998 | Brann |
| 5,723,329 A | 3/1998 | Mangelsdorf et al. |
| 5,747,292 A | 5/1998 | Greenberg et al. |
| 5,789,187 A | 8/1998 | Ross et al. |
| 5,843,728 A | 12/1998 | Seed et al. |
| 5,851,828 A | 12/1998 | Seed et al. |
| 5,906,936 A | 5/1999 | Eshhar et al. |
| 5,912,132 A | 6/1999 | Brann |
| 5,912,170 A | 6/1999 | Seed et al. |
| 5,912,172 A | 6/1999 | Eshhar et al. |
| 5,981,195 A | 11/1999 | Fuller et al. |
| 6,001,973 A | 12/1999 | Strom et al. |
| 6,004,811 A | 12/1999 | Seed et al. |
| 6,077,675 A | 6/2000 | Stormann et al. |
| 6,083,751 A | 7/2000 | Feldhaus et al. |
| 6,090,914 A | 7/2000 | Linsley et al. |
| 6,103,521 A | 8/2000 | Capon et al. |
| 6,120,669 A | 9/2000 | Bradley |
| 6,284,240 B1 | 9/2001 | Seed et al. |
| 6,361,714 B1 | 3/2002 | Iwabuchi et al. |
| 6,376,198 B1 | 4/2002 | Kopin et al. |
| 6,392,013 B1 | 5/2002 | Seed et al. |
| 6,410,014 B1 | 6/2002 | Seed et al. |
| 6,410,319 B1 | 6/2002 | Raubitschek et al. |
| 6,416,957 B1 | 7/2002 | Evans et al. |
| 6,451,308 B1 | 9/2002 | Strom et al. |
| 6,500,672 B1 | 12/2002 | Sladek et al. |
| 6,509,016 B1 | 1/2003 | Chatterjee et al. |
| 6,534,289 B1 | 3/2003 | Fuller et al. |
| 6,607,879 B1 | 8/2003 | Cocks et al. |
| 6,706,867 B1 | 3/2004 | Lorenz |
| 6,747,665 B1 | 6/2004 | Stoval, III et al. |
| 6,797,263 B2 | 9/2004 | Strom et al. |
| 6,824,974 B2 | 11/2004 | Pisharody et al. |
| 6,937,446 B2 | 8/2005 | Kamiguchi et al. |
| 6,958,236 B2 | 10/2005 | Pascal et al. |
| 6,998,476 B2 | 2/2006 | Strom et al. |
| 7,001,733 B1 | 2/2006 | Ferrick et al. |
| 7,041,467 B2 | 5/2006 | Ferrick et al. |
| 7,049,136 B2 | 5/2006 | Seed et al. |
| 7,052,906 B1 | 5/2006 | Lawson et al. |
| 7,070,995 B2 | 7/2006 | Jensen |
| 7,089,052 B2 | 8/2006 | Kodama et al. |
| 7,094,599 B2 | 8/2006 | Seed et al. |
| 7,105,644 B2 | 9/2006 | Rosen et al. |
| 7,118,751 B1 | 10/2006 | Ledbetter et al. |
| 7,135,603 B2 | 11/2006 | Messenger |
| 7,196,164 B2 | 3/2007 | Rosen et al. |
| 7,196,877 B2 | 3/2007 | Yoshikawa et al. |
| 7,235,190 B1 | 6/2007 | Wilcoxon et al. |
| 7,258,853 B2 | 8/2007 | Strom et al. |
| 7,294,468 B2 | 11/2007 | Bell et al. |
| 7,319,140 B2 | 1/2008 | Bakker et al. |
| 7,320,787 B2 | 1/2008 | Seed et al. |
| 7,332,574 B2 | 2/2008 | Bakker et al. |
| 7,341,944 B2 | 3/2008 | Harutyunyan |
| 7,347,995 B2 | 3/2008 | Strom et al. |
| 7,354,762 B2 | 4/2008 | Jensen |
| 7,379,278 B2 | 5/2008 | Koui et al. |
| 7,446,179 B2 | 11/2008 | Jensen et al. |
| 7,446,190 B2 | 11/2008 | Sadelain et al. |
| 7,468,248 B2 | 12/2008 | DeNise et al. |
| 7,485,600 B2 | 2/2009 | Harutyunyan et al. |
| 7,514,537 B2 | 4/2009 | Jensen |
| 7,569,664 B2 | 8/2009 | Jakobsen et al. |
| 7,569,670 B2 | 8/2009 | Novak et al. |
| 7,572,772 B2 | 8/2009 | Linsley et al. |
| 7,579,439 B2 | 8/2009 | Strom et al. |
| 7,628,986 B2 | 12/2009 | Weber et al. |
| 7,629,171 B2 | 12/2009 | Meagher et al. |
| 7,659,093 B2 | 2/2010 | Bakker et al. |
| 7,700,728 B2 | 4/2010 | Bates et al. |
| 7,723,111 B2 | 5/2010 | Hwu et al. |
| 7,732,133 B2 | 6/2010 | Yabuta et al. |
| 7,732,149 B2 | 6/2010 | Kojima et al. |
| 7,736,644 B2 | 6/2010 | Weber et al. |
| 7,741,465 B1 | 6/2010 | Eshhar et al. |
| 7,834,152 B2 | 11/2010 | Strom et al. |
| 7,919,086 B2 | 4/2011 | Nakano et al. |
| 7,948,154 B2 | 5/2011 | Ifuku et al. |
| 7,964,349 B2 | 6/2011 | Bell et al. |
| 7,968,687 B2 | 6/2011 | McDonagh et al. |
| 7,972,438 B2 | 7/2011 | Fei et al. |
| 7,998,736 B2 | 8/2011 | Morgan et al. |
| 8,008,029 B2 | 8/2011 | Lefevre |
| 8,026,097 B2 | 9/2011 | Campana et al. |
| 8,088,589 B2 | 1/2012 | Muraca |
| 8,105,769 B2 | 1/2012 | Bell et al. |
| 8,120,239 B2 | 2/2012 | Cheon et al. |
| 8,124,084 B2 | 2/2012 | Lefrancois et al. |
| 8,124,361 B2 | 2/2012 | Slack et al. |
| 8,129,125 B2 | 3/2012 | Muraca |
| 8,158,360 B2 | 4/2012 | Heise et al. |
| 8,178,660 B2 | 5/2012 | Weiner et al. |
| 8,263,375 B2 | 9/2012 | Abassi et al. |
| 8,329,421 B2 | 12/2012 | Powell et al. |
| 8,350,108 B2 | 1/2013 | Cortright et al. |
| 8,367,882 B2 | 2/2013 | Cortright et al. |
| 8,399,645 B2 | 3/2013 | Campana et al. |
| 8,435,762 B2 | 5/2013 | Sternson et al. |
| 8,450,112 B2 | 5/2013 | Li et al. |
| 8,465,743 B2 | 6/2013 | Rosenberg et al. |
| 8,465,916 B2 | 6/2013 | Bell et al. |
| 8,535,672 B2 | 9/2013 | Kaempfer et al. |
| 8,591,858 B2 | 11/2013 | Harutyunyan et al. |
| 8,592,567 B2 | 11/2013 | Weiner et al. |
| 8,679,492 B2 | 3/2014 | Blein et al. |
| 8,710,186 B2 | 4/2014 | Li et al. |
| 8,771,664 B2 | 7/2014 | Berraondo Lopez et al. |
| 8,796,421 B2 | 8/2014 | Li et al. |
| 8,802,374 B2 | 8/2014 | Jensen |
| 8,822,196 B2 | 9/2014 | Rosenberg et al. |
| 8,822,647 B2 | 9/2014 | Jensen |
| 8,859,275 B2 | 10/2014 | Notka et al. |
| 8,871,114 B2 | 10/2014 | Miyagawa et al. |
| 8,871,191 B2 | 10/2014 | Pavlakis et al. |
| 8,877,199 B2 | 11/2014 | Rader et al. |
| 8,883,992 B2 | 11/2014 | Damschroder et al. |
| 8,900,816 B2 | 12/2014 | Schmittling et al. |
| 8,900,820 B2 | 12/2014 | Muraca |
| 8,906,682 B2 | 12/2014 | June et al. |
| 8,911,993 B2 | 12/2014 | June et al. |
| 8,912,385 B2 | 12/2014 | Meagher |
| 8,916,381 B1 | 12/2014 | June et al. |
| 8,940,288 B2 | 1/2015 | Lefrancois et al. |
| 8,975,071 B1 | 3/2015 | June et al. |
| 9,035,036 B2 | 5/2015 | Bell et al. |
| 9,040,669 B2 | 5/2015 | Cheung et al. |
| 9,062,287 B2 | 6/2015 | Ideno et al. |

(56) References Cited

U.S. PATENT DOCUMENTS

| | | |
|---|---|---|
| 9,101,584 B2 | 8/2015 | June et al. |
| 9,102,760 B2 | 8/2015 | June et al. |
| 9,102,761 B2 | 8/2015 | June et al. |
| 9,115,171 B2 | 8/2015 | Ong et al. |
| 9,156,915 B2 | 10/2015 | Waldman et al. |
| 9,163,258 B2 | 10/2015 | Riddell et al. |
| 9,169,328 B2 | 10/2015 | Spriggs et al. |
| 9,175,308 B2 | 11/2015 | Shiku et al. |
| 9,181,527 B2 | 11/2015 | Sentman |
| 9,187,732 B2 | 11/2015 | Wolschek et al. |
| 9,212,104 B2 | 12/2015 | Qiao et al. |
| 9,212,229 B2 | 12/2015 | Schonfeld et al. |
| 9,220,728 B2 | 12/2015 | Sadelain et al. |
| 9,233,125 B2 | 1/2016 | Davila et al. |
| 9,260,696 B2 | 2/2016 | Kaufman et al. |
| 9,266,960 B2 | 2/2016 | Morgan et al. |
| 9,272,002 B2 | 3/2016 | Powell, Jr. et al. |
| 9,273,283 B2 | 3/2016 | Sentman |
| 9,315,585 B2 | 4/2016 | Cheung et al. |
| 9,328,156 B2 | 5/2016 | June et al. |
| 9,359,447 B2 | 6/2016 | Feldman et al. |
| 9,365,630 B2 | 6/2016 | Lefrancois et al. |
| 9,365,641 B2 | 6/2016 | June et al. |
| 9,371,368 B2 | 6/2016 | Lefrancois et al. |
| 9,393,268 B2 | 7/2016 | Waldman et al. |
| 9,394,368 B2 | 7/2016 | Brogdon et al. |
| 9,402,865 B2 | 8/2016 | Powell et al. |
| 9,422,351 B2 | 8/2016 | Scholler et al. |
| 9,422,360 B2 | 8/2016 | Suo et al. |
| 9,446,105 B2 | 9/2016 | Powell, Jr. |
| 9,447,194 B2 | 9/2016 | Jensen |
| 9,453,075 B2 | 9/2016 | Cheung et al. |
| 9,464,140 B2 | 10/2016 | June et al. |
| 9,476,028 B2 | 10/2016 | Karlsson-Parra et al. |
| 9,481,728 B2 | 11/2016 | June et al. |
| 9,487,800 B2 | 11/2016 | Schonfeld et al. |
| 9,492,499 B2 | 11/2016 | Jaynes et al. |
| 9,493,740 B2 | 11/2016 | Brenner et al. |
| 9,499,629 B2 | 11/2016 | June et al. |
| 9,499,823 B2 | 11/2016 | De Lorenzo et al. |
| 9,511,092 B2 | 12/2016 | Campana et al. |
| 9,518,119 B2 | 12/2016 | Bergstein |
| 9,518,123 B2 | 12/2016 | June et al. |
| 9,518,132 B2 | 12/2016 | Li et al. |
| 9,522,955 B2 | 12/2016 | Rosenberg et al. |
| 9,540,445 B2 | 1/2017 | June et al. |
| 9,555,105 B2 * | 1/2017 | Riley .............. A61K 47/642 |
| 9,562,087 B2 | 2/2017 | Ring et al. |
| 9,572,836 B2 | 2/2017 | June et al. |
| 9,572,837 B2 | 2/2017 | Wu |
| 9,573,988 B2 | 2/2017 | Brogdon et al. |
| 9,580,685 B2 | 2/2017 | Jensen |
| 9,587,020 B2 | 3/2017 | Wu et al. |
| 9,597,357 B2 | 3/2017 | Gregory et al. |
| 9,605,049 B2 | 3/2017 | Campana et al. |
| 9,617,336 B2 | 4/2017 | Cojocaru et al. |
| 9,623,049 B2 | 4/2017 | Eshhar et al. |
| 9,623,082 B2 | 4/2017 | Copik et al. |
| 9,624,276 B2 | 4/2017 | Young et al. |
| 9,624,306 B2 | 4/2017 | Morgan et al. |
| 9,629,877 B2 | 4/2017 | Cooper et al. |
| 9,650,428 B2 | 5/2017 | Sampath et al. |
| 9,657,105 B2 | 5/2017 | Forman et al. |
| 9,663,763 B2 | 5/2017 | Sentman |
| 9,670,281 B2 | 6/2017 | Lim et al. |
| 9,677,136 B2 | 6/2017 | Denise et al. |
| 9,685,295 B2 | 6/2017 | King et al. |
| 9,688,740 B2 | 6/2017 | Choi et al. |
| 9,688,760 B2 | 6/2017 | Kufer et al. |
| 9,701,758 B2 | 7/2017 | Cooper et al. |
| 9,708,384 B2 | 7/2017 | Scholler et al. |
| 9,714,278 B2 | 7/2017 | June et al. |
| 9,725,492 B2 | 8/2017 | Felber et al. |
| 9,725,519 B2 | 8/2017 | Masuko et al. |
| 9,745,368 B2 | 8/2017 | Milone et al. |
| 9,765,142 B2 | 9/2017 | Dimitrov et al. |
| 9,765,342 B2 | 9/2017 | Kochenderfer |
| 9,777,061 B2 | 10/2017 | Ebersbach et al. |
| 9,783,591 B2 | 10/2017 | June et al. |
| 9,790,261 B2 | 10/2017 | Felber et al. |
| 9,790,278 B2 | 10/2017 | Sentman et al. |
| 9,790,282 B2 | 10/2017 | Orentas et al. |
| 9,809,581 B2 | 11/2017 | Chen et al. |
| 9,815,901 B2 | 11/2017 | Brogdon et al. |
| 9,815,908 B2 | 11/2017 | Schonfeld et al. |
| 9,821,011 B1 | 11/2017 | Sentman |
| 9,821,012 B2 | 11/2017 | Wu et al. |
| 9,822,340 B1 | 11/2017 | Sentman |
| 9,828,399 B2 | 11/2017 | Tremblay et al. |
| 9,828,435 B2 | 11/2017 | Evans et al. |
| 9,833,476 B2 | 12/2017 | Zhang et al. |
| 9,833,480 B2 | 12/2017 | Junghans et al. |
| 9,834,545 B2 | 12/2017 | Chen et al. |
| 9,834,590 B2 | 12/2017 | Campana et al. |
| 9,845,362 B2 | 12/2017 | Mukherjee |
| 9,855,297 B2 | 1/2018 | Duchateau et al. |
| 9,855,298 B2 | 1/2018 | Bot et al. |
| 9,856,176 B2 | 1/2018 | Harris et al. |
| 9,856,322 B2 | 1/2018 | Campana et al. |
| 9,856,497 B2 | 1/2018 | Qi et al. |
| 9,868,774 B2 | 1/2018 | Orentas et al. |
| 9,889,160 B2 | 2/2018 | Jantz et al. |
| 9,889,161 B2 | 2/2018 | Jantz et al. |
| 9,913,882 B2 | 3/2018 | Slawin et al. |
| 9,914,909 B2 | 3/2018 | Brown et al. |
| 9,920,132 B2 | 3/2018 | Wels et al. |
| 9,931,347 B2 | 4/2018 | Cowley et al. |
| 9,931,377 B2 | 4/2018 | Pavlakis et al. |
| 9,932,387 B2 | 4/2018 | Lefrancois et al. |
| 9,932,405 B2 | 4/2018 | Xiao et al. |
| 9,932,572 B2 | 4/2018 | Spencer et al. |
| 9,938,497 B2 | 4/2018 | Sentman |
| 9,944,702 B2 | 4/2018 | Galetto |
| 9,944,709 B2 | 4/2018 | Galetto |
| 9,944,931 B2 | 4/2018 | Wucherpfennig et al. |
| 9,950,010 B1 | 4/2018 | Jantz et al. |
| 9,950,011 B1 | 4/2018 | Jantz et al. |
| 9,951,118 B2 | 4/2018 | Kitchen et al. |
| 9,957,480 B2 | 5/2018 | Sentman |
| 9,963,497 B2 | 5/2018 | Kaempfer et al. |
| 9,969,790 B2 | 5/2018 | Lefrancois et al. |
| 9,987,308 B2 | 6/2018 | Riddell et al. |
| 10,011,658 B2 | 7/2018 | Liu et al. |
| 10,023,648 B2 | 7/2018 | Hombach et al. |
| 10,040,846 B2 | 8/2018 | Frigault et al. |
| 10,071,118 B2 | 9/2018 | Katz et al. |
| 10,072,078 B2 | 9/2018 | Orentas et al. |
| 10,117,897 B2 | 11/2018 | Sadelain et al. |
| 10,166,255 B2 | 1/2019 | Moriarity et al. |
| 10,351,612 B2 | 7/2019 | Schonfeld et al. |
| 10,406,177 B2 | 9/2019 | Moriarity et al. |
| 10,464,989 B2 * | 11/2019 | Walcheck .......... A61K 38/1774 |
| 11,104,735 B2 | 8/2021 | Huntington et al. |
| 11,696,927 B2 | 7/2023 | Copik et al. |
| 2002/0102264 A1 | 8/2002 | Cheung |
| 2003/0148982 A1 | 8/2003 | Brenner et al. |
| 2004/0038886 A1 | 2/2004 | Finney et al. |
| 2006/0110360 A1 | 5/2006 | Klingemann |
| 2007/0071759 A1 | 3/2007 | Shin et al. |
| 2008/0050341 A1 | 2/2008 | Morgan et al. |
| 2009/0041804 A1 | 2/2009 | Schlom et al. |
| 2010/0105136 A1 | 4/2010 | Carter et al. |
| 2010/0152421 A1 | 6/2010 | Nishimura et al. |
| 2011/0014162 A1 | 1/2011 | Lowdell |
| 2011/0236411 A1 | 9/2011 | Scholler et al. |
| 2011/0286980 A1 | 11/2011 | Brenner |
| 2012/0040452 A1 | 2/2012 | Nishimura et al. |
| 2012/0148552 A1 | 6/2012 | Jensen |
| 2012/0171173 A1 | 7/2012 | Ideno et al. |
| 2012/0308986 A1 | 12/2012 | Deng et al. |
| 2013/0001376 A1 | 1/2013 | Peled et al. |
| 2013/0280221 A1 | 10/2013 | Schonfeld et al. |
| 2013/0302283 A1 | 11/2013 | Kihm |
| 2013/0308986 A1 | 11/2013 | Sato |

(56) References Cited

U.S. PATENT DOCUMENTS

| | | |
|---|---|---|
| 2014/0044714 A1 | 2/2014 | Ho et al. |
| 2014/0212446 A1 | 7/2014 | Riley et al. |
| 2014/0220053 A1 | 8/2014 | Muraca et al. |
| 2014/0255363 A1 | 9/2014 | Metelitsa et al. |
| 2014/0322216 A1 | 10/2014 | Kaplan |
| 2015/0190429 A1 | 7/2015 | Beelen et al. |
| 2015/0224143 A1 | 8/2015 | Malmberg et al. |
| 2015/0313946 A1 | 11/2015 | Shi et al. |
| 2015/0368360 A1 | 12/2015 | Liang et al. |
| 2015/0376296 A1 | 12/2015 | Fedorov et al. |
| 2016/0145337 A1 | 5/2016 | Galetto et al. |
| 2016/0151491 A1 | 6/2016 | Rabinovich et al. |
| 2016/0158285 A1 | 6/2016 | Cooper et al. |
| 2016/0207989 A1 | 7/2016 | Short |
| 2017/0008963 A1 | 1/2017 | Brogdon et al. |
| 2017/0067021 A1 | 3/2017 | Moriarity et al. |
| 2017/0081405 A1 | 3/2017 | Adusumilli et al. |
| 2017/0119682 A1 | 5/2017 | De La Rosa et al. |
| 2017/0119865 A1 | 5/2017 | Lee et al. |
| 2017/0152480 A1 | 6/2017 | Jensen |
| 2017/0319659 A1 | 11/2017 | Copik et al. |
| 2017/0335281 A1 | 11/2017 | Loew et al. |
| 2018/0142035 A1 | 5/2018 | Lobb et al. |
| 2019/0046659 A1 | 2/2019 | Wang et al. |
| 2019/0345217 A1 | 11/2019 | Ma et al. |
| 2020/0009193 A1 | 1/2020 | Han et al. |
| 2020/0046766 A1 | 2/2020 | Niazi et al. |
| 2020/0046779 A1 | 2/2020 | Niazi et al. |
| 2020/0390815 A1 | 12/2020 | Ang et al. |
| 2020/0390816 A1 | 12/2020 | Kerbauy et al. |
| 2021/0230548 A1 | 7/2021 | Daher et al. |

FOREIGN PATENT DOCUMENTS

| | | |
|---|---|---|
| CA | 3046576 | 6/2018 |
| CN | 103483453 | 1/2014 |
| CN | 105861430 | 8/2016 |
| CN | 106397593 | 2/2017 |
| CO | 2021014353 | 1/2022 |
| CO | 2021013127 | 3/2022 |
| EA | 201791442 A1 | 5/2018 |
| EP | 2614151 | 7/2013 |
| EP | 2995682 | 3/2016 |
| EP | 3333192 | 6/2018 |
| EP | 3154581 | 2/2019 |
| EP | 2877187 | 6/2019 |
| JP | 2015-502756 A | 1/2015 |
| JP | 2015-519890 A | 7/2015 |
| JP | 2016-504324 A | 2/2016 |
| JP | 2017-532353 A | 11/2017 |
| RU | 2422513 | 6/2011 |
| TW | 201615832 A | 5/2016 |
| WO | WO 1995/001994 | 1/1995 |
| WO | WO 2005/007199 | 1/2005 |
| WO | WO 2005/042774 | 5/2005 |
| WO | WO 2006/133398 | 12/2006 |
| WO | 2007/136673 A2 | 11/2007 |
| WO | WO 2008/060510 | 5/2008 |
| WO | WO 2009/015842 | 2/2009 |
| WO | WO 2009/153992 | 12/2009 |
| WO | WO 2010/037395 | 4/2010 |
| WO | WO 2010/042189 | 4/2010 |
| WO | WO 2010/049935 | 5/2010 |
| WO | WO 2012/033885 | 3/2012 |
| WO | WO 2012/136231 | 10/2012 |
| WO | WO 2013/040371 | 3/2013 |
| WO | WO 2013/070468 | 5/2013 |
| WO | WO 2013/094988 | 6/2013 |
| WO | WO 2013/163171 | 10/2013 |
| WO | WO 2014/093948 | 6/2014 |
| WO | WO 2014/138314 | 9/2014 |
| WO | WO 2014/184744 | 11/2014 |
| WO | WO 2014/186469 | 11/2014 |
| WO | WO 2015/051247 | 4/2015 |
| WO | 2015/132415 A1 | 9/2015 |
| WO | 2015/154012 A1 | 10/2015 |
| WO | WO 2016/044811 | 3/2016 |
| WO | WO 2016/069607 | 5/2016 |
| WO | WO 2016/102965 | 6/2016 |
| WO | WO 2016/109668 | 7/2016 |
| WO | WO 2016/172606 | 10/2016 |
| WO | WO 2016/174405 | 11/2016 |
| WO | 2016/197108 A1 | 12/2016 |
| WO | WO 2016/210293 | 12/2016 |
| WO | WO 2017/001572 | 1/2017 |
| WO | WO 2017/020812 | 2/2017 |
| WO | WO 2017/023801 | 2/2017 |
| WO | WO 2017/023803 | 2/2017 |
| WO | WO 2017/027843 | 2/2017 |
| WO | 2017/037083 A1 | 3/2017 |
| WO | 2017/042393 A1 | 3/2017 |
| WO | WO 2017/048809 | 3/2017 |
| WO | WO 2017/048809 A1 * | 3/2017 | ............ A61K 35/17 |
| WO | WO 2017/048902 | 3/2017 |
| WO | WO 2017/096329 | 6/2017 |
| WO | WO 2017/100861 | 6/2017 |
| WO | WO 2017/123556 | 7/2017 |
| WO | WO 2017/123956 | 7/2017 |
| WO | 2017/132358 A1 | 8/2017 |
| WO | WO 2017/160986 | 9/2017 |
| WO | WO 2017/173384 | 10/2017 |
| WO | WO 2017/205810 | 11/2017 |
| WO | WO 2017/220704 | 12/2017 |
| WO | WO 2017/222593 | 12/2017 |
| WO | WO 2018/013797 | 1/2018 |
| WO | WO 2018/014038 | 1/2018 |
| WO | 2018022646 A1 | 2/2018 |
| WO | WO 2018/027155 | 2/2018 |
| WO | WO 2018/053885 | 3/2018 |
| WO | WO 2018/071682 | 4/2018 |
| WO | WO 2018/081470 | 5/2018 |
| WO | WO 2018/108859 | 6/2018 |
| WO | WO 2018/195339 | 10/2018 |
| WO | WO 2018/208670 | 11/2018 |
| WO | WO 2018208606 | 11/2018 |
| WO | WO 2019/089884 | 5/2019 |
| WO | WO 2019/099927 | 5/2019 |
| WO | WO 2019/157130 | 8/2019 |
| WO | WO 2019/169141 | 9/2019 |
| WO | WO 2019/210832 | 11/2019 |
| WO | WO 2019/213610 | 11/2019 |
| WO | WO 2019/217512 | 11/2019 |
| WO | 2020/043670 A1 | 3/2020 |
| WO | 2020/073029 A1 | 4/2020 |
| WO | 2020/112493 A1 | 6/2020 |
| WO | WO 2020/187340 | 9/2020 |
| WO | WO 2020/198675 | 10/2020 |
| WO | WO 2020/205359 | 10/2020 |

OTHER PUBLICATIONS

English translation of Office Communication issued in Japanese Patent Application No. 2020-544206, dated Jan. 6, 2023.
Bihi et al., "Mechanisms of NK cell activation: CD4+ T cells enter the scene," Cell. Mol. Life Sci., 68:3457-3467, 2011.
English translation of Office Communication issued in Russian Patent Application No. 2021118674, dated Mar. 23, 2023.
Kaartinen et al., "Low interleukin-2 concentration favors generation of early memory T cells over effector phenotypes during chimeric antigen receptor T-cell expansion," Cytotherapy, 19:689-702, 2017.
Kambayashi et al., "Atypical MHC class II-expressing antigen-presenting cells: can anything replace a dendritic cell?" Nature Reviews: Immunology, 14:719-730, 2014.
Nogrady, "Nature Killer Cell Therapies Catch Up to CAR T," The Scientist, 7 pages, 2020.
Rybachuk et al., "Immunophenotype of NK Cells During Long-Term Cultivation of Mononuclear Cells," Genes & Cells, 17(3): 199-200, 2022. (English Machine Translation).
Söderström et al., "Nature killer cells trigger osteoclastogenesis and bone destruction in arthritis," PNAS, 107(29):13028-13033, 2010.
Liu et al., "Cord blood derived natural killer cells engineered with

(56) References Cited

OTHER PUBLICATIONS a chimeric antigen receptor targeting CD19 and expressing IL-15 have long term persistence and exert potent anti-leukemia activity," Blood, 126(23):3091, 2015.
Anand et al., "Cancer is a Preventable Disease that Requires Major Lifestyle Changes," Pharm. Res., 25(9):2097-2116, 2008.
Caruana et al., "K562-Derived Whole-Cell Vaccine Enhances Antitumor Responses of CAR-Redirected Virus-Specific Cytotoxic T Lymphocytes In Vivo," Clinical Cancer Research, 21(13):2952-2962, 2015.
Dickens et al., "Principles of cancer treatment by chemotherapy," Surgery (Oxford), 36(3):134-138, 2018.
English translation of Search Report issued in ROC (Taiwan) Patent Application No. 108105835, date of completion of search Apr. 18, 2023.
Office Communication issued in U.S. Appl. No. 16/970,930, dated Mar. 12, 2023.
Paul et al., "The Molecular Mechanism of Natural Killer Cells Function and Its Importance in Cancer Immunotherapy," Front. Immunol., 8:1124, 2017.
Stark and Watzl, "2B4 (CD244), NTB-A and CRACC (CS1) stimulate cytotoxicity but no proliferation in human NK cells," International Immunology, 18(2):241-247, 2006.
Tomchuck et al., "Enhanced Cytotoxic Function of Natural Killer and CD3+CD56+ Cells in Cord Blood Following Culture," Biol. Blood Marrow Transplant, 21(1):39-49, 2015.
Agrawal et al., "14G2a anti-GD2 crossreactivity with the CD166 antigen," J Immunother., 33(9):1014-1015, 2010.
Baev et al., "Distinct homeostatic requirements of CD4+ and CD4− subsets of Va24-invariant natural killer T cells in humans," Blood, 104(13):4150-4156, 2004.
Batra et al., "Armored Glypican-3-Specific CAR T Cells for the Immunotherapy of Hepatocellular Carcinoma," Molecular Therapy, 26(5), Suppl. 1, p. 441, 2018.
Bendelac et al., "CD1 Recognition by Mouse NK1+ T Lymphosytes," Science, 268:863-865, 1995.
Bendelac et al., "The Biology of NKT Cells," Annu. Rev. Immunol., 25:297-336, 2007.
Brocker and Karjalainen, "Signals through T Cell Receptor-z Chain Alone Are Insufficient to Prime Resting T Lymphocytes," J. Exp. Med., 181:1653-1659, 1995.
Brudno et al., "Toxicities of Chimeric antigen Receptor T Cells: Recognition and Management," Blood, 127(26): 3321-3330, 2016.
Cartellieri et al., "Chimeric Antigen Receptor-Engineered T Cells for Immunotherapy of Cancer," Journal of Biomedicine and Biotechnology, 2010:956304, 13 pages, 2010.
Chan et al., "Immunohistochemical Expression of Glypican-3 in Pediatric Tumors: An Analysis of 414 Cases," Pediatric and Developmental Pathology, 16:272-277, 2013.
Chang et al., "Sustained expansion of NKT cells and antigen-specific T cells after injection of a-galactosyl-ceramide loaded mature dendritic cells in cancer patients," J. Exp. Med., 201(9):1503-1517, 2005.
Cheresh et al., "Biosynthesis and Expression of the Disialoganglioside GD2, a Relevant Target Antigen on Small Cell Lung Carcinoma for Monoclonal Antibody-mediated Cytolysis1," Cancer Research, 46:5112-5118, 1986.
Cohen et al., "Shared and distinct transcriptional programs underlie the hybrid nature of INKT cells," Nat Immunol., 14(1):90-99, 2013.
Crowe et al., "Differential antitumor immunity mediated by NKT cell subsets in vivo," J. Exp. Med., 202(9):1279-1288, 2005.
Delconte et al. "NK Cell Priming From Endogenous Homeostatic Signals Is Modulated by CIS,". Front Immunol., 11(75), 16 pages, 2020.
Delconte et al., "CIS is a potent checkpoint in NK cell-mediated tumor immunity," Nature Immunology, 17:816-824, 2016.
Dhodapkar, "Harnessing human CD1d restricted T cells for tumor immunity: progress and challenges," Front Biosci., 14:796-807, 2009.
Di Stasi et al., "Inducible Apoptosis as a Safety Switch for Adoptive Cell Therapy," N. Engl. J. Med., 365:1673-1683, 2011.
Dotti et al., "Design and development of therapies using chimeric antigen receptorexpressing T cells," Immunol Rev., 257(1):107-126, 2014.
Dotti et al., "Fifteen Years of Gene Therapy Based on Chimeric Antigen Receptors: "Are We Nearly There Yet?"", Human Gene Therapy, 20:1229-1239, 2009.
Einsele, "Immunotherapy and cellular therapy," COMy Announcement, Multiple Myeloma 2017 highlights: A post International Myeloma Workshop (IMW) summary, Paris, France, 61 pages, Apr. 21-22, 2017.
English translation of Office Action issued in Japanese Patent Application No. 2019-556918, dated May 25, 2022.
English translation of Office Communication issued in Eurasian Patent Application No. 202092588, dated Mar. 21, 2023.
English translation of Office Communication issued in Japanese Patent Application No. 2020-561821, dated May 9, 2023.
Exley et al., "Selective activation, expansion, and monitoring of human iNKT cells with a monoclonal antibody specific for the TCR a-chain CDR3 loop," Eur. J. Immunol., 38:1756-1766, 2008.
Extended European Search Report issued in European Patent Application No. 20782753.6, dated Dec. 5, 2022.
Fehniger et al., "Fatal Leukemia in Interleukin 15 Transgenic Mice Follows Early Expansions in Natural Killer and Memory Phenotype CD8+ T Cells," J. Exp. Med., 193(2):219-231, 2001.
Furukawa et al., "Biosignals Modulated by Tumor-Associated Carbohydrate Antigens," Ann. N.Y. Acad. Sci., 1086:185-198, 2006.
Gan et al., "The epidermal growth factor receptor variant III (EGFRvIII): where wild things are altered," The FEBS Journal, 280(21):5350-5370, 2013.
Gao et al., "Development of T Cells Redirected to Glypican-3 for the Treatment of Hepatocellular Carcinoma," Clinical Cancer Research, 20(24):6418-6428, 2014.
Gao et al., "Supplementary Data: Development of T Cells Redirected to Glypican-3 for the Treatment of Hepatocellular Carcinoma," Clinical Cancer Research, Figures Only, pp. 6418-6642, retrieved from Internet: http://clincancerres.aacrjournals.org/content/20/24/6418, 2014.
Godfrey and Kronenberg, "Going both ways: immune regulation via CD1d-dependent NKT cells," Journal of Clinical Investigation, 114(10): 379-1388, 2004.
Godfrey et al., "NTK cells: what's in a name?" Nature Reviews Immunology; Nature Publishing Group; 4:231-237, 2004.
Godfrey et al., "Raising the NKT cell family," Nat Rev Immun, 11(3):197-206, 2010.
Graef et al., "Serial transfer of single-cell-derived immunocompetence reveals sternness of CDS(+)central memory T cells," Immunity, 41(1)116-126, 2014.
Guillerey et al., "Targeting natural killer cells in cancer immunotherapy," Nature Immulogy, 17(9):1025-1036, 2016.
Guittard et al., "The Cish SH2 domain is essential for PLC-γ1 regulation in TCR stimulated CD8 + T cells," Sci Rep., 8(1):5336, 2018.
Heczey et al., "Invariant NKT cells with chimeric antigen receptor provide a novel platform for safe and effective cancer immunotherapy," Blood, 124(18):2824-2833, 2014.
Heczey et al., "NKT cells as a novel platform for cancer immunotherapy with chimeric antigen receptors (P2038)," The Journal of Immunol., 190:132.9, 1 page, 2013.
Hofflin et al., "Generation of COB+ T cells expressing two additional T-cell receptors (TETARs) for personalised melanoma therapy," Cancer Biology & Therapy, 16(9):1323-1331, 2015.
Hsu et al., "Cytokine-independent growth and clonal expansion of a primary human CD8+ T-cell clone following retroviral transduction with the IL-15 gene," Blood, 109(12):5168-5177, 2007.
Huang et al., "Interleukin-armed chimeric antigen receptor-modified T cells for cancer immunotherapy," Gene Therapy, 25(3):192-197, 2017.
Imai et al., "Complement-Mediated Mechanisms in Anti-GD2 Monoclonal Antibody Therapy for Murine Metastatic Cancer," American Association for Cancer Research, 10562-10568, 2005.

(56) References Cited

OTHER PUBLICATIONS

International Search Report and Written Opinion issued in Application No. PCT/US16/28693, mailed Jul. 21, 2016.
International Search Report and Written Opinion issued in International Patent Application No. PCT/US2019/030721, dated Aug. 22, 2019.
Ishikawa et al., "A Phase I Study of a-Galactosylceramide (KRN7000)-Pulsed Dendritic Cells in Patients with Advanced and Recurrent Non-Small Cell Lung Cancer," Clin. Cancer Res., 11:1910-1917, 2005.
Johnson et al., "Rational development and characterization of humanized anti-EGFR variant III chimeric antigen receptor T cells for glioblastoma," Science Translational Medicine, 7(275):192-197, 2015.
Kalos et al., "Adoptive T cell transfer for cancer immunotherapy in the era of synthetic biology," Immunity, 39(1):49-60, 2013.
Kambayashi et al., "Emergence of D8+ T Cells Expressing NI Cell Receptors in Influenza A virus-infected mice," The Journal of Immunology; 165:4964-4969, 2000.
Kershaw et al., "A Phase I Study on Adoptive Immunotherapy Using Gene-Modified T cells for Ovarian Cancer," Clin. Cancer Res., 12:6106-6115, 2006.
Khor et al., "CISH and Susceptibility to Infectious Diseases," New England Journal of Medicine, 362(22):2092-2101, 2010.
Kim et al., "4-1BB Engagement Costimulates NKT Cell Activation and Exacerbates NKT Cell Ligand-Induced Airway Hyperresponsiveness and Inflammation," J. Immunol., 180:2062-2068, 2008.
Kronenberg et al., "The unconventional lifestyle of NKT cells," Nat. Rev. Immunol., 2:557-568, 2002.
Kunii et al., "Combination therapy of in vitro-expanded natural killer T cells and a-galactosylceramide-pulsed antigen-presenting cells in patients with recurrent head and neck carcinoma," Cancer Sci., 100(6):1092-1098, 2009.
Lantz et al., "An Invariant T Cell Receptor a Chain Is Used by a Unique Subset of Major Histocompatibility Complex Class I-specific CD4+ and CD4-8- T Cells in Mice and Himans," J. Exp. Med., 180:1097-1106, 1994.
Lappas et al., "Adenosine A2A receptor activation reduces hepatic ischemia reperfusion injury by inhibiting CD1d-dependent NKT cell activation," J. Experimental Medicine, 203(12):2639-2648, 2006.
Levy et al., "Expression of glypican-3 in undifferentiated embryonal sarcoma and mesenchymal hamartoma of the liver," Human Pathology, 43:695-791, 2012.
Li et al., "Immunotherapy of Hepatocellular Carcinoma with T Cells Engineered to Express Glypican-3-Specific Chimeric Antigen Receptors," Molecular Therapy, 23(Suppl. I):SI64-SI65.; and 18th Annual Meeting of the American- Society-Of-Gene-And-Cell-Therapy (ASGCT); New Orleans, LA, USA; May 13-16, 2015.
Li et al., "In vitro validation of human glypican-3 specific chimeric antigen receptors for hepatocellular carcinoma," Hepatology, 60(Suppl. 1): Sp. Iss. SI, Oct. 2014, p. 870A, XP002780485; and 65th Annual Meeting of the American-Association-For-The-Study-Of-Liver-Diseases; Boston, MA, USA; Nov. 7-11, 2014.
Li et al., "NKT Cell Activation Mediates Neutrophil IFN-γ Production and Renal Ischemia-Reperfusion Injury," The Journal of Immunology, 178:5899-5911, 2007.
Li et al., "Validation of glypican-3-specific scFv isolated from paired display/secretory yeast display library," BMC Biotechnology, 12(1):23, 2012.
Liu et al., "IL-15 protects NKT cells from inhibition by tumor-associated macrophages and enhances antimetastatic activity," The Journal of Clinical Investigation, 122(6):2221-2233, 2012.
Lo et al., "Anti-GD3 chimeric sFv-CD28/T-cell receptor zeta designer T cells for treatment of metastatic melanoma and other neuroectodermal tumors," Cancer Res., 16(10):2769-2780, 2010.
Louis et al., "NK cell-derived GM-CSF potentiates inflammatory arthritis and is negatively regulated by CIS." J Exp Med., 217(5): e20191421, 2020.

Louis et al., "Treatment of High-Risk Neuroblastoma with Adoptively Transferred T Lymphocytes Genetically Engineered to Recognize GD2," Biology of Blood and Marrow Transplantation, 15(2):26, 2009.
Macdonald, "NKT cells: In the Beginning . . . ," Eur. J. Immunol., 37:S111-115, 2007.
Maher et al., "Human T-lymphocyte cytotoxicity and proliferation directed by a single chimeric TCRz/CD28 receptor," Nat. Biotechol., 20:70-75, 2002.
Male et al., In: Immunology, Seventh Edition. Canada: Elsevier Limited, pp. 11 and 527, published 2007.
Mantovani et al., "Cancer-related inflammation," Nature, 454:24:436-444, 2008.
Matsuda et al., "Homeostasis of V alpha 14i NKT cells," Nat. Immunol., 3(10):966-974, 2002.
Menger et al., "TALEN-mediated genetic inactivation of the glucocorticoid receptor in cytomegalovirus-specific T cells," Blood, 126(26):2781-2789, 2015.
Metelitsa et al., "Human NKT Cells Mediate Antitumor Cytotoxicity Directly by Recognizing Target Cell CD1d with Bound Ligand or Indirectly by Producing IL-2 to Activate NK Cells," Journal of Immunology, 167:3114-3122; 2001.
Metelitsa et al., "Natural Killer T Cells Infiltrate Neuroblastomas Expressing the Chemokine CCL2," J. Exp. Med., 199(9):1213-1221, 2004.
Metelitsa, "Anti-tumor potential of type-I NKT cells against CD1d-positive and CD1d-negative tumors in humans," Clinical Immunology, 140:119-129, 2011.
Molling et al., "Low Levels of Circulating Invariant Natural Killer T Cells Predict Poor Clinical Outcome in Patients with Head and Neck Squamous Cell Carcinoma," J. Clin. Oncol., 25(7):862-868, 2007.
Motohashi et al., "A Phase I-II Study of a-Galactosylceramide-Pulsed IL-2/GM-CSF-Cultured Peripheral Blood Mononuclear Cells in Patients with Advanced and Recurrent Non-Small Cell Lung Cancer," J. Immunol., 182:2492-2501, 2009.
Mujoo et al., "Functional Properties and Effect on Growth Suppression of Human Neuroblastoma Tumors by Isotype Switch Variants of Monoclonal Antiganglioside GD2," American Association for Cancer Research, 49(11):2857-2861, 1989.
Nandagopal et al., "The critical role of IL-15-PI3K-mTOR pathway in natural killer cell effector functions," Frontiers in Immunology, 5(187), pp. 1-12, 2014.
Navid et al., "Anti-GD2 antibody therapy for GD2-expressing tumors," Curr. Cancer Drug Target, 10(2):200-209, 2010.
Nguyen et al., "Glypican-3-Specific CAR NKT Cells Armored with IL-15 Exhibit Potent and Sustained Anti-Tumor Activity against Hepatocellular Carcinoma," Molecular Therapy, 26(5), Suppl. 1, p. 62, 2018.
Nieda et al., "Therapeutic activation of Va24+Vb11+ NKT cells in human subjects results in highly coordinated secondary activation of acquired and innate immunity," Blood, 103(2):383-389, 2004.
Office Communication issued in European Patent Application No. 18787208.0, dated May 23, 2023.
Office Communication issued in Singapore Patent Application No. 11202010763V, dated Jul. 4, 2022.
Palmer et al., "Cish actively silences TCR signaling in CD8+ T cells to maintain tumor tolerance." J. Exp. Med., 212(12):2095-2113, 2015.
Peralbo et al., "Invariant NKT and NKT-like lymphocytes: Two different T cell subsets that are differentially affected by ageing," Experimental Gerontology, 42(8):703-8, 2007.
Porcelli et al., "Analysis of T Cell Antigen Receptor (TCR) Expression by Human Peripheral Blood CD4-8-a/b T Cell Demonstrates Preferential Use of Several Vb genes and an Invariant TCR a Chain," J. Exp. Med., 178, pp. 1-16, 1993.
Porter et al., "Chimeric Antigen Receptor-Modified T Cells in Chronic Lymphoid Leukemia," N. Engl. J. Med., 365(8):725-733, 2011.
Pule et al., "A Chimeric T Cell Antigen Receptor That Augments Cytokine Release and Supports Clonal Expansion of Primary Human T Cells," Molecular Therapy, 12:933-941, 2005.

(56) References Cited

OTHER PUBLICATIONS

Pule et al., "Virus-specific T cells engineered to coexpress tumor-specific receptors: persistence and antitumor activity in individuals with neuroblastoma," Nat. Med., 14(11):1264-1270, 2008.
Putz et al.,"Targeting cytokine signaling checkpoint CIS NK cells to protect from tumor initiation and metastasis," Oncoimmunology, 6(2), pp. 1-10, 2017.
Qian et al., "The novel anti-CD19 chimeric antigen receptors with humanized scFv (single-chain variable fragment) trigger leukemia cell killing," Cellular Immunology, 304:49-54, 2016.
Quintarelli et al., "Co-expression of sytokine and suicide genes to enhance the activity and safety of tumor-specific cytotoxic T lymphosytes," Blood, 110(8):2793-2802, 2007.
Rautela et al., "Drug target validation in primary human natural killer cells using CRISPR RNP," J. Leukoc. Biol., 108(4):13971408, 2020.
Ren et al., "A versatile system of rapid multiplex genome-edited CAR T cell generation," Oncotarget, 8(10):17002-17011, 2017.
Ren et al., "Advancing chimeric antigen receptor T cell therapy with CRISPR/Cas9," Protein Cell, 8(9):634-643, 2017.
Rettig et al., "Transduction and Selection of Human T Cells with Novel CD34/Thymidine Kinase Chimeric Suicide Genes for the Treatment of Graft-versus-Host Disease," Molecular Ther., 8(1):29-41, 2003.
Riedl et al., "The apoptosome: signalling platform of cell death," Nat. Rev. Mol. Cell Biol., 8:405-413, 2007.
Rossig et al., "Targeting of GD2-Positive Tumor Cells by Human T Lymphocytes Engineered to Express Chimeric T-Cell Receptor Genes," Int. J. Cancer, 94:228-236, 2001.
Rossig et al., "Epstein-Barr virus-specific human T lymphocytes expressing antitumor chimeric T-cell receptors: potential for improved immunotherapy," Blood, 99(6):2009-2016, 2002.
Rossjohn et al., "Recognition of CD1d-restricted antigens by natural killer T cells," Nat. Rev. Immunol., 12(12):845-857, 2012.
Sadelain et al., "The promise and potential pitfalls of chimeric antigen receptors," Current Opinion in Immunology, 21:215-223, 2009.
Sahm et al., "Expression of IL-15 in NK cells results in rapid enrichment and selective cytotoxicity of gene-modified effectors that carry a tumor-specific antigen receptor," Cancer Immunology Immunotherapy, 61:1451-1461, 2012.
Sato et al., "Development of an IL-15—autocrine CD8 T-cell leukemia in IL-15—transgenic mice requires the cis expression of IL-15Ra," Blood, 117:4032-4040, 2011.
Savoldo et al., "CD28 costimulation improves expansion and persistence of chimeric antigen receptor-modified T cells in lymphoma patients," J. Clin. Invest., 112(5):1822-1826, 2011.
Shah, "T-Cell Development in Thymus," British Society for Immunology, London, retrieved from the Internet: www.immunology.org/public-information/bitesized-immunology/immune-development/t-cell-development-thymus, retrieved on Sep. 16, 2008.
Sica and Bronte, "Altered macrophage differentiation and immune dysfunction in tumor development," J. Clin. Invest., 117(5):1155-1166, 2007.
Sica et al., "Macrophage polarization in tumour progression," Seminars in Cancer Biology, 18:349-355, 2008.
Slifka et al., "NK Markers are Expressed on a High Percentage of Virus-Specific CD8+ and CD4+ T Cells," J. Immunol., 164:209-2015, 2000.
Sommermeyer et al., "Chimeric antigen receptor-modified T cells derived from defined COB and CD4 subsets confer superior antitumor reactivity in vivo," Leukemia, 30(2):492-500, 2015.
Song et al., "In Vivo Persistence, Tumor Localization, and Antitumor Activity of CAR-Engineered T Cells Is Enhanced by Costimulatory Signaling through CD137 (4-1 BB)," Cancer Research, 71(13):4617-4627, 2011.
Song et al., "Va24-invariant NKT cells mediate antitumor activity via killing of tumor-associated macrophages," J. Clin. Invest., 119(6):1524-1536, 2009.

Straathof et al., "An inducible caspase 9 safety switch for T-cell therapy," Blood, 105(11):4247-4254, 2005.
Supplementary European Search Report dated Jan. 21, 2022 issued in European Patent Application No. 19795874.7.
Suzukil et al., "Glypian-3 (GPC3) as a novel tumor for malignant ovarian tumors and malignant melanoma," Japan Molecular Tumor Markers Research Journal, 25:31-32, 2010. (English abstract).
Swann et al., "CD1-Restricted T Cells and Tumor Immunity," Curr. Top. Microbiol. Immunol., 314:293-321, 2007.
Tachibana et al., "Increased Intratumor Va24-Positive Natural Killer T Cells: A Prognostic Factor for Primary Colorectal Carcinomas," Clin. Cancer Res., 11(20):7322-7327, 2005.
Takahashi et al., "Cutting edge: analysis of human V alpha 24+CD8+ NK T cells activated by alpha-galactosylceramide-pulsed monocyte-derived dendritic cells;" The Journal of Immunology; 168(7):3140-3144, 2002.
Tey et al., "Inducible caspase 9 suicide gene to improve the safety of allodepleted T cells after haploidentical stem cell transplantation," Biol. Blood Marrow Transplant., 13(8):913-924, 2007.
Till et al., "Adoptive immunotherapy for indolent non-Hodgkin lymphoma and mantle cell lymphoma using genetically modified autologous CD20-specific T cells," Blood, 112(6):2261-2271, 2008.
Toretsky et al., "Glypican-3 Expression in Wilms Tumor and Hepatoblastoma," Journal of Pediatric Hematology/Onocolgy, 23(8):496-499, 2001.
Torikai et al., "Translational Implications for Off-the-shelf Immune Cells Expressing Chimeric Antigen Receptors," Molecular Therapy, 24(7):1178-1186, 2016.
Uldrich et al., "NKT cell stimulation with glycolipid antigen in vivo: co-stimulation-dependent expansion, Bim-dependent contraction, and hypo-responsiveness to further antigenic challenge," J. Immunol., 175(5):3092-3101, 2005.
Veluchamy et al., "The Rise of Allogeneic Natural Killer Cells as a Platform for Cancer Immunotherapy: Recent Innovations and Future Developments." Frontiers in Immunology, 8(631), pp. 1-20, 2017.
Vera et al., "591. Large Scale Production of Suspension Cells for Clinical Application Using a Novel Cell Bioreactor," Molecular Therapy, 19(Suppl. 1):S226, 2011.
Vera et al., "Accelerated production of antigen-specific T cells for preclinical and clinical applications using gas-permeable rapid expansion cultureware (G-Rex)," 33(3):305-315, 2010.
Vinay et al., "CD137-Deficient Mice Have Reduced NK/NKT Cell Numbers and Function, Are Resistant to Lipopolysaccharide-Induced Shock Syndromes, and Have Lower IL-4 Responses," J. Immunol., 173:4218-4229, 2004.
Wang et al., "A transgene-encoded surface polypeptide for selection, in vivo tracking, and ablation of engineered A cells," Blood, 118(5):1255-1263, 2011.
Wang et al., "Phenotypic and functional attributes of lentivirus-modified CD19-specific human COB+central memory T cells manufactured at clinical scale," J. Immunother., 35(9):689-701, 2012.
Wang et al., "Tumor-derived soluble MICs impair CD3+CD56+ NKT-like cell cytotoxicity in cancer patients;" Elsevier Immunology Letters, 120(1-2):65-71, 2008.
Wilkie et al., "Retargeting of Human T Cells to Tumor-Associated MUC1: The Evolution of a Chimeric Antigen Receptor," J. Immunol., 180:4901-4909, 2008.
Xu and Dotti, "Selection bias: maintaining less-differentiated T cells for adoptive immunotherapy," J. Clinical Invest., 126(1):35-37, 2016.
Yoshida et al., "Ganglioside G(D2) in Small Cell Lung Cancer Cell Lines: Enhancement of Cell Proliferation and Mediation of Apoptosis," Cancer Research, 61(10):4244-4252, 2001.
Yvon et al., "Immunotherapy of Metastatic Melanoma Using Genetically Engineered GD3-Specific T cells," Clinical Cancer Research, 15(18):5852-5860, 2009.
Zaini et al., "OX40 ligand expressed by DCs costimulates NKT and CD4+ Th cell antitumor immunity in mice," J. Clin. Invest., 117(11):3330-3338, 2007.
Zhao et al., "GS2 Oligosaccharide: Target for Cytotoxic T Lymphocytes" The Journal of Experimental Medicine, 182:67-74, 1995.

(56) References Cited

OTHER PUBLICATIONS

Zhu et al. "Metabolic Reprograming via Deletion of CISH in Human iPSC-Derived NK Cells Promotes In Vivo Persistence and Enhances Anti-tumor Activity," Cell Stem Cell, 27(2):224-237.e6, 2020.

Zou et al., "Immunosuppressive networks in the tumour environment and their therapeutic relevance," Nat. Rev. Cancer, 5:263-274, 2005.

Amati et al., "Generation of mesenchymal stromal cells from cord blood: evaluation of in vitro quality parameters prior to clinical use," Stem Cell Research & Therapy, 8:14, pp. 1-15, 2017.

Badri et al., "Optimization of radiation dosing schedules for proneural glioblastoma," J. Math. Biol., 72(5):1301-1336, 2016.

Baylot et al., "TCTP has a Crucial Role in the Different Stages of Prostate Cancer Malignant Progression," Results and Problems in Cell Differentiation, 64:225-261, 2017.

Bhatta et al., "Education: The Key to Curb HIV and AIDS Epidemic," Kathmandu University Medical Journal, 42(2):158-161, 2013.

Chongbi et al., "Principle and Technology of Molecular Immunological Methods," Science and Technology Documentation Press, pp. 222-223, 2016. (English summary).

De Witte et al., "Cytokine treatment optimises the immunotherapeutic effects of umbilical cord-derived MSC for treatment of inflammatory liver disease," Stem Cell Research & Therapy, 8:140, pp. 1-12, 2017.

English machine translation of Office Communication issued in Colombian Patent Application No. NC2021/0007657, dated Jul. 31, 2023.

English translation of Office Communication issued in Chinese Patent Application No. 201980089617.6, dated Jul. 26, 2023.

English translation of Office Communication issued in Japanese Patent Application No. 2021-518730, dated Aug. 29, 2023.

English translation of Office Communication issued in Russian Patent Application No. 2021131582, dated Aug. 24, 2023.

Kloß et al., "Optimization of human NK cell manufacturing: Fully-automated separation, improved ex vivo expansion using IL-21 with autologous feeder cells and generation of anti-CD123-CAR-expressing effector cells," Human Gene Therapy, 28(10):897-913, 2017.

Quatrini et al., "The Immune Checkpoint PD-1 in Natural Killer Cells: Expression, Function and Targeting in Tumour Immunotherapy," Cancers, 12(11):3285, 20 pages, 2020.

Stretlsova et al., "Characteristics of Populations and Clones NK-Cells Obtained by Stimulation Interleukin 2 and Genetic Modified Feeder Cells K562, Expressing Membrane-Bound Interleukin 21," Medical Immunology, 19(5):62-63, 2017.

Tongjing et al., "Basic and Clinic of Th Genus Cell Polarization Colony," Military Medical Science Press, p. 77, 2002. (English summary).

Weimin et al., "Methodology for Cytokine Research," People's Medical Publishing House, p. 463, 1999. (English summary).

Wu et al., "Development and Functional Control of Natural Killer Cells by Cytokines," Frontiers in Immunology, 8(930), 18 pages, 2017.

Extended European Search Report issued in Corresponding European Application No. 19757916.2, dated Oct. 15, 2021.

Fang et al., "NK cell-based immunotherapy for cancer" *Seminars in Immunology* 2017, 31, 37-54.

Knorr et al., "Clinical utility of natural killer cells in cancer therapy and transplantation" *Seminars in Immunology* 2014, 26, 161-172.

Lusty et al. "IL-18/IL-15/IL-12 synergy induces elevated and prolonged IFN-[gamma] production byex vivoexpanded NK cells which is not due to enhanced STAT4 activation" *Molecular Immunology* 2017, 88, 138-147.

Avello, Janet et al: "Genetically re-engineered K562 cells significantly expand and functionally activate cord blood natural killer cells: Potential for adoptive cellular immunotherapy", Experimental Hematology, vol. 46, Oct. 17, 2016 (Oct. 17, 2016), pp. 38-47, Elsevier Inc, US.

Broekman et al: "TNF-? and IL-1?-activated human mesenchymal stromal cells increase airway epithelial wound healing in vitro via activation", Respiratory Research (2016) 17:3.

Denman et al: "Membrane-Bound IL-21 Promotes Sustained Ex Vivo Proliferation of Human Natural Killer Cells", PLoS ONE, Jan. 2012, vol. 7, Issue 1, e30264.

Depombo et al: "3198 Large-Scale, Bioreactor-Generated Expansion of Umbilical Cord Blood Tissue-Derived Mesenchymal Stromal Cells for Clinical Use", Cell Collection and Processing Program: Oral and Poster Abstracts, Session: 711. Cell Collection and Processing: Poster II, Sunday, Dec. 10, 2017, 6:00 PM-8:00 PM.

Fazzina et al: "A new standardized clinical-grade protocol for banking human umbilical cord tissue cells", Transfusion, vol. 55, Dec. 2015, pp. 2864-2873.

Han et al. "Interleukin-17 enhances immunosuppression by mesenchymal stem cells", Cell Death Differ, Jul. 18, 2014, vol. 21, No. 11, pp. 1758-1768.

Kis-Toth et al. "Engagement of SLAMF2/CD48 prolongs the time frame of effective T cell activation by supporting mature dendritic cell survival," J Immunol, Mar. 26, 2014 (Mar. 26, 2014), vol. 192, pp. 4436-4442.

Klingemann, Hans "Cellular therapy of cancer with natural killer cells—where do we stand?", Cytotherapy, vol. 15, No. 10, Oct. 1, 2013 (Oct. 1, 2013), pp. 1185-1194.

Lee et al: "Expansion of cytotoxic natural killer cells using irradiated autologous peripheral blood mononuclear cells and anti-CD16 antibody", Scientific Reports, 7: 11075.

Liu et al. "Manufacture of Clinical-Grade Universal Antigen Presenting Cells (UAPC) for the Ex Vivo Expansion and Activation of Natural Killer (NK) Cells," Blood, Nov. 21, 2018 (Nov. 21, 2018), vol. 132, Suppl 1, p. 2061.

Liu, E. et al: "Cord blood NK cells engineered to express IL-15 and a CD19-targeted CAR show long-term persistence and potent antitumor activity", Leukemia, vol. 32, No. 2, Jul. 20, 2017 (Jul. 20, 2017), pp. 520-531.

Martins et al. "Towards an advanced therapy medicinal product based on mesenchymal stromal cells isolated from the umbilical cord tissue: quality and safety data", Stem Cell Res Ther, Jan. 17, 2014, vol. 5, article 9, pp. 1-15.

Meyer et al: "Isolation and characterisation of mesenchymal stem cells in Wharton's jelly of the human umbilical cord: potent cells for cell-based therapies in paediatric surgery?" Eur Surg (2008) 40/5: 239-244.

Pelekanos et al., "Isolation and Expansion of Mesenchymal Stem/Stromal Cells Derived from Human Placenta Tissue", J. Vis. Exp. Jun. 2016 | 112 | e54204.

Polchert et al., "IFN-? activation of mesenchymal stem cells for treatment and prevention of graft versus host disease", Eur J Immunol., Jun. 2008; 38(6): 1745-1755.

Rezvani et al: "Engineering Natural Killer Cells for Cancer Immunotherapy", A Molecular Therapy : The Journal of the American Society of Gene Therapy, vol. 25, No. 8, Aug. 1, 2017 (Aug. 1, 2017), pp. 1769-1781.

Sarvaria et al: "Umbilical Cord Blood Natural Killer Cells, Their Characteristics, and Potential Clinical Applications", Frontiers in Immunology, vol. 8, Mar. 23, 2017 (Mar. 23, 2017), pp. 1-6.

Shah et al: "Antigen Presenting Cell-Mediated Expansion of Human Umbilical Cord Blood Yields Log-Scale Expansion of Natural Killer Cells with Anti-Myeloma Activity", PLOS ONE, vol. 8, No. 10, Oct. 18, 2013 (Oct. 18, 2013), p. e76781.

Shah, Nina: "Ex Vivo Expanded Cord Blood Natural Killer Cells as a Novel Therapeutic for Multiple Myeloma", Texas Mediacl Center Library: Dissertations and Theses, Aug. 1, 2015 (Aug. 1, 2015), pp. 1-47.

Sivanathan et al: "Transcriptome Profiling of IL-17A Preactivated Mesenchymal Stem Cells: A Comparative Study to Unmodified and IFN-y Modified Mesenchymal Stem Cells", Stem Cells International, vol. 2017, Article ID 1025820, 16 pages, https://doi.org/10.1155/2017/1025820.

Extended European Search Report issued in European Patent Application No. 19869661.9, dated May 18, 2022.

English translation of Office Communication issued in Eurasian Patent Application No. 2021118674, dated Aug. 18, 2023.

(56) References Cited

OTHER PUBLICATIONS

Leong et al. "Preactivation with IL-12, IL-15, and IL-18 Induces CD25 and a Functional High-Affinity IL-2 Receptor on Human Cytokine-Induced Memory-like Natural Killer Cells" Biol Blood Marrow Transplant, Apr. 2014, vol. 20, No. 4, pp. 463-473.
Webb et al., "Ex vivo induction and expansion of Natural Killer T cells by CD1d1-Ig coated artificial antigen presenting cells" Journal of Immunological Methods, 2009, vol. 346, No. 1-2, pp. 38-44.
Office Communication issued in Chinese Patent Application No. 202080032042.7, dated Sep. 29, 2023.
Office Communication issued in Korean Patent Application No. 10-2019-7034119, dated Oct. 6, 2023.
Srivastava et al., "Engineering CAR-T cells: Design concepts," Trends Immunol., 36(8):494-502, Aug. 2015.
Viel et al., "TGF-β inhibits the activation and functions of NK cells by repressing the mTOR pathway," Sci Signal., 9(415):ra19, Feb. 16, 2016.
English translation of Office Communication issued in Russian Patent Application No. 2021118674, dated Jan. 9, 2024.
Butler et al., "Human cell-based artificial antigen-presenting cells for cancer immunotherapy," Immunol. Rev., 257(1):191-209, 2014.
Gonzalez-Cabrero et al., "CD48-deficient mice have a pronounced defect in CD4(+) T cell activation," Proc. Natl. Acad. Sci. USA, 96(3):1019-23, 1999.
Kim et al., "The ABCs of artificial antigen presentation," Nat. Biotechnol., 22(4):403-10, 2004.
Kumaresan et al., "CS1, a novel member of the CD2 family, is homophilic and regulates NK cell function," Mol. Immunol., 39(1-2):1-8, 2002.
Office Communication issued in U.S. Appl. No. 16/970,930, dated Mar. 8, 2024.
English translation of Office Communication issued in Japanese Patent Application No. 2021-557909, dated May 7, 2024.
Imai et al., "Translational Research on the Use of Genetically Modified Human Natural Killer Cells for Refractory Leukemia," KAKEN, Grant-in-Aid for Scientific Research, Project No. 21591349, Project Period: 2009-2012, retrieved from Internet: https://kaken.nii.ac.jp/en/grant/KAKENHI-PROJECT-21591349/, 6 pages, 2014. (English Abstract).
Ding et al., "Signaling pathways in rheumatoid arthritis: implications for targeted therapy," Signal Transduction Target Ther., 8(1):68, 24 pages, 2023.
English translation of Office Communication issued in Russian Patent Application No. 2021131582, dated Jul. 9, 2024.
Gur et al., "LGR5 expressing skin fibroblasts define a major cellular hub perturbed in scleroderma," Cell, 185:1373-1388, 2022.
Kebriaei et al., "Adult Human Mesenchymal Stem Cells Added to Corticosteroid Therapy for the Treatment of Acute Graft-versus-Host Disease," Biol. Blood Marrow Transplant., 15 804-811, 2009.
Locatelli et al., "Graft versus host disease prophylaxis with low-dose cyclosporine-A reduces the risk of relapse in children with acute leukemia given HLA-identical sibling bone marrow transplantation: results of a randomized trial," Blood, 95(5):1572-1579, 2000.
Min et al., "Efficient method for isolation of human umbilical cord mesenchymal stem cells," Chinese Journal of Tissue Engineering Research, 45:8406-8412, 2012.
Office Communication issued in U.S. Appl. No. 17/281,853, dated Jun. 12, 2024.
Volovitz et al., "A non-aggressive, highly efficient, enzymatic method for dissociation of human brain-tumors and brain-tissues to viable single-cells," BMC Neurosci., 17(1):30, 10 pages, 2016.
English summary/translation of Chu, Yi Wei, edited, In: Medical Immunology, Fudan University Press, p. 281, Nov. 2015.
English translation of Office Communication issued in Chinese Patent Application No. 201980089617.6, dated Jan. 26, 2024.
English translation of Office Communication issued in Colombian Patent Application No. NC2020/0015168, dated Jan. 23, 2024.

Messmer et al., "CD48 Stimulation by 2B4 (CD244)-Expressing Targets Activates Human NK Cells," The Journal of Immunology, 176:4646-4650, 2006.
Bajgain et al., "Optimizing the production of suspension cells using the G-Rex "M" series," Methods & Clinical Development, 1:14015, 9 pages, 2014.
Bin et al. edited, "Treatment of Femoral-Head Necrosis by Integrated traditional Chinese and Western Medicine", Shandong Science and Technology Press, publication date: Mar. 2018, p. 33. (Partial English Translation).
Capelli et al., "Clinical grade expansion of MSCs," Immunology Letters, 168(2):222-227, 2015.
Kandoi et al., "Evaluation of platelet lysate as a substitute for FBS in explant and enzymatic isolation methods of human umbilical cord MSCs," Scientific Reports, 8(1):12439, 12 pages, 2018.
Lechanteur et al., "Large-Scale Clinical Expansion of Mesenchymal Stem Cells in the GMP-Compliant, Closed Automated Quantum® Cell Expansion System: Comparison with Expansion in Traditional T-Flasks," J. Stem. Cell. Res. Ther., 4(8):1-11, 2014.
Mazarzaei et al., "Memory and CAR-NK cell-based novel approaches for HIV vaccination and eradication," J. Cell. Physiol., 234(9):14812-14817, 2019.
Rambaldi, "Umbilical Cord Derived Mesenchymal Stromal Cells for the Treatment of Severe Steroid-resitant Graft versus Host Disease (PCT-UC-MSC)," ClinicalTrials.gov identifier: NCT02032446. Updated Jan. 18, 2019. Accessed Nov. 20, 2024. Available at https://clinicaltrials.gov/study/NCT02032446.
Rham et al., "The proinflammatory cytokines IL-2, IL-15 and IL-21 modulate the repertoire of mature human natural killer cell receptors," Arthritis Res. Ther., 9(6):R125, 2007.
The University of Texas MD Anderson Cancer Center, General Donor Information, available at https://www.mdanderson.org/donors-volunteers/other-ways-to-help/give-blood/donation-instructions.html, retrieved from the web on Dec. 10, 2024.
Zhongli et al. edited, "Orthopedic Course of China-Japanese Friendship Hospital," Jilin University Press, publication date: Sep. 2009, p. 194. (Partial English Translation).
Zongliu et al. edited, "Basic and Clinical Applications of Perinatal Adult Stem Cells", Yunnan Science and Technology Press, publication date: Aug. 2018, p. 5. (Partial English Translation).
Office Communication issued in U.S. Appl. No. 17/593,085, dated Aug. 19, 2024.
Reddy et al., "Strategies to Prevent EBV Reactivation and Post-transplant Lymphoproliferative Disorders (PTLD) after Allogeneic Stem Cell Transplantation in High-Risk Patients," Bio. Blood Marrow Transplant., 17:591-597, 2011.
Seo et al., "Current Strategies to Enhance Adipose Stem Cell Function: An Update," Int. J. Mol. Sci., 20:3827, 32 pages, 2019.
Zhang et al., "Exosomes originating from MSCs stimulated with TGF-β and IFN-γ promote Treg differentiation," J. Cell. Physiol., 233:6832-6840, 2018.
Caruana et al., "Boosting in vivo CAR-redirected virus-specific CTLs with universal-artificial antigen presenting cells," Blood, 122(21):4204:2013.
Chu et al., "Genetic Modification of T Cells Redirected toward CS1 Enhances Eradication of Myeloma Cells," Clinical Cancer Research, 20(15):3989-4000, 2014.
Daher et al., "Targeting a cytokine checkpoint enhances the fitness of armored cord blood CAR-NK cells," Blood, 137(5):624-636, 2021.
Extended European Search Report issued in European Patent Application No. 19757670.5, dated Nov. 12, 2021.
Liu et al., "GMP-Compliant Universal Antigen Presenting Cells (uAPC) Promote the Metabolic Fitness and Antitumor Activity of Armored Cord Blood CAR-NK Cells," Frontiers in Immunology, 12:626098, 14 pages, 2021.
Mcardel et al., "Roles of CD48 in regulating immunity and tolerance," Clinical Immunology, 164:10-20, 2016.
Office Communication issued in Russian Patent Application No. 2020130838, dated Apr. 29, 2022.

(56) References Cited

OTHER PUBLICATIONS

Rushworth et al., "Universal Artificial Antigen Presenting Cells to Selectively Propagate T Cells Expressing Chimeric Antigen Receptor Independent of Specificity," Journal of Immunotherapy, 37(4):203-213, 2014.
Search Report issued in Singapore Application No. 11202008008U, dated Jan. 20, 2022.
Suhoski et al., "Engineering artificial antigen-presenting cells to express a diverse array of co-stimulatory molecules," Molecular Therapy, 15(5):981-988, 2007.

* cited by examiner

METHODS FOR ACTIVATION AND EXPANSION OF NATURAL KILLER CELLS AND USES THEREOF

This application is a national phase application under 35 U.S.C. § 371 that claims priority to International Application No. PCT/US2019/019019 filed Feb. 21, 2019, which claims the benefit of U.S. Provisional Patent Application No. 62/633,592, filed Feb. 21, 2018, all of which are incorporated herein by reference in their entirety.

BACKGROUND

1. Field

The present invention relates generally to the fields of medicine and immunology. More particularly, it concerns methods of activating and expanding natural killer (NK) cells and uses thereof.

2. Description of Related Art

Natural killer (NK) cells have been studied as potential anti-tumor effectors, yet a number of barriers limit their therapeutic exploitation, mainly related to their small numbers, requiring ex vivo expansion for adoptive immunotherapy. Cytokine stimulation constitutes an important signal to enhance the functional competency of NK cells to respond to tumor target cells. Furthermore, pre-activation of NK cells overnight with the combination of IL-18, IL-15, and IL-12 has been shown to generates long-lived, memory-like NK cells with enhanced cytokine production upon re-stimulation (Leong et al., 2014). However, studies characterizing the activity of IL-18, IL-15, and IL-12 pre-activated NK cells have used NK cells directly isolated from peripheral blood (PB) without ex vivo expansion, requiring complicated and costly procedures such as leukapheresis to generate adequate numbers for clinical use. Thus, there is an unmet need for an improved strategy to produce highly functional pre-activated NK cells in sufficient number for therapeutic applications.

SUMMARY

Accordingly, certain embodiments of the present disclosure provide methods and compositions concerning the activation and expansion of natural killer (NK) cells and the use thereof for cell therapies.

In a first embodiment, there is provided an in vitro method for expanding NK cells comprising obtaining a population of NK cells; pre-activating the population of NK cells in a pre-activation culture comprising an effective concentration of IL-12, IL-15, and IL-18 to obtain pre-activated NK cells; and expanding the pre-activated NK cells in an expansion culture comprising artificial antigen presenting cells (aAPCs) expressing CD137 ligand, thereby producing expanded NK cells.

In some aspects, the population of NK cells is obtained from cord blood (CB), peripheral blood (PB), stem cells, or bone marrow. In particular aspects, the stem cells are induced pluripotent stem cells. In specific aspects, the isolated population of NK cells is obtained from CB, such as pooled CB. In some aspects, the CB is pooled from 2 or more (e.g., 3, 4, 5, 6, 7, 8, or more) individual cord blood units. In certain aspects, the isolated population of NK cells are CB mononuclear cells (CBMCs). In some aspects, the isolated population of NK cells are further defined as $CD56^+$ NK cells.

In certain aspects, the aAPCs further express a membrane-bound cytokine. In some aspects, the membrane-bound cytokine is membrane-bound IL-21 (mIL-21) or membrane-bound IL-15 (mIL-15). In some aspects, the membrane-bound cytokine is mIL-21. In some aspects, the aAPCs have essentially no expression of endogenous HLA class I, II, or CD1d molecules. In certain aspects, the aAPCs express ICAM-1 (CD54) and LFA-3 (CD58). In some aspects, the aAPCs are further defined as leukemia cell-derived aAPCs. In certain aspects, the leukemia-cell derived aAPCs are further defined as K562 cells engineered to express CD137 ligand and/or mIL-21. In some aspects, the K562 cells are engineered to express CD137 ligand and mIL-21. In certain aspects, engineered is further defined as retroviral transduction. In particular aspects, the aAPCs are irradiated.

In some aspects, the pre-activating step is for 10-20 hours, such as 14-18 hours (e.g., about 14, 15, 16, 17, or 18 hours), particularly about 16 hours. In certain aspects, the pre-activation culture comprises IL-18 and/or IL-15 at a concentration of 10-100 ng/mL, such as 40-60 ng/mL, particularly about 50 ng/mL. In some aspects, the pre-activation culture comprises IL-12 at a concentration of 0.1-150 ng/mL, such as 1-20 ng/mL, particularly about 10 ng/mL.

In certain aspects, the method further comprises washing the pre-activated NK cells prior to expanding. In some aspects, washing is performed multiple times, such as 2, 3, or 4 times.

In some aspects, expanding is for 5-20 days, such as 12-16 days (e.g., 12, 13, 14, 15, or 16 days), particularly about 14 days. In certain aspects, the pre-activated NK cells and aAPCs are present in the expansion culture at a ratio of 3:1 to 1:3. In specific aspects, the pre-activated NK cells and aAPCs are present in the expansion culture at a ratio of about 1:2.

In additional aspects, the expansion culture further comprises IL-2. In some aspects, the IL-2 is present at a concentration of 10-500 U/mL, such as 100-300 U/mL, particularly about 200 U/mL. In some aspects, the IL-12, IL-18, IL-15, and/or IL-2 is recombinant human IL-2. In some aspects, the IL-2 is replenished in the expansion culture every 2-3 days. In some aspects, the aAPCs are added to the expansion culture at least a second time. In some aspects, the method is performed in serum-free media.

In further aspects, the NK cells are engineered to express a chimeric antigen receptor (CAR). In some aspects, the CAR comprises a CD19, CD123, mesothelin, CD5, CD47, CLL-1, CD33, CD99, U5snRNP200, CD200, CS1, BAFF-R, ROR-1, or BCMA antigen-binding domain. In some aspects, the CAR comprises a humanized antigen-binding domain. In some aspects, the CAR comprises IL-15. In some aspects, the CAR comprises a suicide gene. In specific aspects, the suicide gene is CD20, CD52, EGFRv3, or inducible caspase 9.

Further embodiments provide populations of expanded NK cells produced according to the embodiments (e.g., obtaining an isolated population of NK cells; pre-activating the isolated population of NK cells in a pre-activation culture comprising an effective concentration of IL-12, IL-15, and IL-18 to obtain pre-activated NK cells; and expanding the pre-activated NK cells in an expansion culture comprising artificial antigen presenting cells (aAPCs) expressing CD137 ligand, thereby producing expanded NK cells). Also provided herein is a pharmaceutical composition comprising the population of expanded NK cells of the embodiments and a pharmaceutically acceptable carrier.

In another embodiment, there is provided a composition comprising an effective amount of the expanded NK cells of the embodiments (e.g., obtaining an isolated population of NK cells; pre-activating the isolated population of NK cells in a pre-activation culture comprising an effective concentration of IL-12, IL-15, and IL-18 to obtain pre-activated NK cells; and expanding the pre-activated NK cells in an expansion culture comprising artificial antigen presenting cells (aAPCs) expressing CD137 ligand, thereby producing expanded NK cells) for use in the treatment of a disease or disorder in a subject.

Further provided herein is method of treating a disease or disorder in a subject comprising administering a therapeutically effective amount of the expanded NK cells of the embodiments to the subject.

In some aspects of the above embodiments, the disease or disorder is cancer, inflammation, graft versus host disease, transplant rejection, an autoimmune disorder, an immunodeficiency disease, a B cell malignancy, or an infection. In some aspects, the cancer is a leukemia. In certain aspects, the leukemia is an acute lymphoblastic leukemia (ALL), chronic lymphocytic leukemia (CLL), acute myelogenous leukemia (AML), or a chronic myelogenous leukemia (CIVIL).

In some aspects, the NK cells are allogeneic. In other aspects, the NK cells are autologous. In certain aspects, the subject is a human.

In certain aspects, the disorder is graft versus host disease (GVHD). In some aspects, the disorder is multiple sclerosis, inflammatory bowel disease, rheumatoid arthritis, type I diabetes, systemic lupus erythrematosus, contact hypersensitivity, asthma or Sjogren's syndrome.

In some aspects, the method further comprises administering at least a second therapeutic agent. In certain aspects, the at least a second therapeutic agent is a therapeutically effective amount of an anti-cancer agent, immunomodulatory agent, or an immunosuppressive agent. In some aspects, the anti-cancer agent is chemotherapy, radiotherapy, gene therapy, surgery, hormonal therapy, anti-angiogenic therapy or immunotherapy. In specific aspects, the immunosuppressive agent is a calcineurin inhibitor, an mTOR inhibitor, an antibody, a chemotherapeutic agent irradiation, a chemokine, an interleukins or an inhibitor of a chemokine or an interleukin.

In certain aspects, the NK cells and/or the at least a second therapeutic agent are administered intravenously, intraperitoneally, intratracheally, intratumorally, intramuscularly, endoscopically, intralesionally, percutaneously, subcutaneously, regionally, or by direct injection or perfusion.

In some aspects, the second therapeutic agent is an antibody. In particular aspects, the antibody if a monoclonal, bispecific, or trispecific antibody. In some aspects, the antibody is a monoclonal antibody. In one specific aspect, the antibody is rituximab.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present disclosure. The present disclosure may be better understood by reference to one or more of these drawings in combination with the detailed description of specific embodiments presented herein.

(FIG. 1D) Histograms summarize data from multiple independent experiments. CB-NK cells that were pre-activated for 16 hrs (with IL-2, IL-18 and IL-15) and expanded for 7 days (7 different CB units) or 14 days (6 different CB units) express more IFNγ and TNF-α in response to K562 targets compared to NK cells that were expanded but not pre-activated. (FIG. 1E) CB-NK cells that were pre-activated and expanded express more CD107a, IFNγ and TNF-α in response to stimulation with Raji targets compared to CB-NK cells that were expanded (but not pre-activated). (FIG. 1F) Histogram summarizes data from multiple independent experiments. CB-NK cells that were pre-activated for 16 hrs (with IL-2, IL-18 and IL-15) and expanded for 14 days (4 different CB units) express significantly more IFNγ in response to Raji targets compared to NK cells that were expanded but not pre-activated.

(FIG. 2A) $^{51}$Chromium release assay with CB-NK cells against K562 cells at Day 7 post-expansion. CB-NK cells that were pre-activated for 16 hrs (with IL-2, IL-18 and IL-15) and expanded for 7 days (7 different CB units) kill K562 targets significantly more efficiently compared to NK cells that were expanded but not pre-activated. (FIG. 2B) $^{51}$Chromium release assay with expanded CB-NK cells against Raji cells. CB-NK cells that were pre-activated for 16 hrs (with IL-2, IL-18 and IL-15) and expanded for 7 days (5 different CB units) or 14 days (3 different CB units) kill Raji targets more efficiently than NK cells that were expanded but not pre-activated. (FIG. 2C) $^{51}$Chromium release assays of expanded CB-NK cells against acute myeloid leukemia (AML) cell lines including MOLM14, MOLM13, and THP-1. CB-NK cells that were pre-activated for 16 hrs (with IL-2, IL-18 and IL-15) and expanded kill AML targets more efficiently than NK cells that were expanded but not pre-activated.

(FIG. 4A) Pre-activated+expanded CB-NK cells transduced to express a chimeric antigen receptor (CAR) against CD19 (CB-NK CAR 19) kill Raji targets more efficiently at all effector-to-target ratios when compared with controls. Expanded CB-NK CAR CD19, pre-activated+expanded non-transduced NK cells or expanded non-transduced NK cells. (FIGS. 4B-C) Similarly, pre-activated+expanded CB-NK cells transduced to express a chimeric antigen receptor against CD123 (CB-NK CAR.CD123) kill AML targets (MOLM14) more efficiently when compared with expanded CB-NK CAR.CD123 cells as assessed by $^{51}$Cr release assay (FIG. 4B) and their ability to express CD107a, IFNγ and TNF-α in response to MOLM14 targets (FIG. 4C).

DESCRIPTION OF ILLUSTRATIVE EMBODIMENTS

Figure 1A:
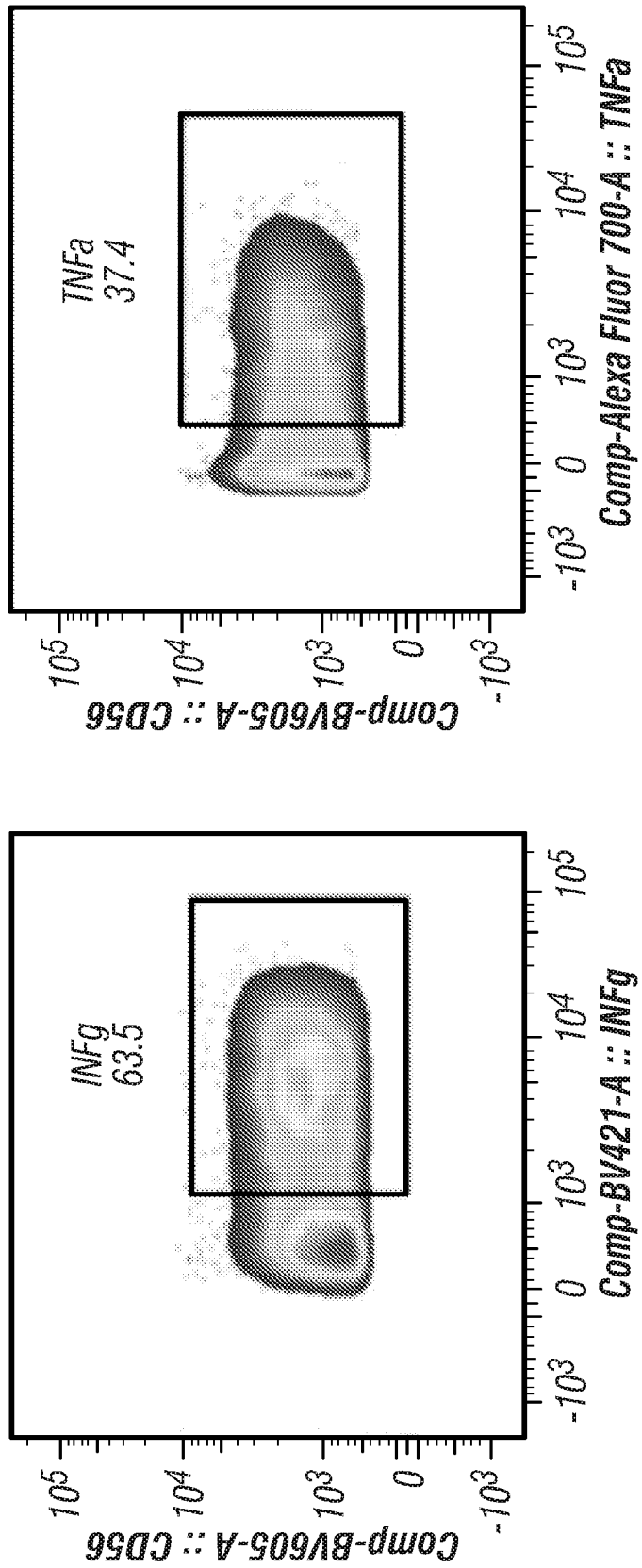
FIGS. 1A-1F: CB-NK cells that were pre-activated for 16 hrs (with IL-2, IL-18 and IL-15) and expanded for 7 days (FIG. 1A), 14 days (FIG. 1B) or 21 days (FIG. 1C) produced more IFNγ and TNF-α in response to stimulation with K562 targets compared to CB-NK cells that were expanded (but not pre-activated) for 7, 14 or 21 days, respectively.
Figure 1A:
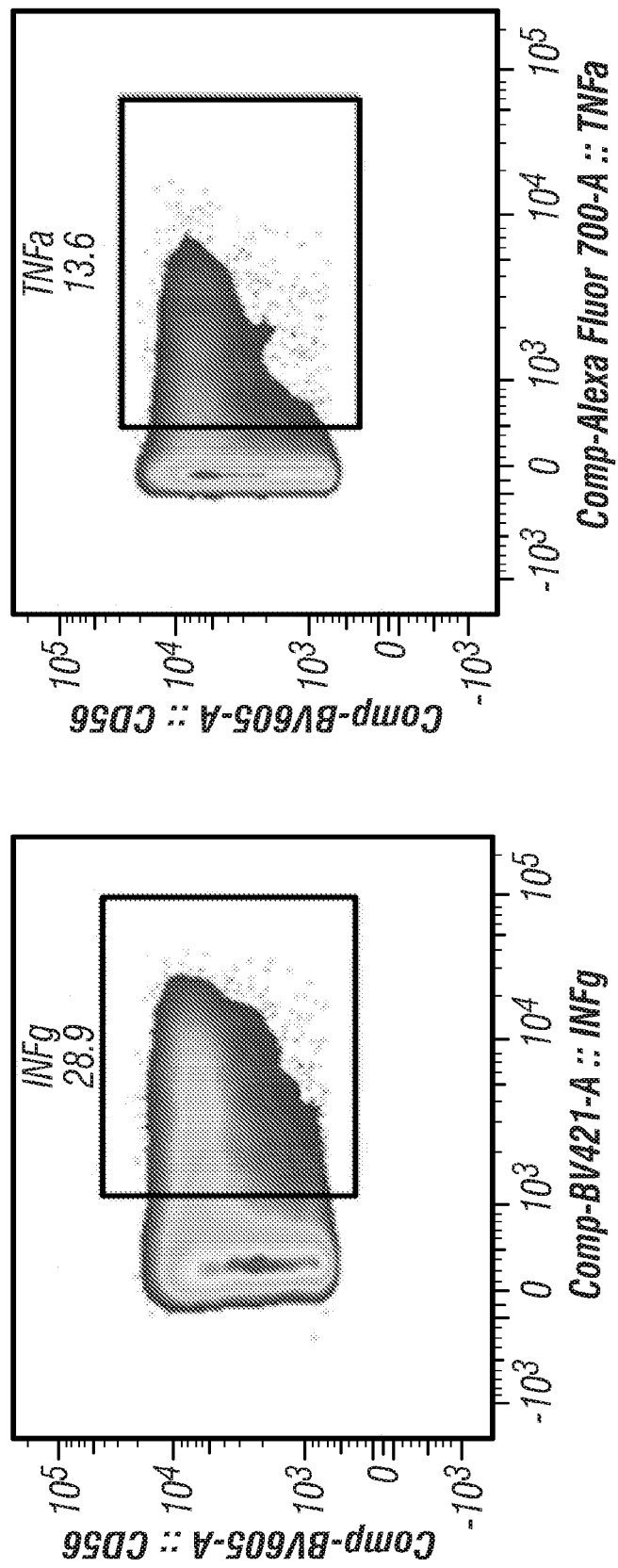
Figure 1B:
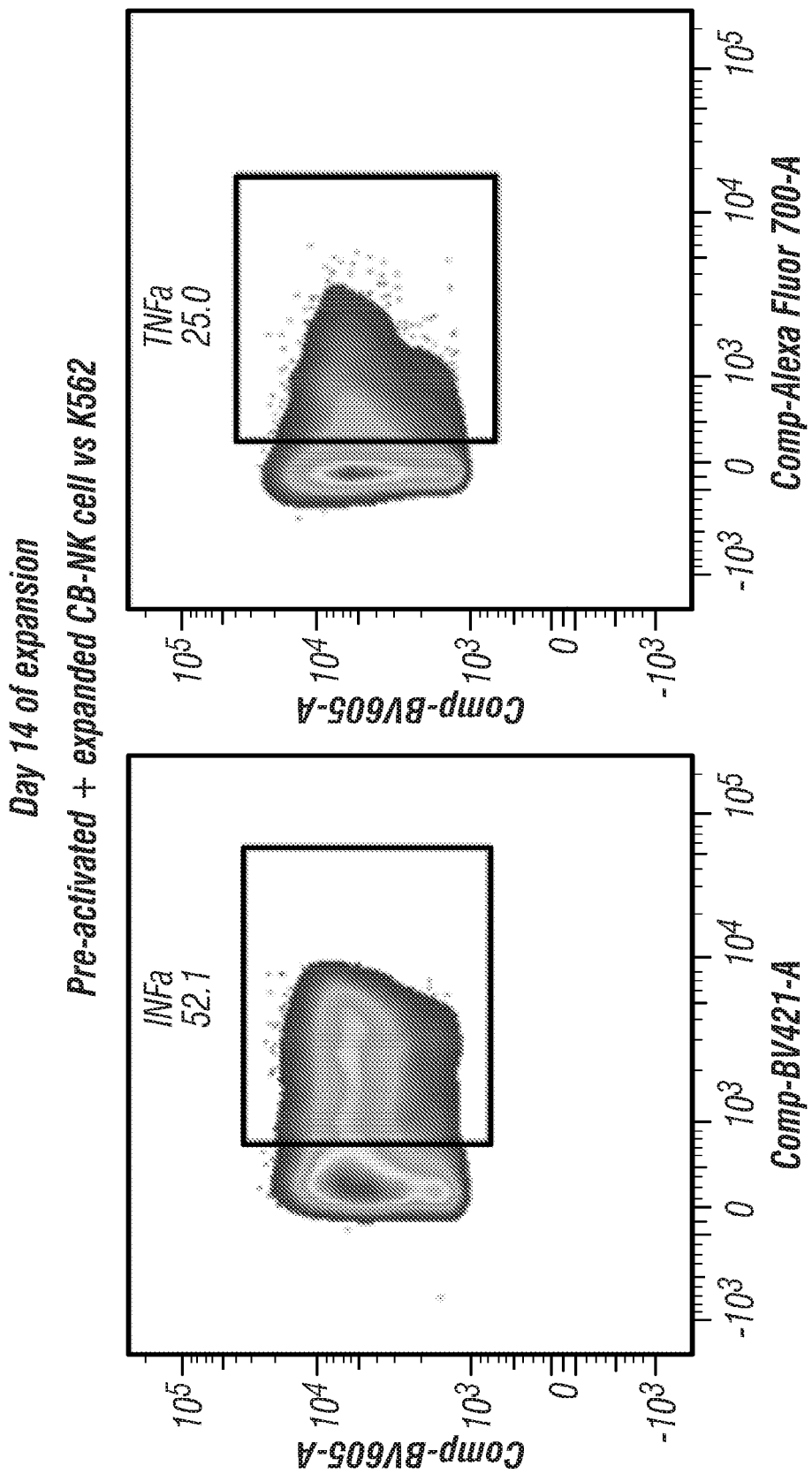
Figure 1B:
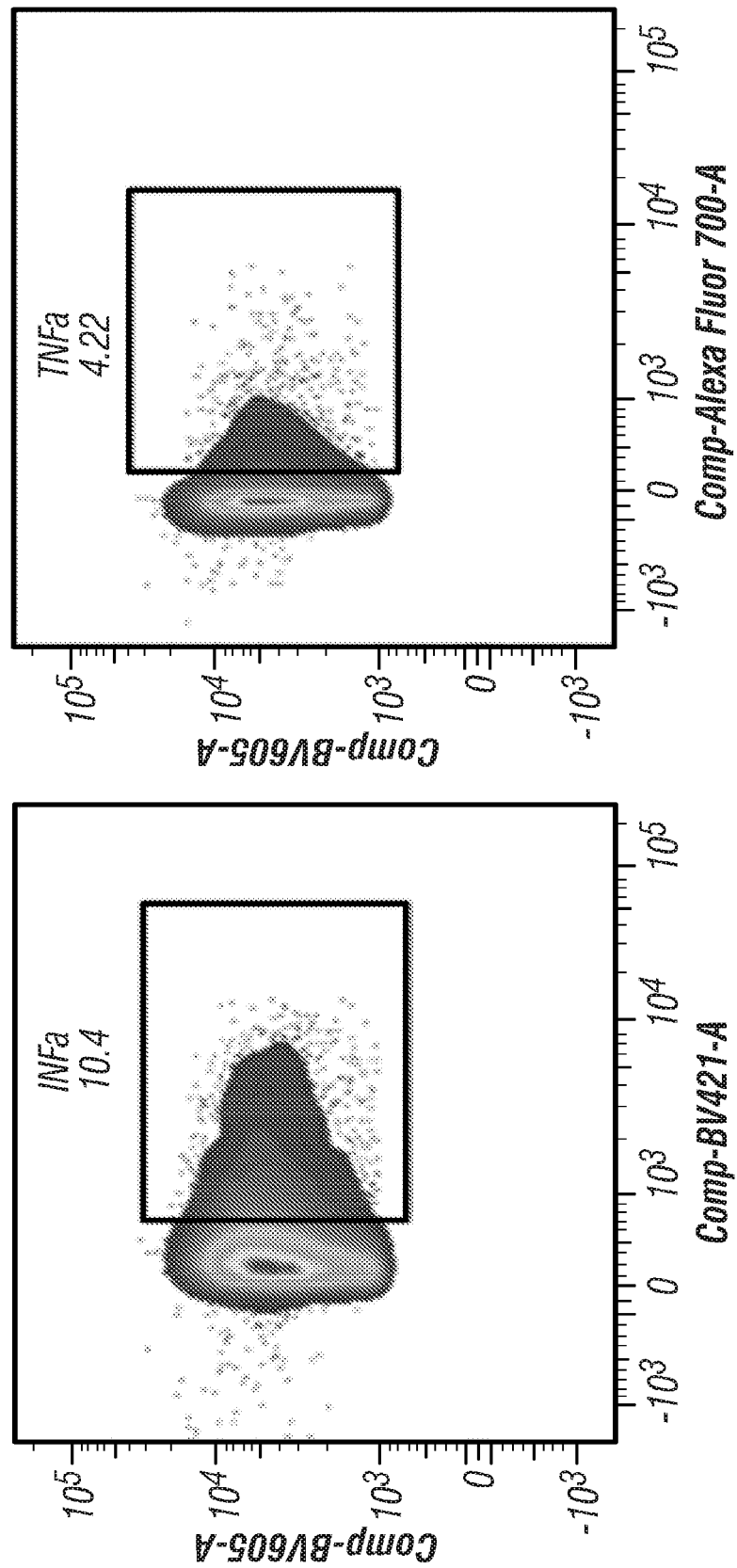
Figure 1C:
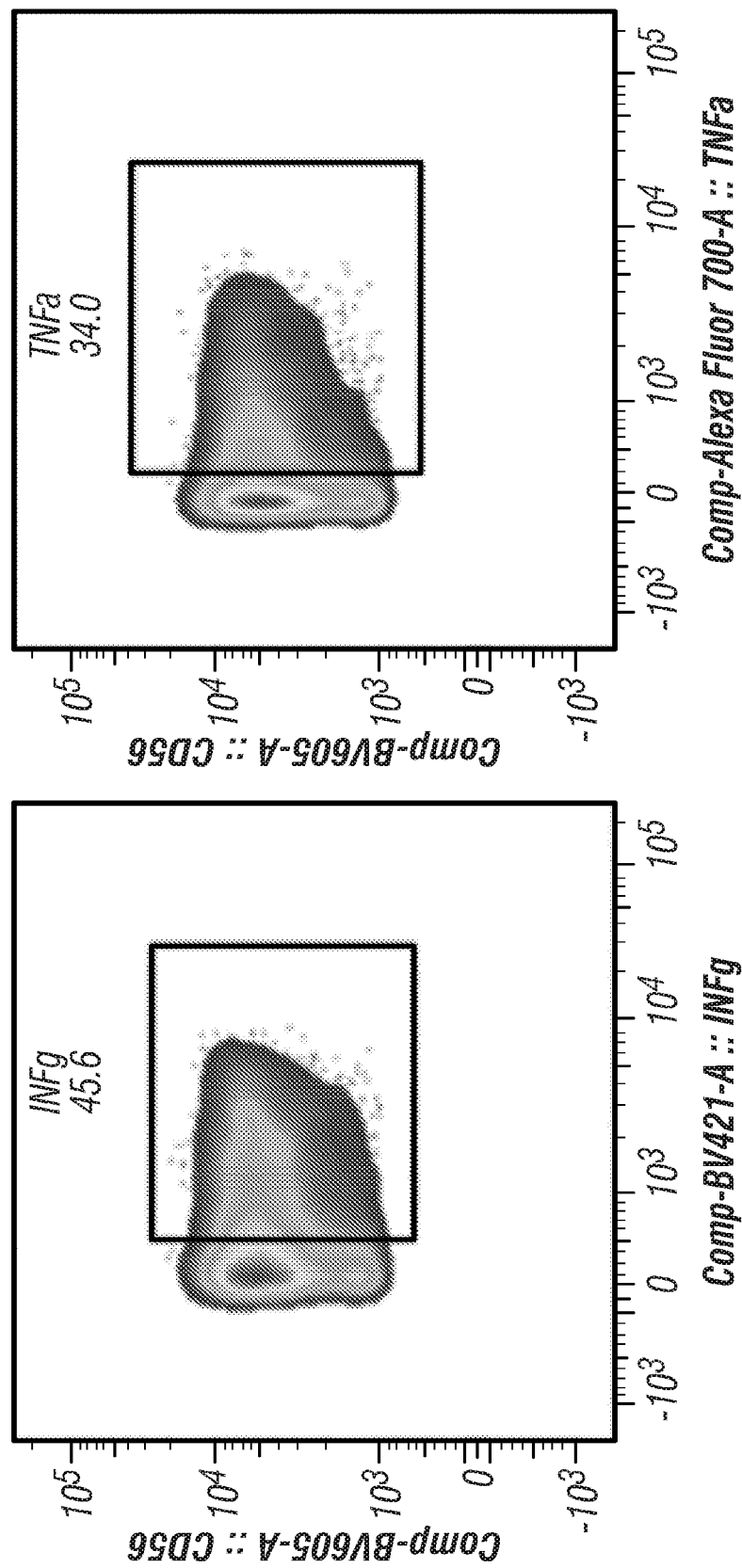
Figure 1C:
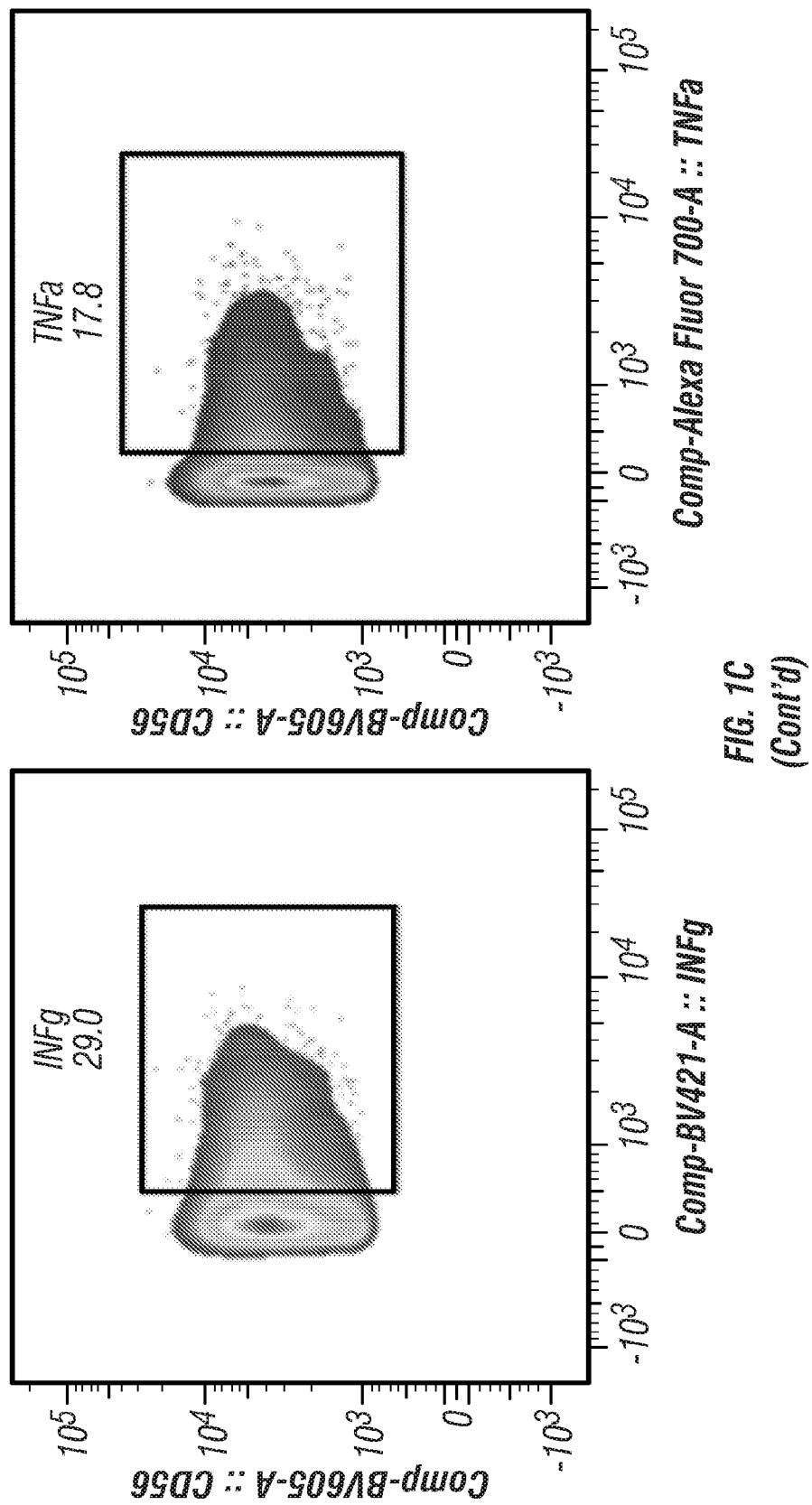
Figure 1D:
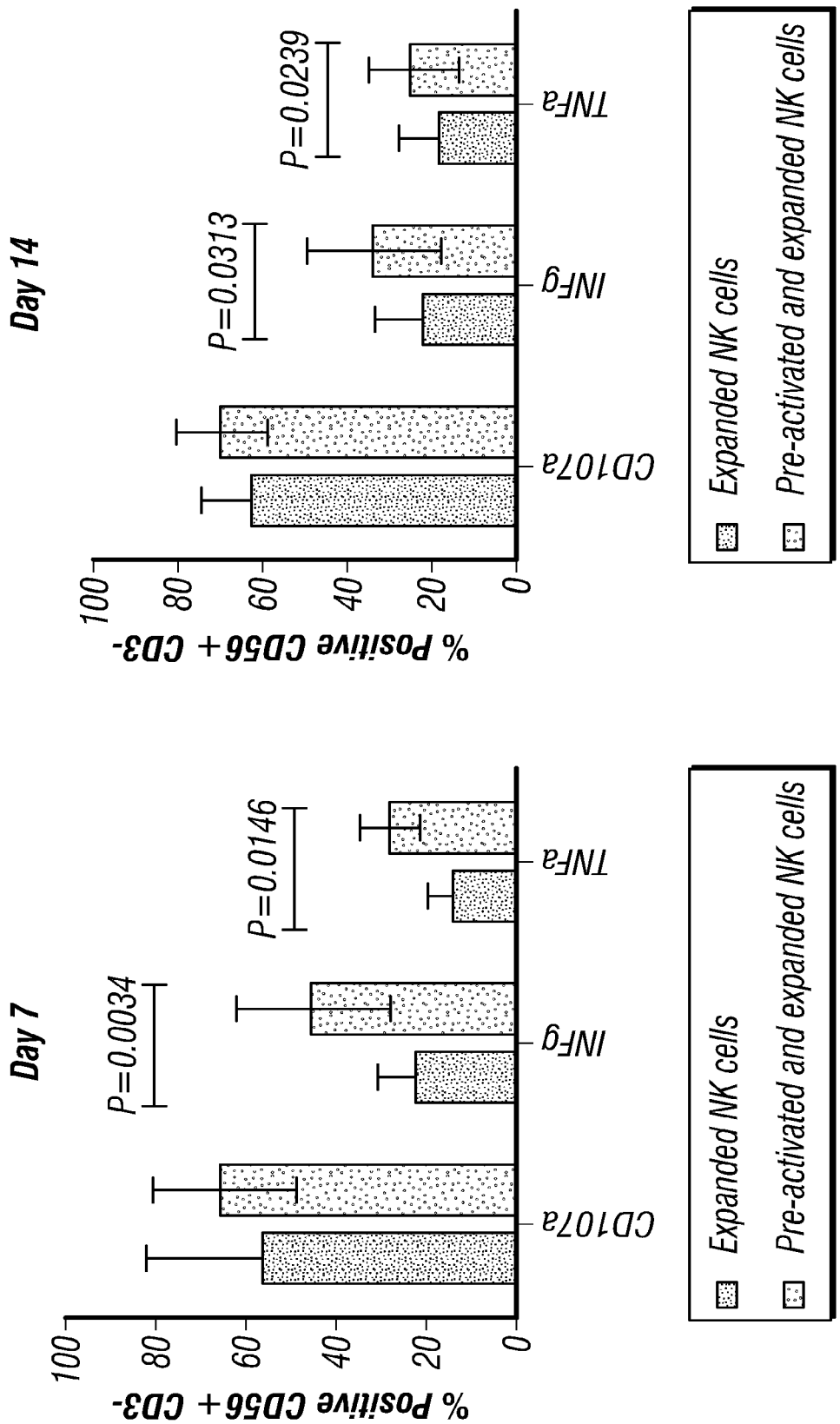

NK cells are emerging as an exciting source of cellular immunotherapy for patients with malignant hematologic disease as well as solid tumors; however, most studies using adoptively transferred NK cells have been limited by inadequate persistence, poor in vivo expansion and disappointing anti-tumor activity of the infused cells. Thus, a barrier to overcome in the field of NK immunotherapy is the need for biology-driven approaches to increase NK cell antitumor functionality before adoptive therapy.

Accordingly, in certain embodiments, the present disclosure provides methods for the large-scale "off-the-shelf" production of NK cells, such as from cord blood (CB-NK), peripheral blood (PB-NK), or bone marrow. In an exemplary method, the isolated NK cells may be subjected to a brief period, such as about 16 hours, of pre-activation with a combination of cytokines, such as interleukin-12 (IL-12), IL-15, and/or IL-18, followed by expansion using artificial antigen presenting cells (aAPCs), such as K562 feeder cells expressing membrane-bound IL-21 and CD137 ligand. The expansion may be performed in the presence of exogenous IL-2.

The present studies showed that the pre-activated and expanded NK cells produced by the present methods exhibited enhanced anti-tumor functionality against leukemia and lymphoma cell lines. Pre-activated and expanded NK cells also displayed enhanced antibody-dependent cellular cytotoxicity (ADCC).

The NK cells may be genetically modified with a chimeric antigen receptor (CAR) against tumor targets, resulting in superior killing and cytokine production when compared with expanded CAR-NK without pre-stimulation.

The NK cells pre-activated with IL-12, IL15, and IL-18 followed by expansion with aAPCs, such as K562 cells expressing mIL-21 and CD137 ligand, can provide a highly potent cellular product. Thus, methods are provided using the present NK cells for the treatment of various diseases, such as immunotherapy of patients with cancer. The methods of treatment may comprise additional therapeutic agents, such as monoclonal, bispecific and trispecific antibodies. The antibodies may bind CD16 or other receptors on NK cells and redirect cells to a target, thus increasing the response against different tumors.

I. DEFINITIONS

As used herein, "essentially free," in terms of a specified component, is used herein to mean that none of the specified component has been purposefully formulated into a composition and/or is present only as a contaminant or in trace amounts. The total amount of the specified component resulting from any unintended contamination of a composition is therefore well below 0.05%, preferably below 0.01%. Most preferred is a composition in which no amount of the specified component can be detected with standard analytical methods.

As used herein the specification, "a" or "an" may mean one or more. As used herein in the claim(s), when used in conjunction with the word "comprising," the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more. The terms "about", "substantially" and "approximately" mean, in general, the stated value plus or minus 5%.

The term "antigen presenting cells (APCs)" refers to a class of cells capable of presenting one or more antigens in the form of a peptide-MEC complex recognizable by specific effector cells of the immune system, and thereby inducing an effective cellular immune response against the antigen or antigens being presented. The term "APC" encompasses intact whole cells such as macrophages, B-cells, endothelial cells, activated T-cells, and dendritic cells, or molecules, naturally occurring or synthetic capable of presenting antigen, such as purified MEC Class I molecules complexed to ÿ2-microglobulin.

An "immune disorder," "immune-related disorder," or "immune-mediated disorder" refers to a disorder in which the immune response plays a key role in the development or progression of the disease. Immune-mediated disorders include autoimmune disorders, allograft rejection, graft versus host disease and inflammatory and allergic conditions.

An "immune response" is a response of a cell of the immune system, such as a B cell, or a T cell, or innate immune cell to a stimulus. In one embodiment, the response is specific for a particular antigen (an "antigen-specific response").

An "autoimmune disease" refers to a disease in which the immune system produces an immune response (for example, a B cell or a T cell response) against an antigen that is part of the normal host (that is, an autoantigen), with consequent injury to tissues. An autoantigen may be derived from a host cell, or may be derived from a commensal organism such as the micro-organisms (known as commensal organisms) that normally colonize mucosal surfaces.

"Treating" or treatment of a disease or condition refers to executing a protocol, which may include administering one or more drugs to a patient, in an effort to alleviate signs or symptoms of the disease. Desirable effects of treatment include decreasing the rate of disease progression, ameliorating or palliating the disease state, and remission or improved prognosis. Alleviation can occur prior to signs or symptoms of the disease or condition appearing, as well as after their appearance. Thus, "treating" or "treatment" may include "preventing" or "prevention" of disease or undesirable condition. In addition, "treating" or "treatment" does not require complete alleviation of signs or symptoms, does not require a cure, and specifically includes protocols that have only a marginal effect on the patient.

The term "therapeutic benefit" or "therapeutically effective" as used throughout this application refers to anything that promotes or enhances the well-being of the subject with respect to the medical treatment of this condition. This includes, but is not limited to, a reduction in the frequency or severity of the signs or symptoms of a disease. For example, treatment of cancer may involve, for example, a reduction in the size of a tumor, a reduction in the invasiveness of a tumor, reduction in the growth rate of the cancer, or prevention of metastasis. Treatment of cancer may also refer to prolonging survival of a subject with cancer.

"Subject" and "patient" refer to either a human or non-human, such as primates, mammals, and vertebrates. In particular embodiments, the subject is a human.

The phrases "pharmaceutical or pharmacologically acceptable" refers to molecular entities and compositions that do not produce an adverse, allergic, or other untoward reaction when administered to an animal, such as a human, as appropriate. The preparation of a pharmaceutical composition comprising an antibody or additional active ingredient will be known to those of skill in the art in light of the present disclosure. Moreover, for animal (e.g., human) administration, it will be understood that preparations should meet sterility, pyrogenicity, general safety, and purity standards as required by FDA Office of Biological Standards.

As used herein, "pharmaceutically acceptable carrier" includes any and all aqueous solvents (e.g., water, alcoholic/aqueous solutions, saline solutions, parenteral vehicles, such as sodium chloride, Ringer's dextrose, etc.), non-aqueous solvents (e.g., propylene glycol, polyethylene glycol, vegetable oil, and injectable organic esters, such as ethyloleate), dispersion media, coatings, surfactants, antioxidants, preservatives (e.g., antibacterial or antifungal agents, anti-oxidants, chelating agents, and inert gases), isotonic agents, absorption delaying agents, salts, drugs, drug stabilizers, gels, binders, excipients, disintegration agents, lubricants, sweetening agents, flavoring agents, dyes, fluid and nutrient replenishers, such like materials and combinations thereof, as would be known to one of ordinary skill in the art. The pH and exact concentration of the various components in a pharmaceutical composition are adjusted according to well-known parameters.

The term "haplotyping or tissue typing" refers to a method used to identify the haplotype or tissue types of a subject, for example by determining which HLA locus (or loci) is expressed on the lymphocytes of a particular subject. The HLA genes are located in the major histocompatibility complex (MHC), a region on the short arm of chromosome 6, and are involved in cell-cell interaction, immune response, organ transplantation, development of cancer, and susceptibility to disease. There are six genetic loci important in transplantation, designated HLA-A, HLA-B, HLA-C, and HLA-DR, HLA-DP and HLA-DQ. At each locus, there can be any of several different alleles.

A widely used method for haplotyping uses the polymerase chain reaction (PCR) to compare the DNA of the subject, with known segments of the genes encoding MHC antigens. The variability of these regions of the genes determines the tissue type or haplotype of the subject. Serologic methods are also used to detect serologically defined antigens on the surfaces of cells. HLA-A, -B, and -C determinants can be measured by known serologic techniques. Briefly, lymphocytes from the subject (isolated from fresh peripheral blood) are incubated with antisera that recognize all known HLA antigens. The cells are spread in a tray with microscopic wells containing various kinds of antisera. The cells are incubated for 30 minutes, followed by an additional 60-minute complement incubation. If the lymphocytes have on their surfaces antigens recognized by the antibodies in the antiserum, the lymphocytes are lysed. A dye can be added to show changes in the permeability of the cell membrane and cell death. The pattern of cells destroyed by lysis indicates the degree of histologic incompatibility. If, for example, the lymphocytes from a person being tested for HLA-A3 are destroyed in a well containing antisera for HLA-A3, the test is positive for this antigen group.

II. NATURAL KILLER (NK) CELLS

Some embodiments of the present disclosure concern the isolation, activation, and expansion of NK cells, such as for cancer immunotherapy.

In certain embodiments, NK cells are derived from human peripheral blood mononuclear cells (PBMC), unstimulated leukapheresis products (PBSC), human embryonic stem cells (hESCs), induced pluripotent stem cells (iPSCs), bone marrow, or umbilical cord blood by methods well known in the art. Specifically, the NK cells may be isolated from cord blood (CB), peripheral blood (PB), bone marrow, or stem cells. In particular embodiments, the NK cells are isolated from pooled CB. The CB may be pooled from 2, 3, 4, 5, 6, 7, 8, 9, 10, or more units. The NK cells may be autologous or allogeneic. The isolated NK cells may be haplotype matched for the subject to be administered the cell therapy. NK cells can be detected by specific surface markers, such as CD16, CD56, and CD8 in humans.

In certain aspects, the NK cells are isolated by the previously described method of ex vivo expansion of NK cells (Spanholtz et al., 2011; Shah et al., 2013). In this method, CB mononuclear cells are isolated by ficoll density gradient centrifugation. The cell culture may be depleted of any cells expressing CD3 and may be characterized to determine the percentage of $CD56^+/CD3^-$ cells or NK cells. In other methods, umbilical CB is used to derive NK cells by the isolation of $CD34^+$ cells.

Pre-activation of the NK cells may comprise culturing the isolated NK cells in the presence of one or more cytokines. The NK cells may be stimulated with IL-2, or other cytokines that bind the common gamma-chain (e.g., IL-7, IL-12, IL-15, IL-21, and others). In particular embodiments, the pre-activation cytokines may be IL-12, IL-15, and IL-18. One or more additional cytokines may be used for the pre-activation step. The pre-activation may be for a short period of time such as 5-72 hours, such as 10-50 hours, particularly 10-20 hours, such as 12, 13, 14, 15, 16, 17, 18, 19, or 20 hours, specifically about 16 hours. The pre-activation culture may comprise IL-18 and/or IL-15 at a concentration of 10-100 ng/mL, such as 40-60 ng/mL, particular 45, 46, 47, 48, 49, 50, 51, 52, 53, 54, or 55 ng/mL, specifically about 50 ng/mL. The pre-activation culture may comprise IL-12 at a concentration of 0.1-150 ng/mL, such as 0.5-50 ng/mL, particularly 1-20 ng/mL, such as 2, 3, 4, 5, 6, 7, 8, 9, 10, 11, 12, 13, 14, or 15 ng/mL, specifically about 10 ng/mL.

The pre-activated NK cells may then be expanded in the presence of artificial antigen presenting cells (aAPCs). The pre-activated NK cells may be washed prior to expansion, such as 2, 3, 4, or 5 times, specifically 3 times. The aAPCs may be engineered to express CD137 ligand and/or a membrane-bound cytokine. The membrane-bound cytokine may be membrane-bound IL-21 (mIL-21) or membrane-bound IL-15 (mIL-15). In particular embodiments, the aAPCs are engineered to express CD137 ligand and mIL-21. The aAPCs may be derived from cancer cells, such as leukemia cells. The aAPCs may not express endogenous HLA class I, II, or CD1d molecules. They may express ICAM-1 (CD54) and LFA-3 (CD58). In particular, the aAPCs may be K562 cells, such as K562 cells engineered to express CD137 ligand and mIL-21. The aAPCs may be irradiated. The engineering may be by any method known in the art, such as retroviral transduction. The expansion may be for about 2-30 days, such as 3-20 days, particularly 12-16 days, such as 12, 13, 14, 15, 16, 17, 18, or 19 days, specifically about 14 days. The pre-activated NK cells and aAPCs may be present at a ratio of about 3:1-1:3, such as 2:1, 1:1, 1:2, specifically about 1:2. The expansion culture may further comprise cytokines to promote expansion, such as IL-2. The IL-2 may be present at a concentration of about 10-500 U/mL, such as 100-300 U/mL, particularly about 200 U/mL. The IL-2 may be replenished in the expansion culture, such as every 2-3 days. The aAPCs may be added to the culture at least a second time, such as at about 7 days of expansion.

The cytokine used in the pre-activation and/or expansion steps may be recombinant human cytokines.

Following expansion, the NK cells may be immediately infused or may be stored, such as by cryopreservation. In certain aspects, the cells may be propagated for days, weeks, or months ex vivo as a bulk population within about 1, 2, 3, 4, or 5 days.

Activated and/or expanded NK cells can secrete type I cytokines, such as interferon-γ, tumor necrosis factor-a and granulocyte-macrophage colony-stimulating factor (GM-CSF), which activate both innate and adaptive immune cells as well as other cytokines and chemokines. The measurement of these cytokines can be used to determine the activation status of NK cells. In addition, other methods known in the art for determination of NK cell activation may be used for characterization of the NK cells of the present disclosure.

A. Chimeric Antigen Receptors

In certain embodiments, the present NK cells are genetically modified to express a chimeric antigen receptor. In some embodiments, the chimeric antigen receptor comprises: a) an intracellular signaling domain, b) a transmembrane domain, and c) an extracellular domain comprising an antigen binding region.

A CAR recognizes cell-surface tumor-associated antigen independent of human leukocyte antigen (HLA) and employs one or more signaling molecules to activate genetically modified NK cells for killing, proliferation, and cytokine production (Jena et al., 2010). In certain embodiments, the platform technologies disclosed herein to genetically modify NK cells comprise (i) non-viral gene transfer using an electroporation device (e.g., a nucleofector), (ii) CARs that signal through endodomains (e.g., CD28/CD3-ζ, CD137/CD3-ζ, or other combinations), (iii) CARs with variable lengths of extracellular domains connecting the antigen-recognition domain to the cell surface, and, in some cases, (iv) artificial antigen presenting cells (aAPC) derived from K562 to be able to robustly and numerically expand CAR$^+$ NK cells (Singh et al., 2008; Singh et al., 2011).

Embodiments of the present disclosure concern the use of nucleic acids, including nucleic acids encoding an antigen-specific chimeric antigen receptor (CAR) polypeptide, including a CAR that has been humanized to reduce immunogenicity (hCAR), comprising an intracellular signaling domain, a transmembrane domain, and an extracellular domain comprising one or more signaling motifs. In certain embodiments, the CAR may recognize an epitope comprising the shared space between one or more antigens. In certain embodiments, the binding region can comprise complementary determining regions of a monoclonal antibody, variable regions of a monoclonal antibody, and/or antigen binding fragments thereof. In another embodiment, that specificity is derived from a peptide (e.g., cytokine) that binds to a receptor.

It is contemplated that the human CAR nucleic acids may be human genes used to enhance cellular immunotherapy for human patients. In a specific embodiment, the present disclosure provides a full-length CAR cDNA or coding region. The antigen binding regions or domain can comprise a fragment of the VH and VL chains of a single-chain variable fragment (scFv) derived from a particular human monoclonal antibody, such as those described in U.S. Pat. No. 7,109,304, incorporated herein by reference. The fragment can also be any number of different antigen binding domains of a human antigen-specific antibody. In a more specific embodiment, the fragment is an antigen-specific scFv encoded by a sequence that is optimized for human codon usage for expression in human cells.

The arrangement could be multimeric, such as a diabody or multimers. The multimers are most likely formed by cross pairing of the variable portion of the light and heavy chains into a diabody. The hinge portion of the construct can have multiple alternatives from being totally deleted, to having the first cysteine maintained, to a proline rather than a serine substitution, to being truncated up to the first cysteine. The Fc portion can be deleted. Any protein that is stable and/or dimerizes can serve this purpose. One of the Fc domains, e.g., either the CH2 or CH3 domain from human immunoglobulin may be used. The hinge, CH2 and CH3 region of a human immunoglobulin that has been modified to improve dimerization may be used. In other aspects, just the hinge portion of an immunoglobulin or portions of CD8a may be used.

In some embodiments, the CAR nucleic acid comprises a sequence encoding other costimulatory receptors, such as a transmembrane domain and a modified CD28 intracellular signaling domain. Other costimulatory receptors include, but are not limited to one or more of CD28, CD27, OX-40 (CD134), DAP10, and 4-1BB (CD137). In addition to a primary signal initiated by CD3ζ, an additional signal provided by a human costimulatory receptor inserted in a human CAR is important for full activation of NK cells and could help improve in vivo persistence and the therapeutic success of the adoptive immunotherapy.

The intracellular signaling domain of a chimeric antigen receptor is responsible for activation of at least one of the normal effector functions of the immune cell in which the chimeric antigen receptor has been placed. The term "effector function" refers to a specialized function of a differentiated cell, such as a NK cell. In specific embodiments, intracellular receptor signaling domains in the CAR include those of the T-cell antigen receptor complex, such as the zeta chain of CD3, also Fcγ RIII costimulatory signaling domains, CD28, CD27, DAP10, CD137, OX40, CD2, alone or in a series with CD3zeta, for example. In specific embodiments, the intracellular domain (which may be referred to as the cytoplasmic domain) comprises part or all of one or more of TCR zeta chain, CD28, CD27, OX40/CD134, 4-1BB/CD137, FcεRIγ, ICOS/CD278, IL-2Rbeta/CD122, IL-2Ralpha/CD132, DAP10, DAP12, and CD40. In some embodiments, one employs any part of the endogenous T-cell receptor complex in the intracellular domain. One or multiple cytoplasmic domains may be employed, as so-called third generation CARs have at least two or three signaling domains fused together for additive or synergistic effect, for example.

In certain embodiments of the chimeric antigen receptor, the antigen-specific portion of the receptor (which may be referred to as an extracellular domain comprising an antigen binding region) comprises a tumor associated antigen or a pathogen-specific antigen binding domain. Antigens include carbohydrate antigens recognized by pattern-recognition receptors, such as Dectin-1. A tumor associated antigen may be of any kind so long as it is expressed on the cell surface of tumor cells. Exemplary embodiments of tumor associated antigens include CD19, CD20, carcinoembryonic antigen, alphafetoprotein, CA-125, MUC-1, CD56, EGFR, c-Met, AKT, Her2, Her3, epithelial tumor antigen, melanoma-associated antigen, mutated p53, and mutated ras. Additional exemplary antigens include CD99, CLL-1, CD47, CD33, CS1, and BCMA.

In certain embodiments, the CAR may be co-expressed with a cytokine to improve persistence when there is a low amount of tumor-associated antigen. For example, CAR may be co-expressed with IL-15.

The sequence of the open reading frame encoding the chimeric receptor can be obtained from a genomic DNA source, a cDNA source, or can be synthesized (e.g., via PCR), or combinations thereof. Depending upon the size of the genomic DNA and the number of introns, it may be desirable to use cDNA or a combination thereof as it is found that introns stabilize the mRNA. Also, it may be further advantageous to use endogenous or exogenous non-coding regions to stabilize the mRNA.

It is contemplated that the chimeric construct can be introduced into NK cells as naked DNA or in a suitable vector. Methods of stably transfecting cells by electroporation using naked DNA are known in the art. See, e.g., U.S. Pat. No. 6,410,319. Naked DNA generally refers to the DNA encoding a chimeric receptor contained in a plasmid expression vector in proper orientation for expression.

Alternatively, a viral vector (e.g., a retroviral vector, adenoviral vector, adeno-associated viral vector, or lentiviral vector) can be used to introduce the chimeric construct into NK cells. Suitable vectors for use in accordance with the method of the present invention are non-replicating in the NK cells. A large number of vectors are known that are based on viruses, where the copy number of the virus maintained in the cell is low enough to maintain the viability of the cell, such as, for example, vectors based on HIV, SV40, EBV, HSV, or BPV.

The CAR may express a suicide gene, such as CD20, CD52, EGFRv3, or inducible caspase 9.

The CAR may comprise a tumor antigen-binding domain. The tumor antigen-binding domain may be, but is not limited to, CD19, CD20, carcinoembryonic antigen, alphafetoprotein, CA-125, MUC-1, epithelial tumor antigen, melanoma-associated antigen, mutated p53, mutated ras, HER2/Neu, ERBB2, folate binding protein, HIV-1 envelope glycoprotein gp120, HIV-1 envelope glycoprotein gp41, GD2, CD123, CD23, CD30, CD56, c-Met, mesothelin, GD3, HERV-K, IL-11Ralpha, kappa chain, lambda chain, CSPG4, ERBB2, EGFRvIII, or VEGFR2. The CAR may comprise a humanized scFv, such as humanized CD19 or CD123. Exemplary tumor antigens may comprise CD99, CLL-1, CD47, CD33, CS1, or BCMA.

B. Antigen Presenting Cells

Antigen-presenting cells, which include macrophages, B lymphocytes, and dendritic cells, are distinguished by their expression of a particular major histocompatibility complex (MEC) molecule. APCs internalize antigen and re-express a part of that antigen, together with the MEC molecule on their outer cell membrane. The MEC is a large genetic complex with multiple loci. The MEC loci encode two major classes of MEC membrane molecules, referred to as class I and class II MHCs. T helper lymphocytes generally recognize antigen associated with MEC class II molecules, and T cytotoxic lymphocytes recognize antigen associated with MEC class I molecules. In humans, the MEC is referred to as the HLA complex and in mice the H-2 complex.

In some cases, aAPCs are useful in preparing therapeutic compositions and cell therapy products of the embodiments. For general guidance regarding the preparation and use of antigen-presenting systems, see, e.g., U.S. Pat. Nos. 6,225,042, 6,355,479, 6,362,001 and 6,790,662; U.S. Patent Application Publication Nos. 2009/0017000 and 2009/0004142; and International Publication No. WO2007/103009.

aAPC systems may comprise at least one exogenous assisting molecule. Any suitable number and combination of assisting molecules may be employed. The assisting molecule may be selected from assisting molecules such as co-stimulatory molecules and adhesion molecules. Exemplary co-stimulatory molecules include CD86, CD64 (FcγRI), 41BB ligand (CD137 ligand), and IL-21. Adhesion molecules may include carbohydrate-binding glycoproteins such as selectins, transmembrane binding glycoproteins such as integrins, calcium-dependent proteins such as cadherins, and single-pass transmembrane immunoglobulin (Ig) superfamily proteins, such as intercellular adhesion molecules (ICAMs), which promote, for example, cell-to-cell or cell-to-matrix contact. Exemplary adhesion molecules include LFA-3 and ICAMs, such as ICAM-1. Techniques, methods, and reagents useful for selection, cloning, preparation, and expression of exemplary assisting molecules, including co-stimulatory molecules and adhesion molecules, are exemplified in, e.g., U.S. Pat. Nos. 6,225,042, 6,355,479, and 6,362,001.

In particular embodiments, the aAPCs have been engineered to express CD137 ligand, such as by retroviral vectors. The aAPCs may further express membrane-bound cytokines, such as membrane-bound IL-21 (mIL-21) or membrane-bound IL-15 (mIL-15). In particular aspects, the aAPCs express CD137 ligand and mIL-21. The aAPCs may be K562 leukemia cells engineered to express CD137 and mIL-21. The aAPCs may be developed to express a desired antigen, such as CD19. As needed, additional stimulation cycles can be undertaken to generate larger numbers of NK cells.

III. METHODS OF USE

Embodiments of the present disclosure concern methods for the use of the NK cells provided herein for treating or preventing a medical disease or disorder by transfer of a NK cell population that elicits an immune response. The method includes administering to the subject a therapeutically effective amount of the pre-activated and expanded NK cells, thereby treating or preventing the disorder in the subject. In certain embodiments of the present disclosure, cancer or infection is treated by transfer of a NK cell population that elicits an immune response. Due to their release of pro-inflammatory cytokines, NK cells may reverse the anti-inflammatory tumor microenvironment and increase adaptive immune responses by promoting differentiation, activation, and/or recruitment of accessory immune cell to sites of malignancy.

Tumors for which the present treatment methods are useful include any malignant cell type, such as those found in a solid tumor or a hematological tumor. Exemplary solid tumors can include, but are not limited to, a tumor of an organ selected from the group consisting of pancreas, colon, cecum, stomach, brain, head, neck, ovary, kidney, larynx, sarcoma, lung, bladder, melanoma, prostate, and breast. Exemplary hematological tumors include tumors of the bone marrow, T or B cell malignancies, leukemias, lymphomas, blastomas, myelomas, and the like. Further examples of cancers that may be treated using the methods provided herein include, but are not limited to, lung cancer (including small-cell lung cancer, non-small cell lung cancer, adenocarcinoma of the lung, and squamous carcinoma of the lung), cancer of the peritoneum, gastric or stomach cancer (including gastrointestinal cancer and gastrointestinal stromal cancer), pancreatic cancer, cervical cancer, ovarian cancer, liver cancer, bladder cancer, breast cancer, colon cancer, colorectal cancer, endometrial or uterine carcinoma, salivary gland carcinoma, kidney or renal cancer, prostate cancer, vulval cancer, thyroid cancer, various types of head and neck cancer, and melanoma.

The cancer may specifically be of the following histological type, though it is not limited to these: neoplasm, malignant; carcinoma; carcinoma, undifferentiated; giant and spindle cell carcinoma; small cell carcinoma; papillary carcinoma; squamous cell carcinoma; lymphoepithelial carcinoma; basal cell carcinoma; pilomatrix carcinoma; transitional cell carcinoma; papillary transitional cell carcinoma; adenocarcinoma; gastrinoma, malignant; cholangiocarcinoma; hepatocellular carcinoma; combined hepatocellular carcinoma and cholangiocarcinoma; trabecular adenocarcinoma; adenoid cystic carcinoma; adenocarcinoma in adenomatous polyp; adenocarcinoma, familial polyposis coli; solid carcinoma; carcinoid tumor, malignant; branchiolo-alveolar adenocarcinoma; papillary adenocarcinoma; chromophobe carcinoma; acidophil carcinoma; oxyphilic adenocarcinoma; basophil carcinoma; clear cell adenocarcinoma; granular cell carcinoma; follicular adenocarcinoma; papillary and follicular adenocarcinoma; nonencapsulating sclerosing carcinoma; adrenal cortical carcinoma; endometroid carcinoma; skin appendage carcinoma; apocrine adenocarcinoma; sebaceous adenocarcinoma; ceruminous adenocarcinoma; mucoepidermoid carcinoma; cystadenocarcinoma; papillary cystadenocarcinoma; papillary serous cystadenocarcinoma; mucinous cystadenocarcinoma; mucinous adenocarcinoma; signet ring cell carcinoma; infiltrating duct carcinoma; medullary carcinoma; lobular carcinoma; inflammatory carcinoma; paget's disease, mammary; acinar cell carcinoma; adenosquamous carcinoma; adenocarcinoma w/squamous metaplasia; thymoma, malignant; ovarian stromal tumor, malignant; thecoma, malignant; granulosa cell tumor, malignant; androblastoma, malignant; sertoli cell carcinoma; leydig cell tumor, malignant; lipid cell tumor, malignant; paraganglioma, malignant; extramammary paraganglioma, malignant; pheochromocytoma; glomangiosarcoma; malignant melanoma; amelanotic melanoma; superficial spreading melanoma; lentigo malignant melanoma; acral lentiginous melanomas; nodular melanomas; malignant melanoma in giant pigmented nevus; epithelioid cell melanoma; blue nevus, malignant; sarcoma; fibrosarcoma; fibrous histiocytoma, malignant; myxosarcoma; liposarcoma; leiomyosarcoma; rhabdomyosarcoma; embryonal rhabdomyosarcoma; alveolar rhabdomyosarcoma; stromal sarcoma; mixed tumor, malignant; mullerian mixed tumor; nephroblastoma; hepatoblastoma; carcinosarcoma; mesenchymoma, malignant; brenner tumor, malignant; phyllodes tumor, malignant; synovial sarcoma; mesothelioma, malignant; dysgerminoma; embryonal carcinoma; teratoma, malignant; struma ovarii, malignant; choriocarcinoma; mesonephroma, malignant; hemangiosarcoma; hemangioendothelioma, malignant; kaposi's sarcoma; hemangiopericytoma, malignant; lymphangiosarcoma; osteosarcoma; juxtacortical osteosarcoma; chondrosarcoma; chondroblastoma, malignant; mesenchymal chondrosarcoma; giant cell tumor of bone; ewing's sarcoma; odontogenic tumor, malignant; ameloblastic odontosarcoma; ameloblastoma, malignant; ameloblastic fibrosarcoma; pinealoma, malignant; chordoma; glioma, malignant; ependymoma; astrocytoma; protoplasmic astrocytoma; fibrillary astrocytoma; astroblastoma; glioblastoma; oligodendroglioma; oligodendroblastoma; primitive neuroectodermal; cerebellar sarcoma; ganglioneuroblastoma; neuroblastoma; retinoblastoma; olfactory neurogenic tumor; meningioma, malignant; neurofibrosarcoma; neurilemmoma, malignant; granular cell tumor, malignant; malignant lymphoma; hodgkin's disease; hodgkin's; paragranuloma; malignant lymphoma, small lymphocytic; malignant lymphoma, large cell, diffuse; malignant lymphoma, follicular; mycosis fungoides; other specified non-hodgkin's lymphomas; B-cell lymphoma; low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL; mantle cell lymphoma; AIDS-related lymphoma; Waldenstrom's macroglobulinemia; malignant histiocytosis; multiple myeloma; mast cell sarcoma; immunoproliferative small intestinal disease; leukemia; lymphoid leukemia; plasma cell leukemia; erythroleukemia; lymphosarcoma cell leukemia; myeloid leukemia; basophilic leukemia; eosinophilic leukemia; monocytic leukemia; mast cell leukemia; megakaryoblastic leukemia; myeloid sarcoma; hairy cell leukemia; chronic lymphocytic leukemia (CLL); acute lymphoblastic leukemia (ALL); acute myeloid leukemia (AML); and chronic myeloblastic leukemia.

Particular embodiments concern methods of treatment of leukemia. Leukemia is a cancer of the blood or bone marrow and is characterized by an abnormal proliferation (production by multiplication) of blood cells, usually white blood cells (leukocytes). It is part of the broad group of diseases called hematological neoplasms. Leukemia is a broad term covering a spectrum of diseases. Leukemia is clinically and pathologically split into its acute and chronic forms.

Acute leukemia is characterized by the rapid proliferation of immature blood cells. This crowding makes the bone marrow unable to produce healthy blood cells. Acute forms of leukemia can occur in children and young adults. In fact, it is a more common cause of death for children in the U.S. than any other type of malignant disease. Immediate treatment is required in acute leukemia due to the rapid progression and accumulation of the malignant cells, which then spill over into the bloodstream and spread to other organs of the body. Central nervous system (CNS) involvement is uncommon, although the disease can occasionally cause cranial nerve palsies. Chronic leukemia is distinguished by the excessive build up of relatively mature, but still abnormal, blood cells. Typically taking months to years to progress, the cells are produced at a much higher rate than normal cells, resulting in many abnormal white blood cells in the blood. Chronic leukemia mostly occurs in older people, but can theoretically occur in any age group. Whereas acute leukemia must be treated immediately, chronic forms are sometimes monitored for some time before treatment to ensure maximum effectiveness of therapy.

Furthermore, the diseases are classified into lymphocytic or lymphoblastic, which indicate that the cancerous change took place in a type of marrow cell that normally goes on to form lymphocytes, and myelogenous or myeloid, which indicate that the cancerous change took place in a type of marrow cell that normally goes on to form red cells, some types of white cells, and platelets (see lymphoid cells vs. myeloid cells).

Acute lymphocytic leukemia (also known as acute lymphoblastic leukemia, or ALL) is the most common type of leukemia in young children. This disease also affects adults, especially those aged 65 and older. Chronic lymphocytic leukemia (CLL) most often affects adults over the age of 55. It sometimes occurs in younger adults, but it almost never affects children. Acute myelogenous leukemia (also known as acute myeloid leukemia, or AML) occurs more commonly in adults than in children. This type of leukemia was previously called "acute nonlymphocytic leukemia." Chronic myelogenous leukemia (CIVIL) occurs mainly in adults. A very small number of children also develop this disease.

Lymphoma is a type of cancer that originates in lymphocytes (a type of white blood cell in the vertebrate immune system). There are many types of lymphoma. According to the U.S. National Institutes of Health, lymphomas account for about five percent of all cases of cancer in the United States, and Hodgkin's lymphoma in particular accounts for less than one percent of all cases of cancer in the United States. Because the lymphatic system is part of the body's immune system, patients with a weakened immune system, such as from HIV infection or from certain drugs or medication, also have a higher incidence of lymphoma.

In certain embodiments of the invention, NK cells are delivered to an individual in need thereof, such as an individual that has cancer or an infection. The cells then enhance the individual's immune system to attack the respective cancer or pathogenic cells. In some cases, the individual is provided with one or more doses of the NK cells. In cases where the individual is provided with two or more doses of the NK cells, the duration between the administrations should be sufficient to allow time for propagation in the individual, and in specific embodiments the duration between doses is 1, 2, 3, 4, 5, 6, 7, or more days.

The source of NK cells that are pre-activated and expanded may be of any kind, but in specific embodiments the cells are obtained from a bank of umbilical cord blood, peripheral blood, human embryonic stem cells, or induced pluripotent stem cells, for example. Suitable doses for a therapeutic effect would be at least $10^5$ or between about $10^5$ and about $10^{10}$ cells per dose, for example, preferably in a series of dosing cycles. An exemplary dosing regimen consists of four one-week dosing cycles of escalating doses, starting at least at about $10^5$ cells on Day 0, for example increasing incrementally up to a target dose of about $10^{10}$ cells within several weeks of initiating an intra-patient dose escalation scheme. Suitable modes of administration include intravenous, subcutaneous, intracavitary (for example by reservoir-access device), intraperitoneal, and direct injection into a tumor mass.

The NK cells generated according to the present methods have many potential uses, including experimental and therapeutic uses. In particular, it is envisaged that such cell populations will be extremely useful in suppressing undesirable or inappropriate immune responses. In such methods, a small number of NK cells are removed from a patient and then manipulated and expanded ex vivo before reinfusing them into the patient. Examples of diseases which may be treated in this way are autoimmune diseases and conditions in which suppressed immune activity is desirable, e.g., for allo-transplantation tolerance. A therapeutic method could comprise providing a mammal, obtaining NK cells from the mammal; expanding the NK cells ex vivo in accordance with the methods of the present methods as described above; and administering the expanded NK cells to the mammal to be treated.

A pharmaceutical composition of the present disclosure can be used alone or in combination with other well-established agents useful for treating cancer. Whether delivered alone or in combination with other agents, the pharmaceutical composition of the present disclosure can be delivered via various routes and to various sites in a mammalian, particularly human, body to achieve a particular effect. One skilled in the art will recognize that, although more than one route can be used for administration, a particular route can provide a more immediate and more effective reaction than another route. For example, intradermal delivery may be advantageously used over inhalation for the treatment of melanoma. Local or systemic delivery can be accomplished by administration comprising application or instillation of the formulation into body cavities, inhalation or insufflation of an aerosol, or by parenteral introduction, comprising intramuscular, intravenous, intraportal, intrahepatic, peritoneal, subcutaneous, or intradermal administration.

In one embodiment, the subject has an autoimmune disease. Non-limiting examples of autoimmune diseases include: alopecia areata, ankylosing spondylitis, antiphospholipid syndrome, autoimmune Addison's disease, autoimmune diseases of the adrenal gland, autoimmune hemolytic anemia, autoimmune hepatitis, autoimmune oophoritis and orchitis, autoimmune thrombocytopenia, Behcet's disease, bullous pemphigoid, cardiomyopathy, celiac spate-dermatitis, chronic fatigue immune dysfunction syndrome (CFIDS), chronic inflammatory demyelinating polyneuropathy, Churg-Strauss syndrome, cicatrical pemphigoid, CREST syndrome, cold agglutinin disease, Crohn's disease, discoid lupus, essential mixed cryoglobulinemia, fibromyalgia-fibromyositis, glomerulonephritis, Graves' disease, Guillain-Barre, Hashimoto's thyroiditis, idiopathic pulmonary fibrosis, idiopathic thrombocytopenia purpura (ITP), IgA neuropathy, juvenile arthritis, lichen planus, lupus erthematosus, Meniere's disease, mixed connective tissue disease, multiple sclerosis, type 1 or immune-mediated diabetes mellitus, myasthenia gravis, nephrotic syndrome (such as minimal change disease, focal glomerulosclerosis, or mebranous nephropathy), pemphigus vulgaris, pernicious anemia, polyarteritis nodosa, polychondritis, polyglandular syndromes, polymyalgia rheumatica, polymyositis and dermatomyositis, primary agammaglobulinemia, primary biliary cirrhosis, psoriasis, psoriatic arthritis, Raynaud's phenomenon, Reiter's syndrome, Rheumatoid arthritis, sarcoidosis, scleroderma, Sjogren's syndrome, stiff-man syndrome, systemic lupus erythematosus, lupus erythematosus, ulcerative colitis, uveitis, vasculitides (such as polyarteritis nodosa, takayasu arteritis, temporal arteritis/giant cell arteritis, or dermatitis herpetiformis vasculitis), vitiligo, and Wegener's granulomatosis. Thus, some examples of an autoimmune disease that can be treated using the methods disclosed herein include, but are not limited to, multiple sclerosis, rheumatoid arthritis, systemic lupus erythematosis, type I diabetes mellitus, Crohn's disease; ulcerative colitis, myasthenia gravis, glomerulonephritis, ankylosing spondylitis, vasculitis, or psoriasis. The subject can also have an allergic disorder such as Asthma.

In yet another embodiment, the subject is the recipient of a transplanted organ or stem cells and expanded NK cells are used to prevent and/or treat rejection. In particular embodiments, the subject has or is at risk of developing graft versus host disease. GVHD is a possible complication of any transplant that uses or contains stem cells from either a related or an unrelated donor. There are two kinds of GVHD, acute and chronic. Acute GVHD appears within the first three months following transplantation. Signs of acute GVHD include a reddish skin rash on the hands and feet that may spread and become more severe, with peeling or blistering skin. Acute GVHD can also affect the stomach and intestines, in which case cramping, nausea, and diarrhea are present. Yellowing of the skin and eyes (jaundice) indicates that acute GVHD has affected the liver. Chronic GVHD is ranked based on its severity: stage/grade 1 is mild; stage/grade 4 is severe. Chronic GVHD develops three months or later following transplantation. The symptoms of chronic GVHD are similar to those of acute GVHD, but in addition, chronic GVHD may also affect the mucous glands in the eyes, salivary glands in the mouth, and glands that lubricate the stomach lining and intestines. Any of the populations of NK cells disclosed herein can be utilized. Examples of a transplanted organ include a solid organ transplant, such as kidney, liver, skin, pancreas, lung and/or heart, or a cellular transplant such as islets, hepatocytes, myoblasts, bone marrow, or hematopoietic or other stem cells. The transplant can be a composite transplant, such as tissues of the face. NK cells, such as immunosuppressive $CD19^+$ cells, can be administered prior to transplantation, concurrently with transplantation, or following transplantation. In some embodiments, the NK cells are administered prior to the transplant, such as at least 1 hour, at least 12 hours, at least 1 day, at least 2 days, at least 3 days, at least 4 days, at least 5 days, at least 6 days, at least 1 week, at least 2 weeks, at least 3 weeks, at least 4 weeks, or at least 1 month prior to the transplant. In one specific, non-limiting example, administration of the therapeutically effective amount of NK cells occurs 3-5 days prior to transplantation.

NK cells administered to a patient that is receiving a transplant can be sensitized with antigens specific to the transplanted material prior to administration. According to this embodiment, the transplant recipient will have a decreased immune/inflammatory response to the transplanted material and, as such, the likelihood of rejection of the transplanted tissue is minimized. Similarly, with regard to the treatment of graft versus host disease, the NK cells can be sensitized with antigens specific to the host. According to this embodiment, the recipient will have a decreased immune/inflammatory response to self-antigens.

In a further embodiment, administration of a therapeutically effective amount of NK cells to a subject treats or inhibits inflammation in the subject. Thus, the method includes administering a therapeutically effective amount of NK cells to the subject to inhibit the inflammatory process. Examples of inflammatory disorders include, but are not limited to, asthma, encephalitis, inflammatory bowel disease, chronic obstructive pulmonary disease (COPD), allergic disorders, septic shock, pulmonary fibrosis, undifferentiated spondyloarthropathy, undifferentiated arthropathy, arthritis, inflammatory osteolysis, and chronic inflammation resulting from chronic viral or bacterial infections. The methods disclosed herein can also be used to treat allergic disorders.

Administration of NK cells can be utilized whenever immunosuppression or inhibition of inflammation is desired, for example, at the first sign or symptoms of a disease or inflammation. These may be general, such as pain, edema, elevated temperature, or may be specific signs or symptoms related to dysfunction of affected organ(s). For example, in renal transplant rejection there may be an elevated serum creatinine level, whereas in GVHD, there may be a rash, and in asthma, there may be shortness of breath and wheezing.

Administration of NK cells can also be utilized to prevent immune-mediated disease in a subject of interest. For example, NK cells can be administered to a subject that will be a transplant recipient prior to the transplantation. In another example, NK cells are administered to a subject receiving allogeneic bone marrow transplants without T cell depletion. In a further example, NK cells can be administered to a subject with a family history of diabetes. In other example, NK cells are administered to a subject with asthma in order to prevent an asthma attack. In some embodiments, a therapeutically effective amount of NK cells is administered to the subject in advance of a symptom. The administration of the NK cells results in decreased incidence or severity of subsequent immunological event or symptom (such as an asthma attack), or improved patient survival, compared to patients who received other therapy not including NK cells.

In certain embodiments, the NK cells are administered in combination with a second therapeutic agent. For example, the second therapeutic agent may comprise T cells, an immunomodulatory agent, a monoclonal antibody, or a chemotherapeutic agent. In non-limiting examples, the immunomodulatory agent is lenalidomide, the monoclonal antibody is rituximab, ofatumumab, or lumiliximab, and the chemotherapeutic agent is fludarabine or cyclophosphamide.

A composition of the present disclosure can be provided in unit dosage form wherein each dosage unit, e.g., an injection, contains a predetermined amount of the composition, alone or in appropriate combination with other active agents. The term unit dosage form as used herein refers to physically discrete units suitable as unitary dosages for human and animal subjects, each unit containing a predetermined quantity of the composition of the present disclosure, alone or in combination with other active agents, calculated in an amount sufficient to produce the desired effect, in association with a pharmaceutically acceptable diluent, carrier, or vehicle, where appropriate. The specifications for the unit dosage forms of the present disclosure depend on the particular pharmacodynamics associated with the pharmaceutical composition in the particular subject.

Desirably an effective amount or sufficient number of the isolated transduced NK cells is present in the composition and introduced into the subject such that long-term, specific, anti-tumor responses are established to reduce the size of a tumor or eliminate tumor growth or regrowth than would otherwise result in the absence of such treatment. Desirably, the amount of NK cells reintroduced into the subject causes a 10%, 20%, 30%, 40%, 50%, 60%, 70%, 80%, 90%, 95%, 98%, or 100% decrease in tumor size when compared to otherwise same conditions wherein the NK cells are not present.

Accordingly, the amount of NK cells administered should take into account the route of administration and should be such that a sufficient number of the NK cells will be introduced so as to achieve the desired therapeutic response. Furthermore, the amounts of each active agent included in the compositions described herein (e.g., the amount per each cell to be contacted or the amount per certain body weight) can vary in different applications. In general, the concentration of NK cells desirably should be sufficient to provide in the subject being treated at least from about $1 \times 10^6$ to about $1 \times 10^9$ NK cells, even more desirably, from about $1 \times 10^7$ to about $5 \times 10^8$ NK cells, although any suitable amount can be utilized either above, e.g., greater than $5 \times 10^8$ cells, or below, e.g., less than $1 \times 10^7$ cells. The dosing schedule can be based on well-established cell-based therapies (see, e.g., U.S. Pat. No. 4,690,915), or an alternate continuous infusion strategy can be employed.

These values provide general guidance of the range of NK cells to be utilized by the practitioner upon optimizing the method of the present disclosure for practice of the present methods. The recitation herein of such ranges by no means precludes the use of a higher or lower amount of a component, as might be warranted in a particular application. For example, the actual dose and schedule can vary depending on whether the compositions are administered in combination with other pharmaceutical compositions, or depending on interindividual differences in pharmacokinetics, drug disposition, and metabolism. One skilled in the art readily can make any necessary adjustments in accordance with the exigencies of the particular situation.

IV. KITS

In some embodiments, a kit that can include, for example, one or more media and components for the production of NK cells is provided. Such formulations may comprise a cocktail of factors, in a form suitable for combining with NK cells. The reagent system may be packaged either in aqueous media or in lyophilized form, where appropriate. The container means of the kits will generally include at least one vial, test tube, flask, bottle, syringe or other container means, into which a component may be placed, and preferably, suitably aliquoted. Where there is more than one component in the kit, the kit also will generally contain a second, third or other additional container into which the additional components may be separately placed. However, various combinations of components may be comprised in a vial. The components of the kit may be provided as dried powder(s). When reagents and/or components are provided as a dry powder, the powder can be reconstituted by the addition of a suitable solvent. It is envisioned that the solvent may also be provided in another container means. The kits also will typically include a means for containing the kit component(s) in close confinement for commercial sale. Such containers may include injection or blow molded plastic containers into which the desired vials are retained. The kit can also include instructions for use, such as in printed or electronic format, such as digital format.

V. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—Pre-Activation and Expansion of NK Cells

Cord blood (CB) mononuclear cells (MNCs) were isolated from fresh CB units by ficoll density gradient centrifugation. CD56$^+$ NK cells, purified with an NK isolation kit (Miltenyi Biotec, Inc., San Diego, CA), were pre-activated for 16 hours using rhIL-12 (10 ng/mL) plus rhIL-18 (50 ng/mL) and rhIL-15 (50 ng/mL) and washed 3 times to remove cytokines. The pre-activated NK cells were then stimulated with irradiated (100 Gy) K562-based feeder cells expressing membrane-bound IL-21 and CD137-ligand (2:1 feeder cell:NK ratio) in the presence of recombinant human IL-2 (Proleukin, 200 U/mL) in complete Serum-free Stem Cell Growth Medium (SCGM). IL-2 was replenished every 2-3 days. Seven days later, NK cells were stimulated again with feeder aAPC cells using the same ratio. As the control, purified NK cells were expanded with irradiated (100 Gy) feeder cells (2:1 feeder cell:NK ratio) and recombinant human IL-2 without the pre-activation step (expanded CB-NK; ExpNK).

Figure 1E:
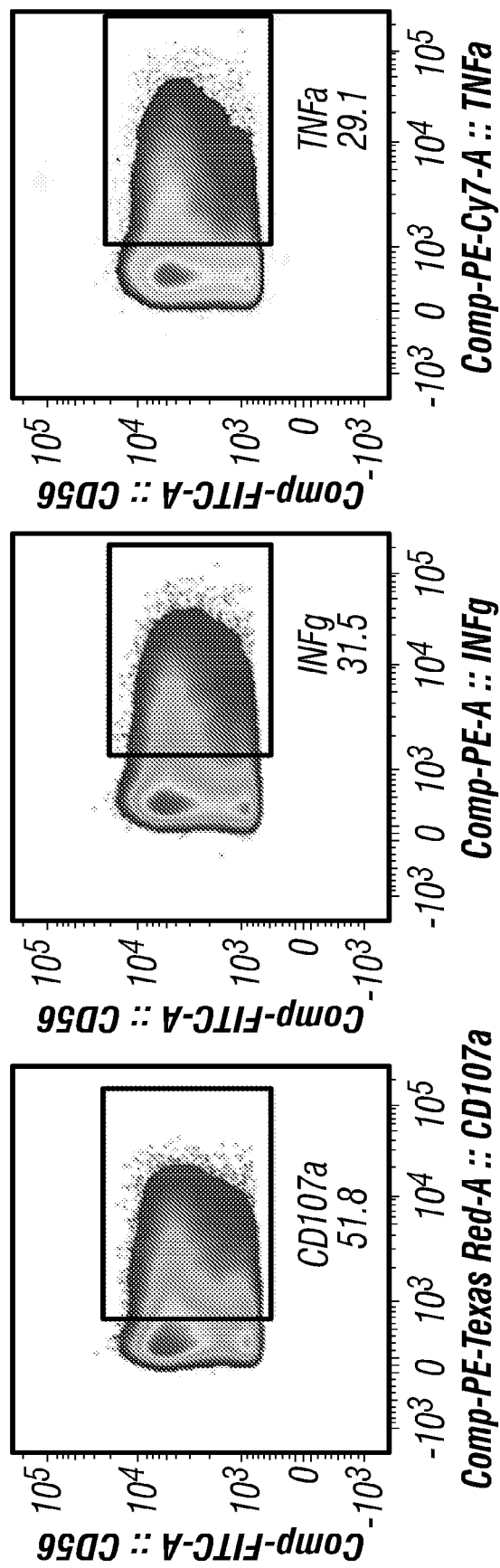
Figure 1E:
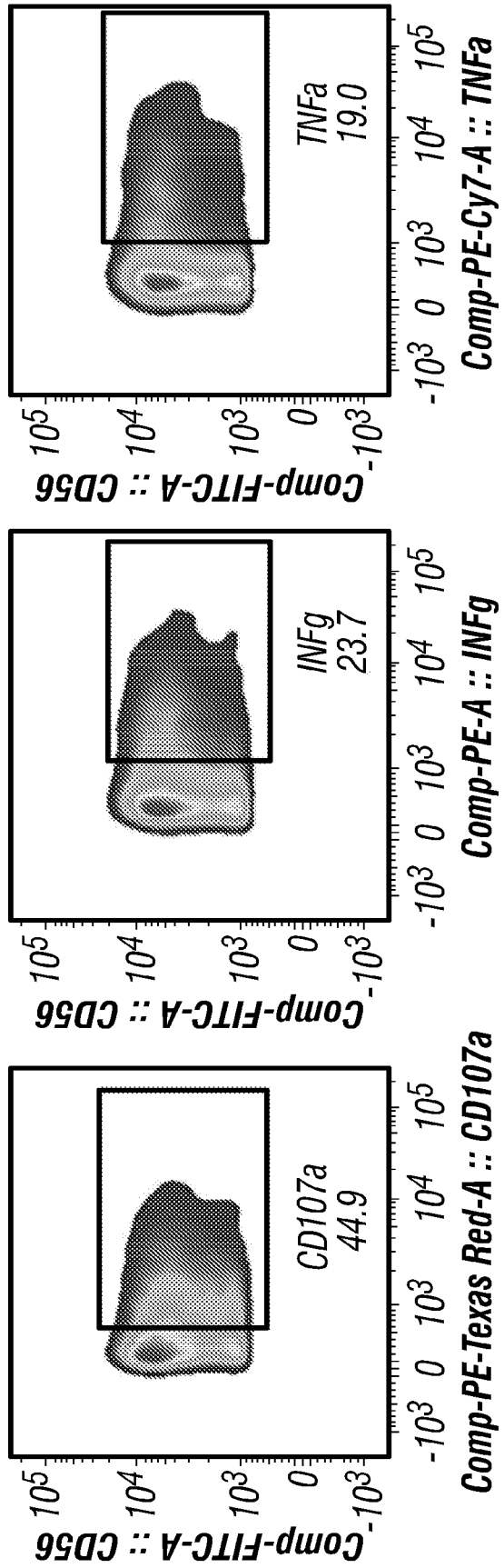
Figure 1F:
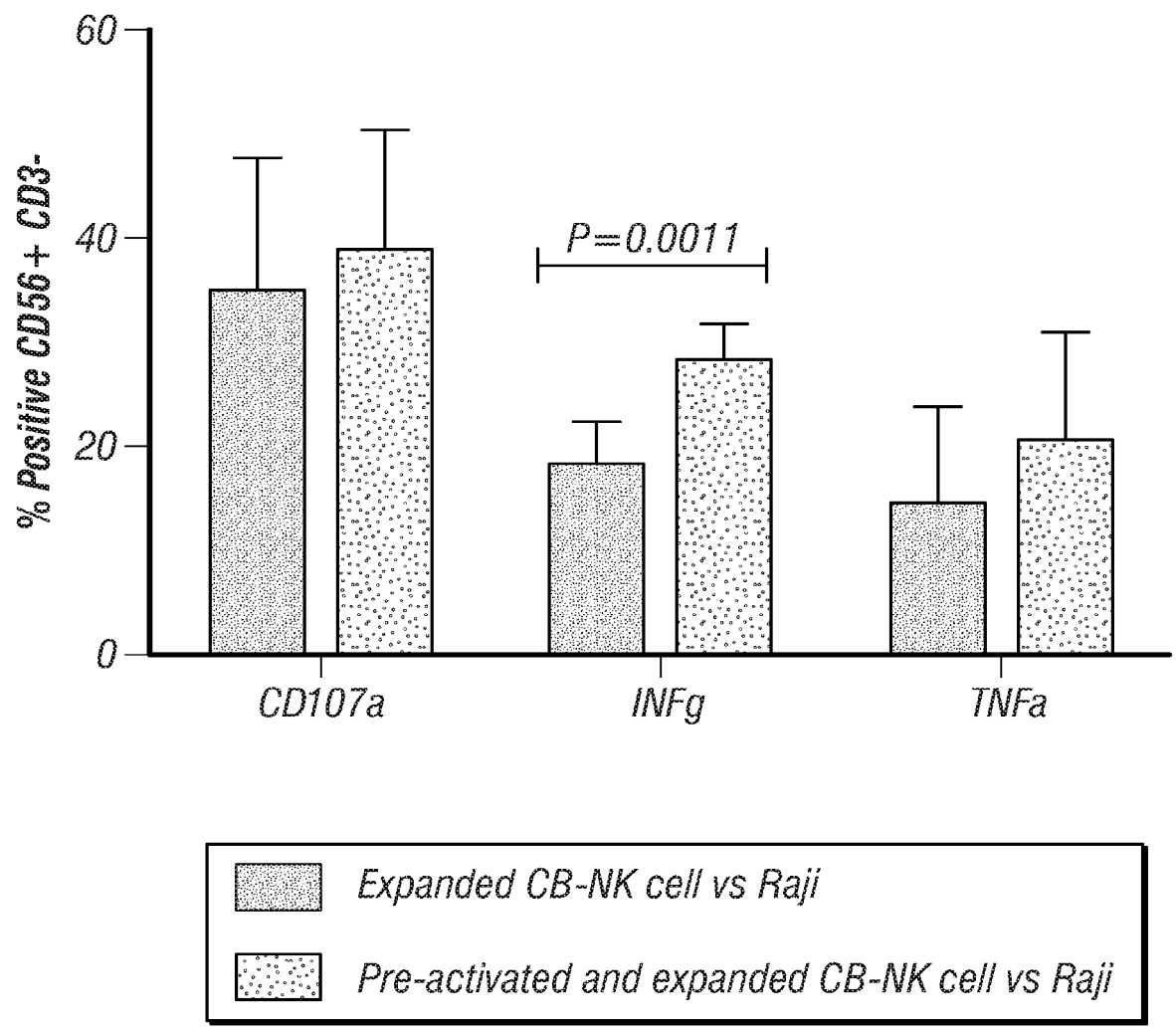
Figure 2A:
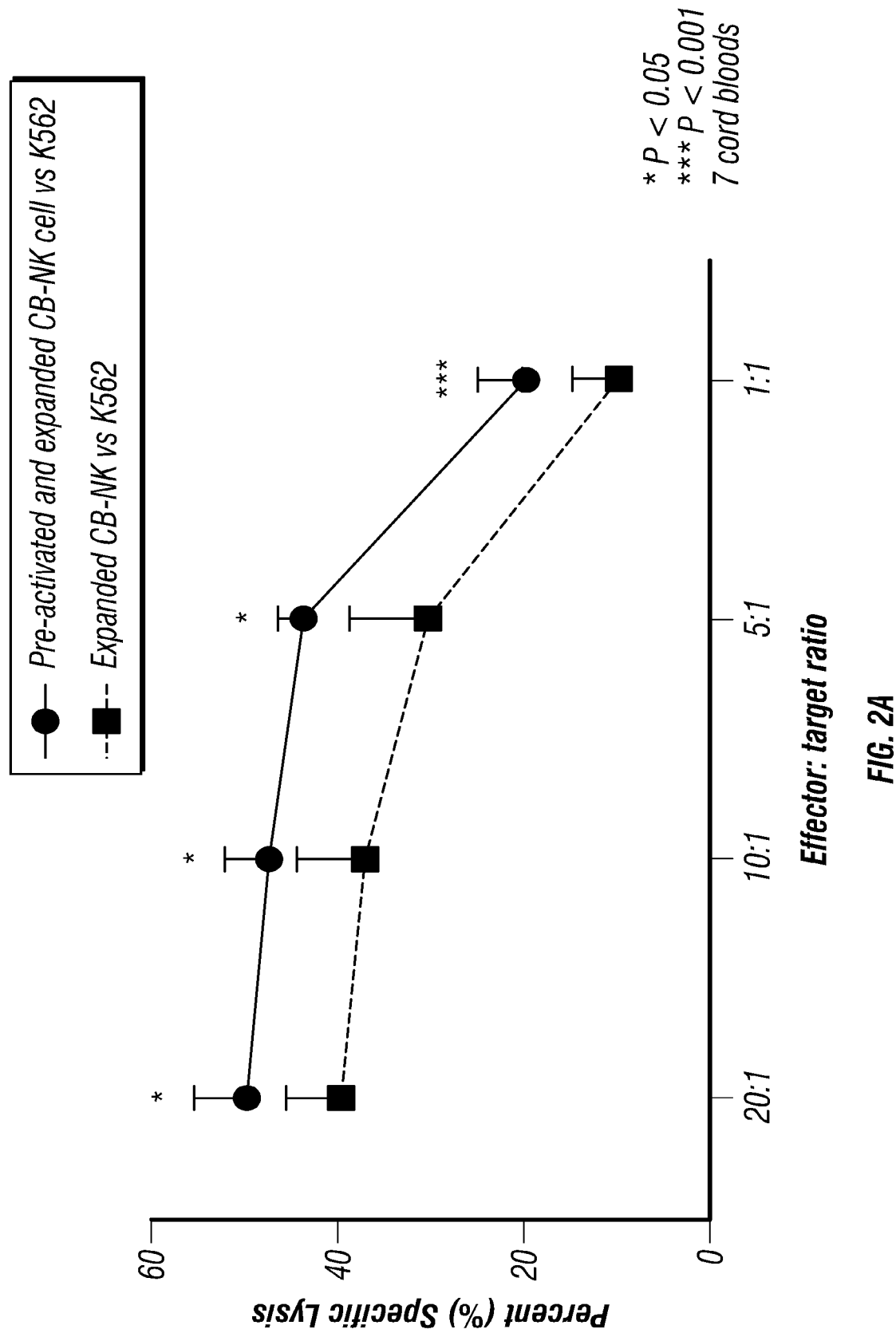
FIGS. 2A-2C.
Figure 2B:
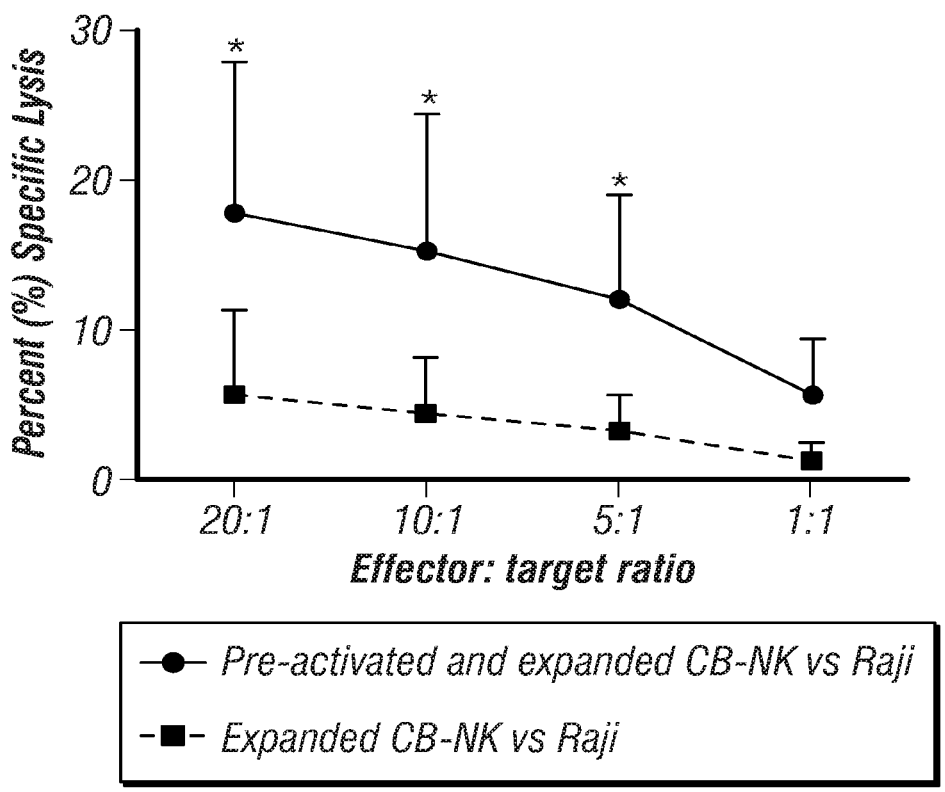
Figure 2B:
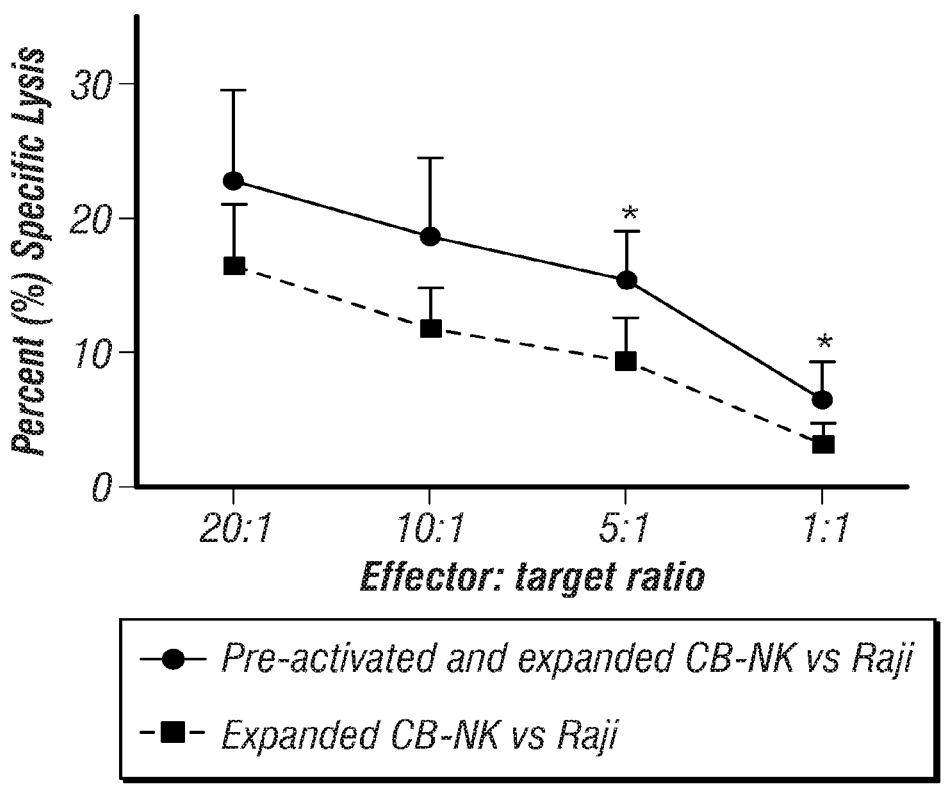
Figure 2C:
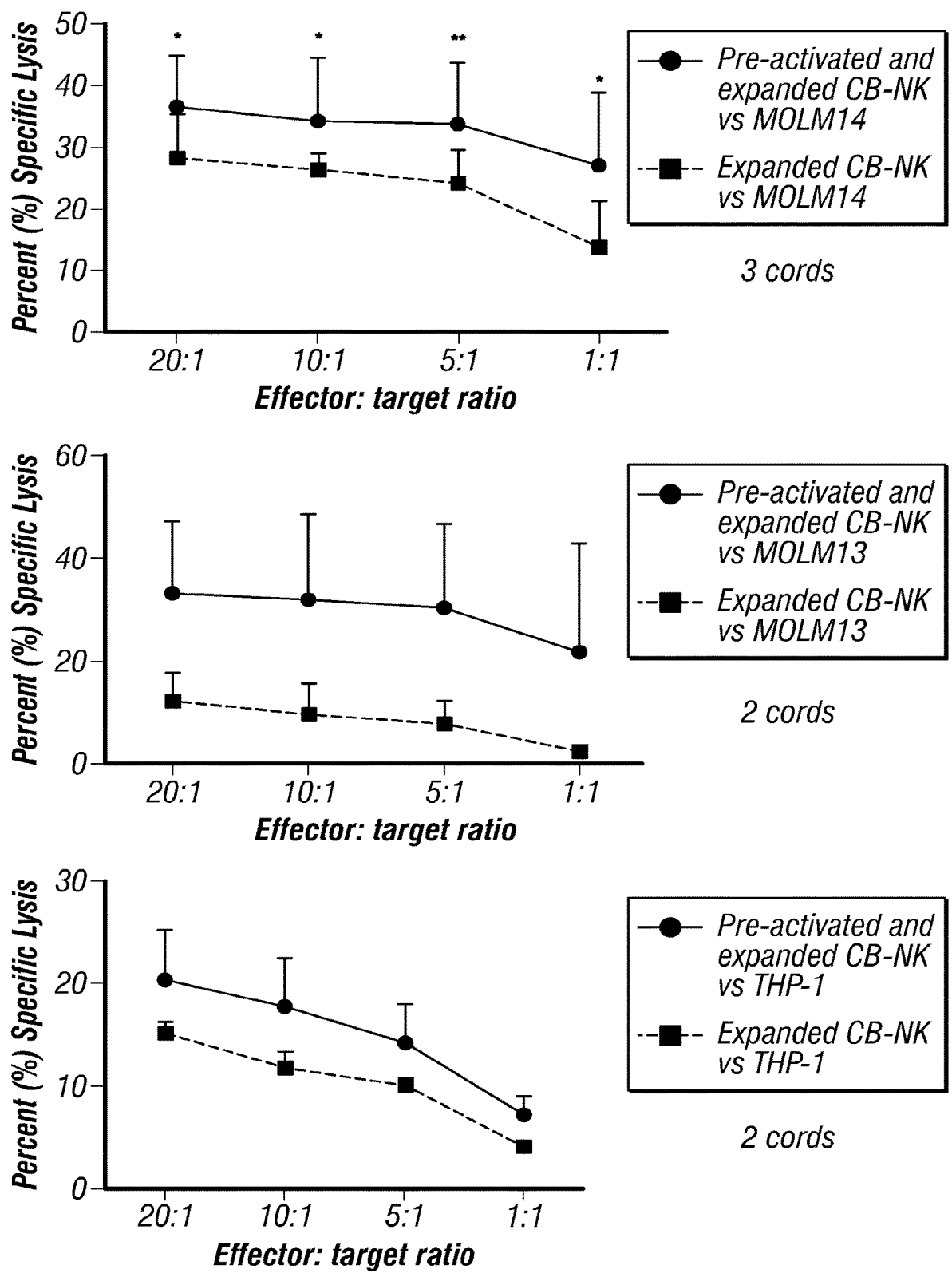

Pre-activated and expanded CB-NK cells (P+E NK) produced more IFN-g and TNF-α in response to stimulation with K562 targets (FIG. 1A-D), AML and lymphoma cells lines (FIGS. 1E-F), as well as greater cytotoxicity by $^{51}$chromium release assay (FIGS. 2A-C), 7, 14 and 21 days post-stimulation when compared to Exp CB-NK cells, indicating that the enhanced killing property persists after pre-activation.

Figure 3:
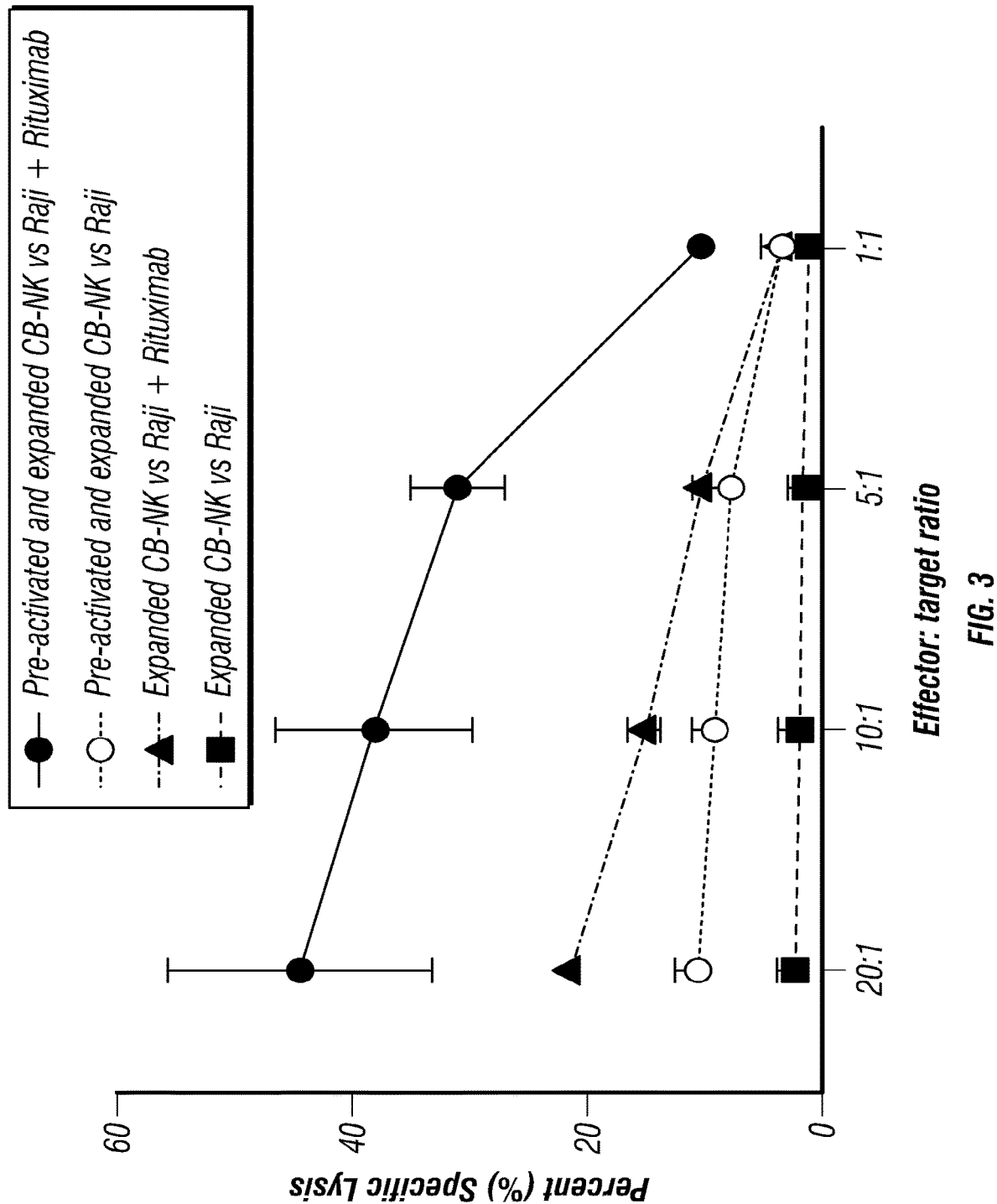
FIG. 3: Antibody-dependent cellular cytotoxicity (ADCC) experiments with rituximab and Raji target cells show that CB-NK cells that were pre-activated for 16 hrs (with IL-2, IL-18 and IL-15) and expanded kill rituximab-coated Raji lymphoma targets more efficiently when compared with controls. Pre-activated+expanded (no rituximab), expanded NK with or without rituximab at all effector-to-target ratios, as assessed by $^{51}$Chromium release assay.

Therapeutic monoclonal antibodies specific for a tumor-restricted antigen provide a low-affinity protein link between FcγRIIIa (CD16), and a tumor target. Thus, antibody-dependent cellular cytotoxicity (ADCC) experiments were performed with rituximab and Raji target cells and it was observed that P+E NK cells displayed enhanced killing of rituximab-coated Raji lymphoma targets compared with control (Exp NK cells) at all effector-to-target ratios (FIG. 3).

Figure 4A:
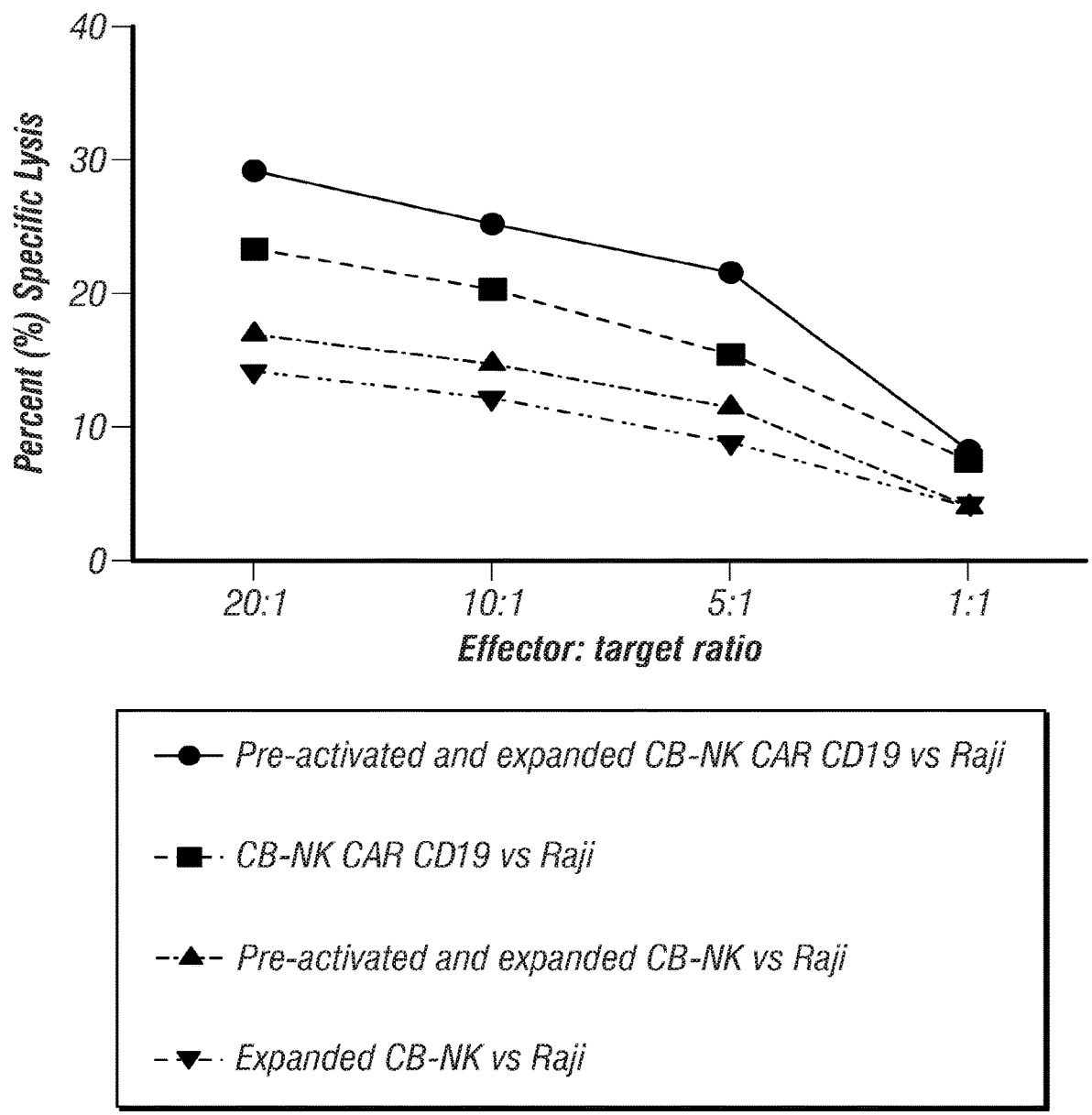
FIGS. 4A-4C.
Figure 4B:
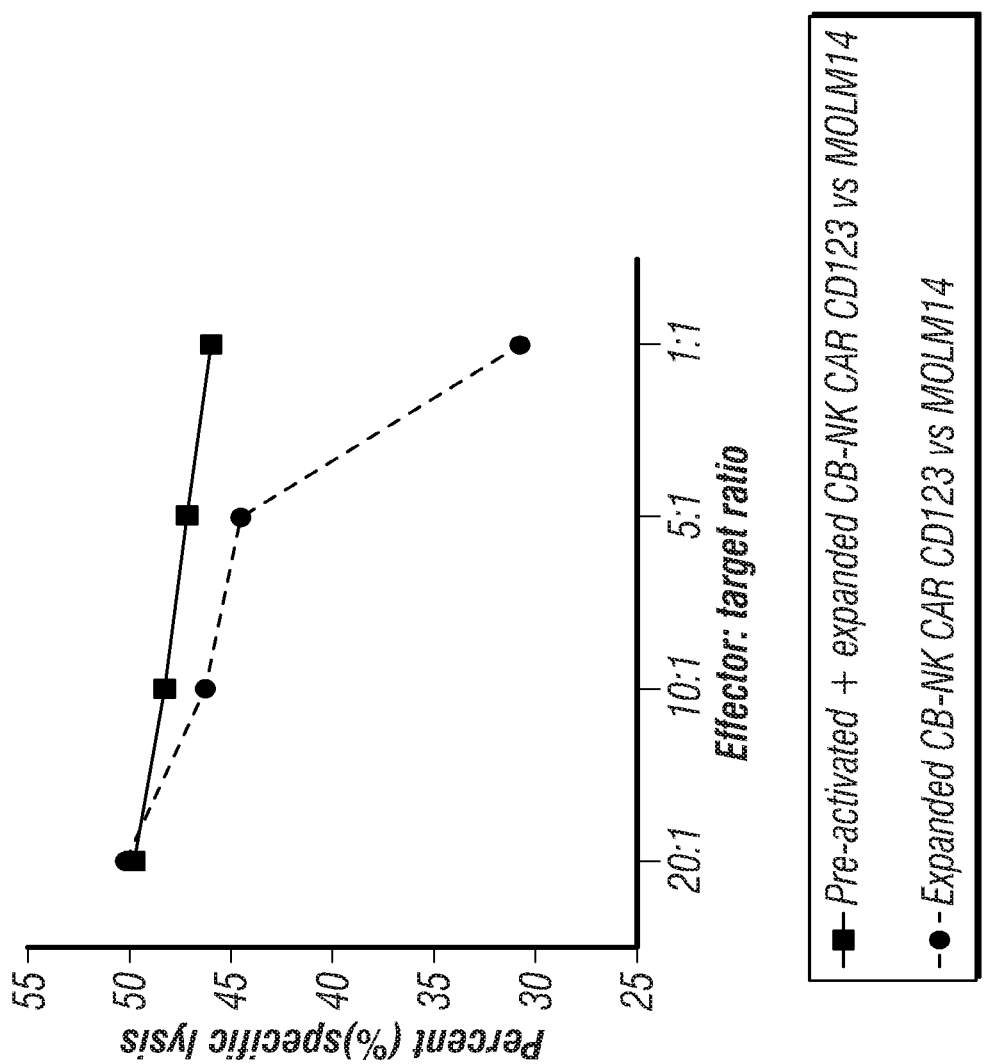
Figure 4B:
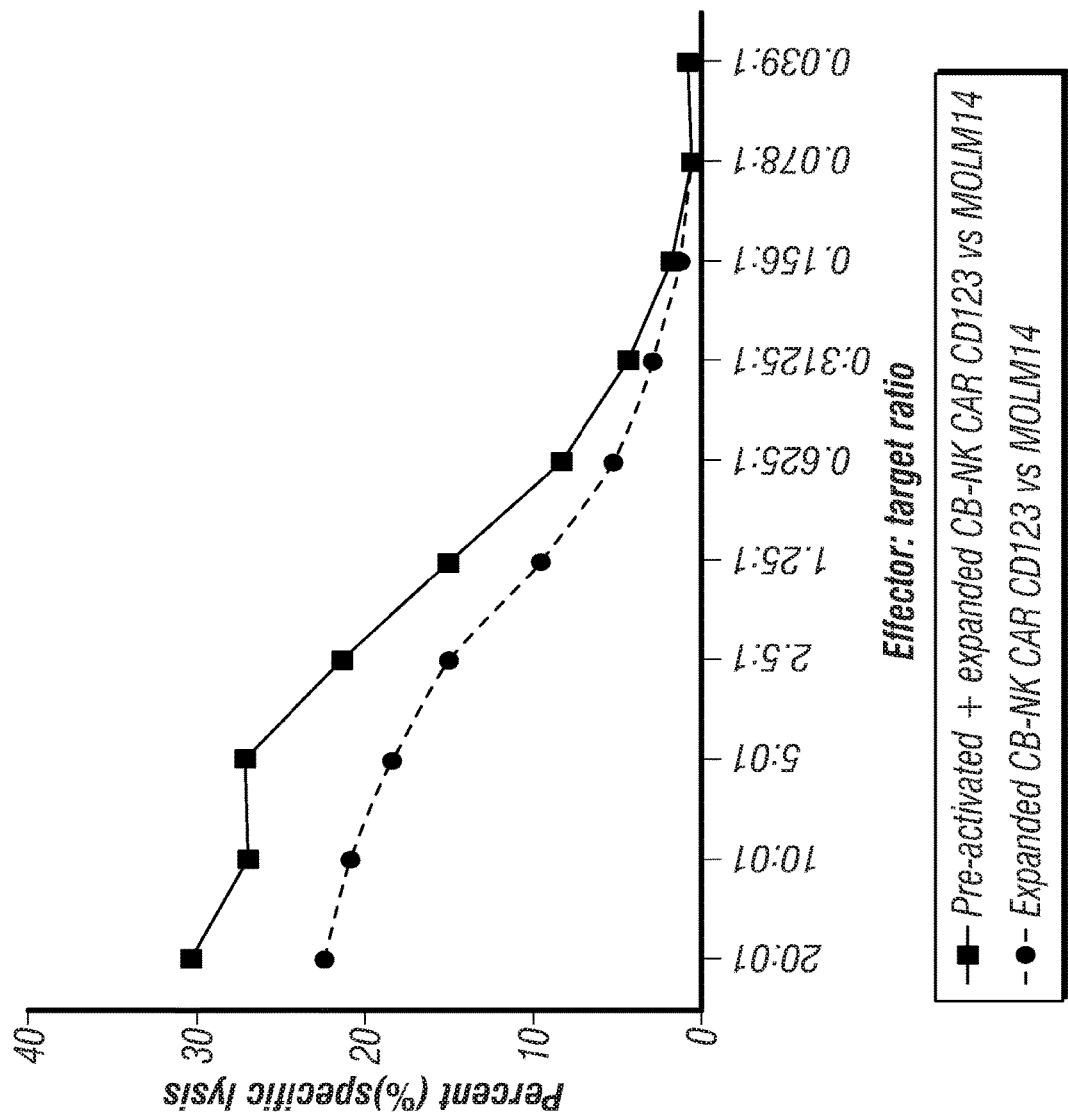
Figure 4C:
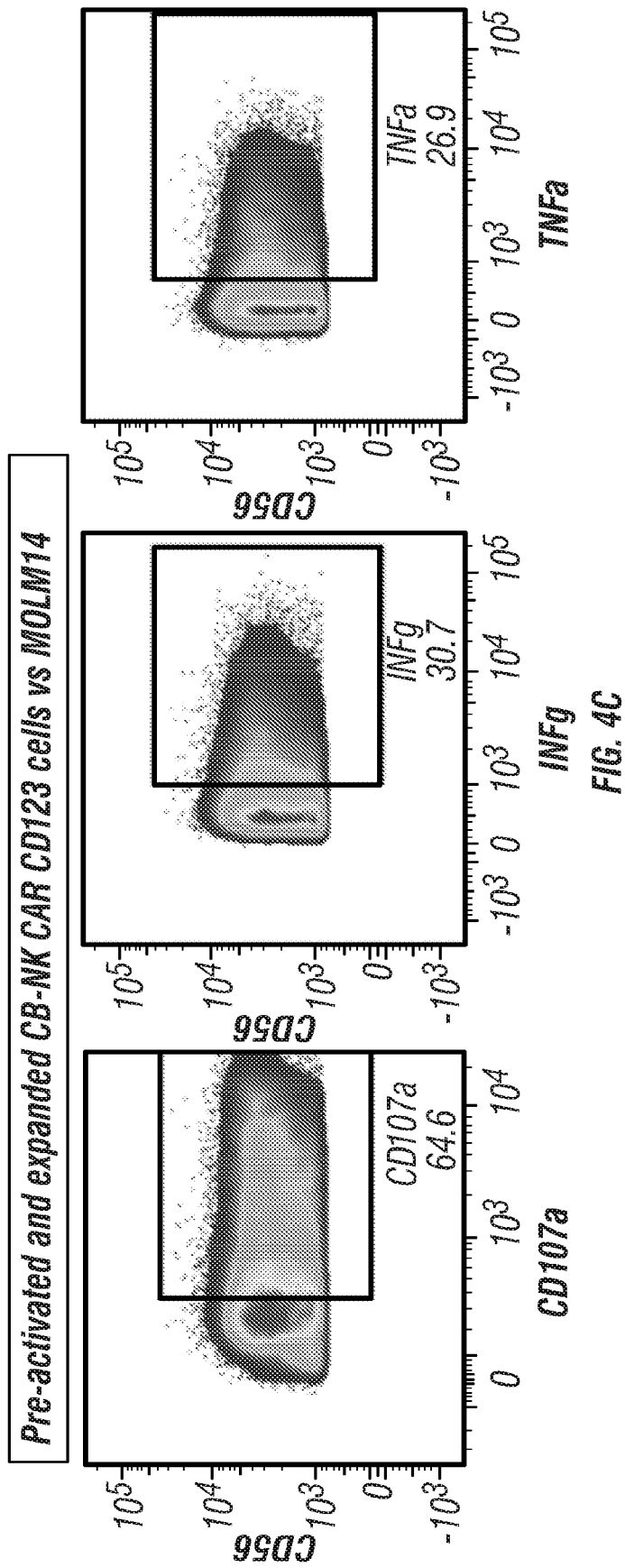
Figure 4C:
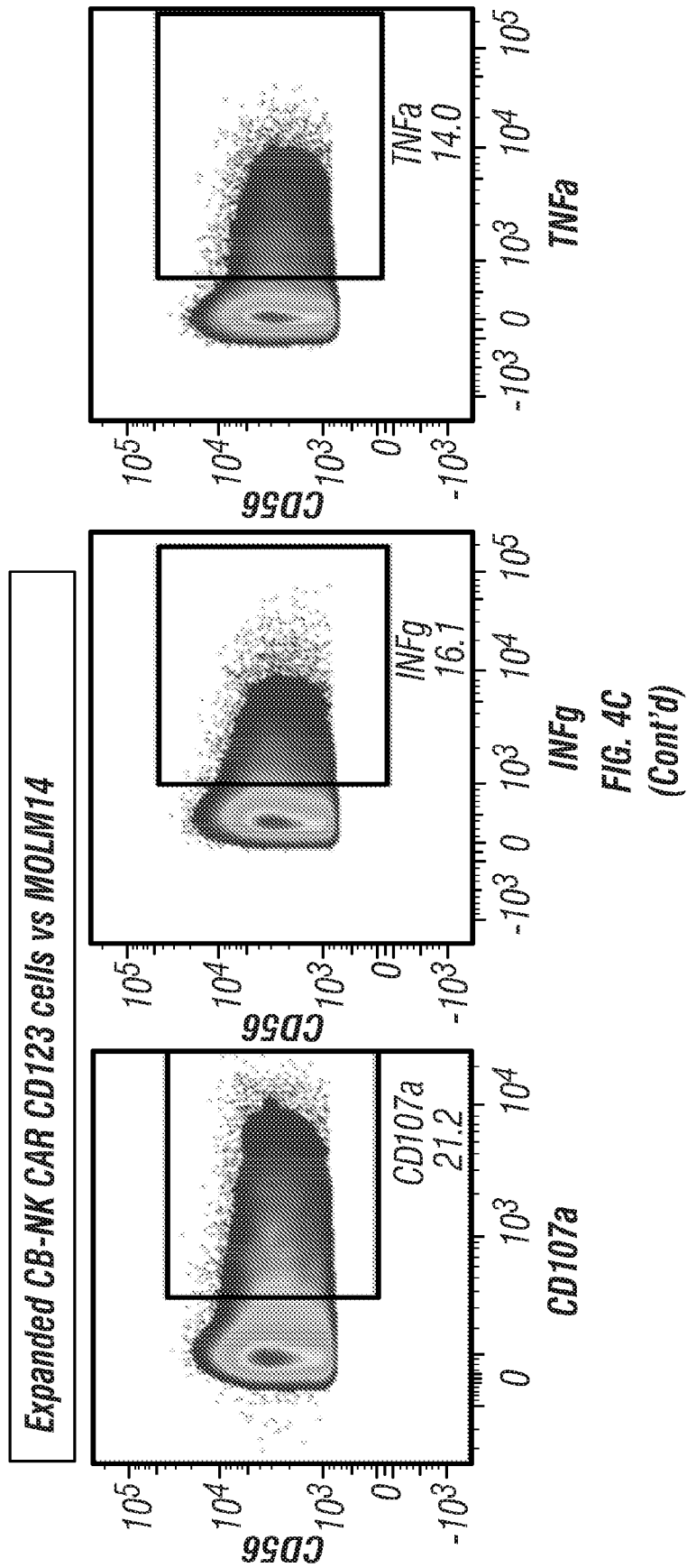

It was also demonstrated that pre-activation significantly enhances the killing capability of chimeric antigen receptor (CAR)-modified NK cells using different constructs. P+E NK CB-NK cells that were transduced with a retroviral vector to express iC9/CAR.19/IL-15 (FIG. 4A) or iC9/CAR.123/IL-15 (FIGS. 4B-C) displayed significantly greater cytotoxicity and cytokine production against CD19 or CD123 expressing tumors, compared to iC9/CAR.19/IL-15- or iC9/CAR.123/IL-15 transduced CB-NK cells, respectively, and that were not pre-activated prior to activation, indicating that the protocol for pre-activation+expansion can also be applied to generate highly potent CAR-NK cells.

Figure 5:
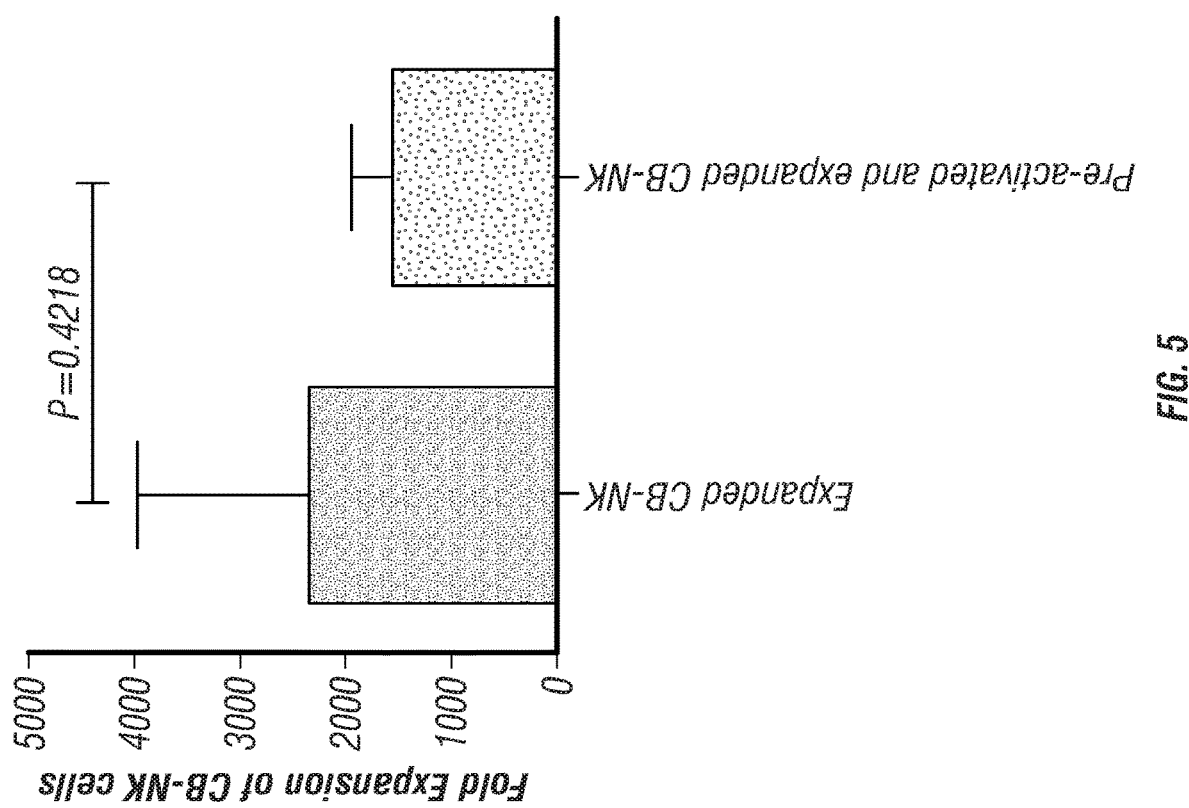
FIG. 5: Fold expansion of CB-NK cells after 14 days in culture. The pre-activation step did not negatively influence the ability of NK cells to undergo expansion. Indeed, after 14 days of culture, the median fold expansion for pre-activated+expanded NK CB-NK cells was 1520-fold (range 1080-1922) and equivalent to that of control expanded CB-NK cells.

The pre-activation step did not negatively influence the ability of NK cells to undergo expansion. Indeed, after 14 days of culture, the median fold expansion for P+E NK CB-NK cells was 1520-fold (range 1080-1922) and equivalent to that of control Exp CB-NK cells (FIG. 5).

Figure 6:
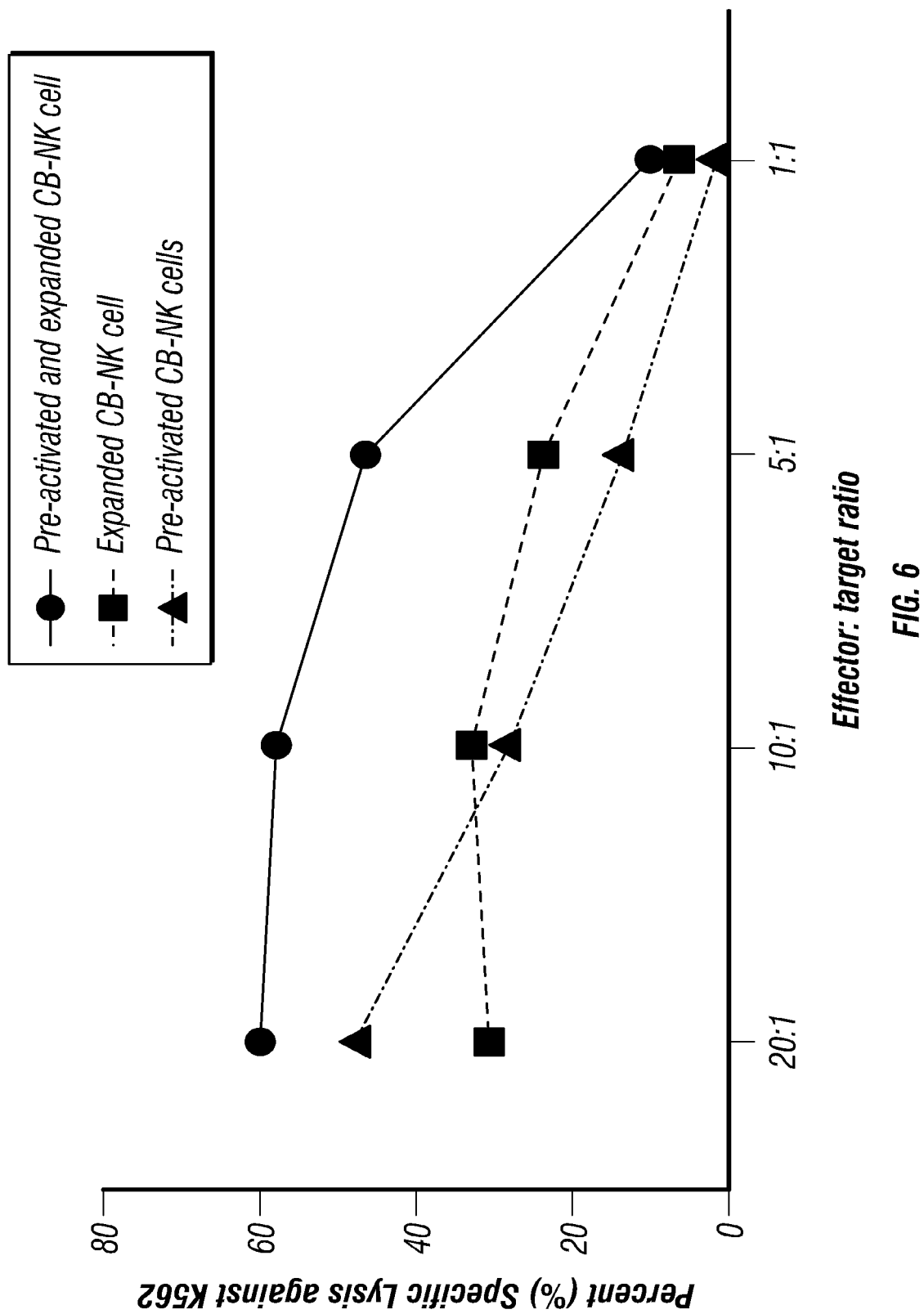
FIG. 6: Comparison of cytotoxicity by $^{51}$Cr release assay in response to K562 targets for CB-NK cells that were either pre-activated but not expanded, or expanded but not pre-activated, or both pre-activated and expanded. The two-step approach of pre-activation and expansion results in superior cytotoxicity in response to K562 targets.
Figure 7:
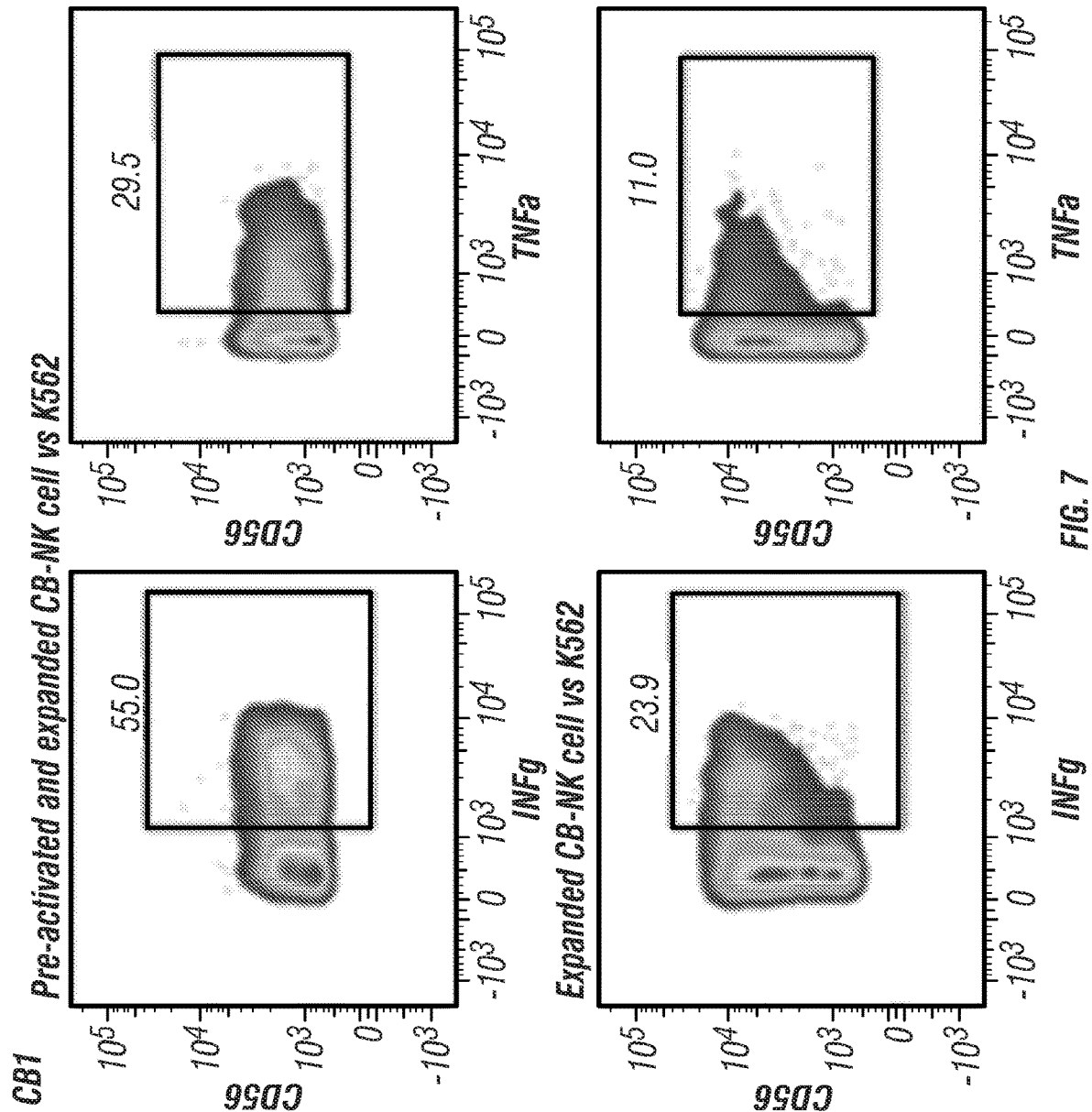
FIG. 7: Comparison of effector cytokine production (IFNγ and TNF-α expression) in response to K562 targets for CB-NK cells that were either pre-activated but not expanded, or expanded but not pre-activated, or both pre-activated and expanded. The two-step approach of pre-activation and expansion results in superior cytokine production in response to K562 targets.
Figure 7:
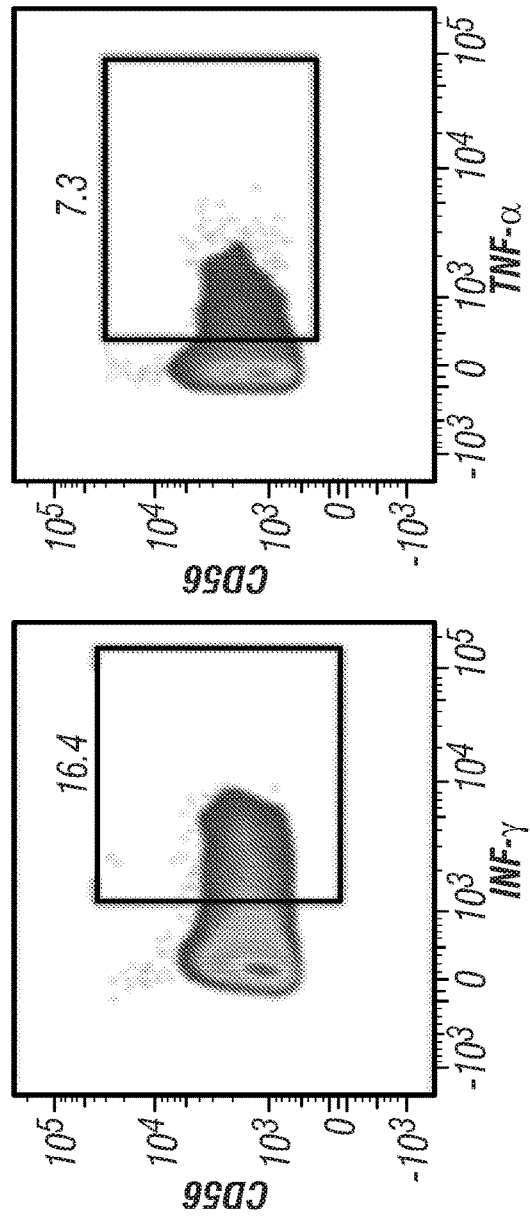
Figure 7:
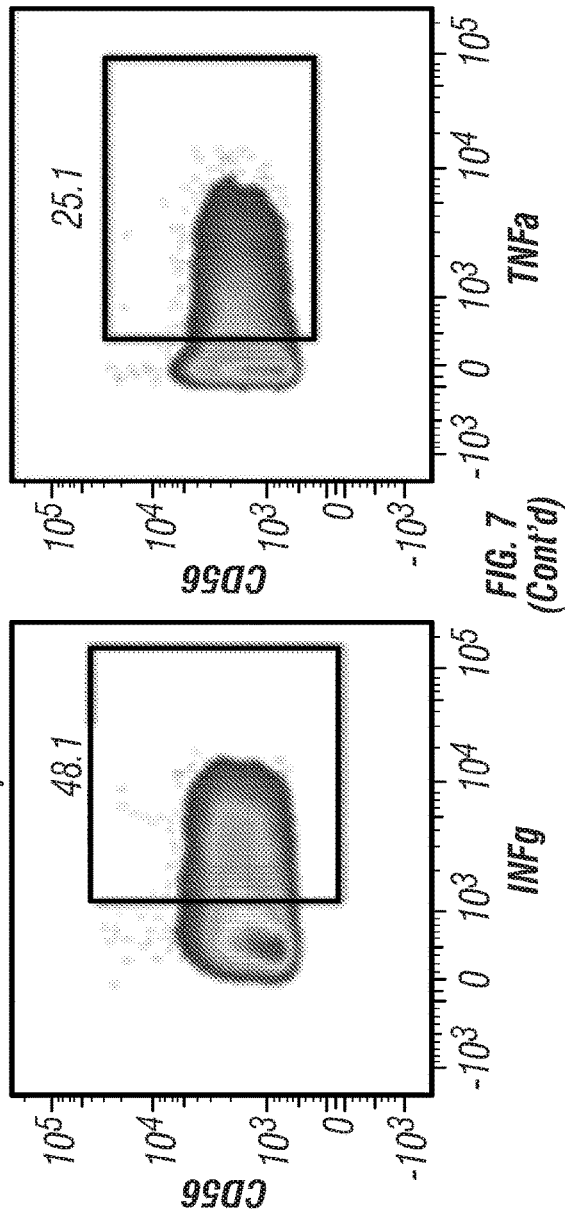
Figure 7:
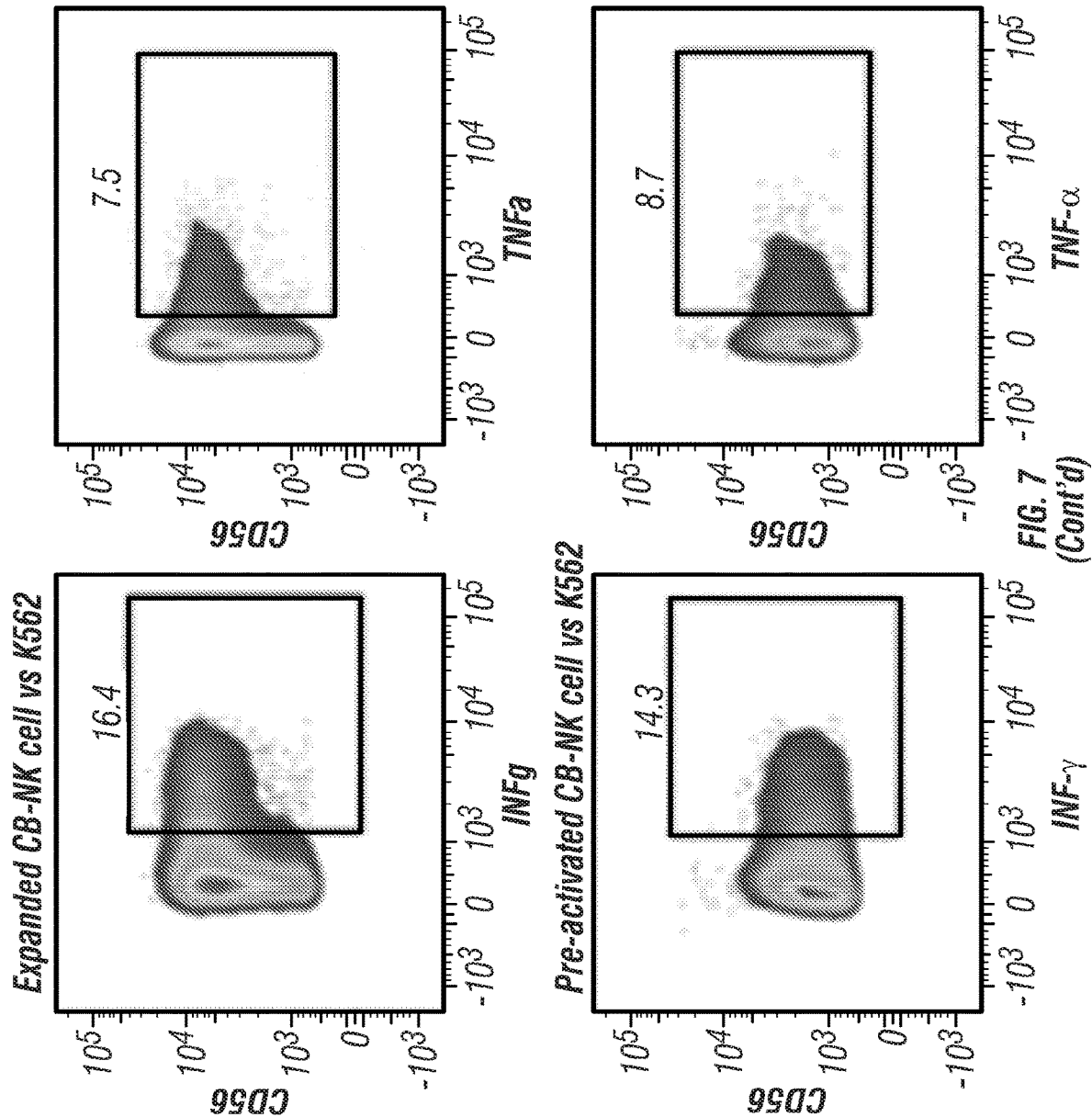

It was further observed that pre-activated and expanded CB-NK cells exerted better cytotoxicity against K562 targets compared to CB-NK cells that were only pre-activated or CB-NK cells that were only expanded (FIG. 6). In addition, the pre-activated and expanded CB-NK cells showed increased cytokine production against K562 cells (FIG. 7).

Figure 8:
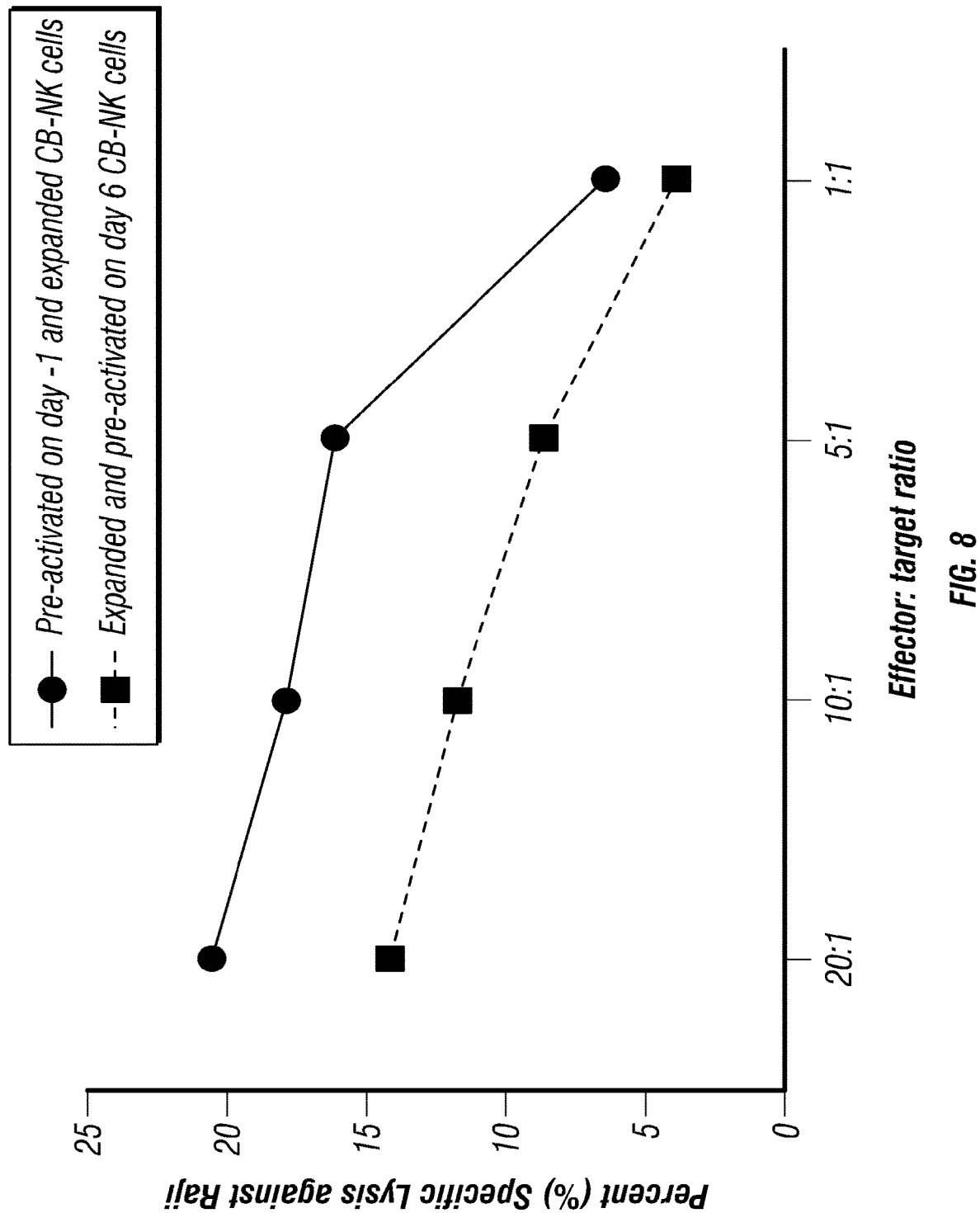
FIG. 8: Comparison of sequence of NK pre-activation followed by expansion vs NK expansion followed by pre-activation on NK cell cytotoxicity. The approach of pre-activation first followed by expansion resulted in superior cytotoxicity against tumor targets (as assessed by $^{51}$Cr release assay).
Figure 9:
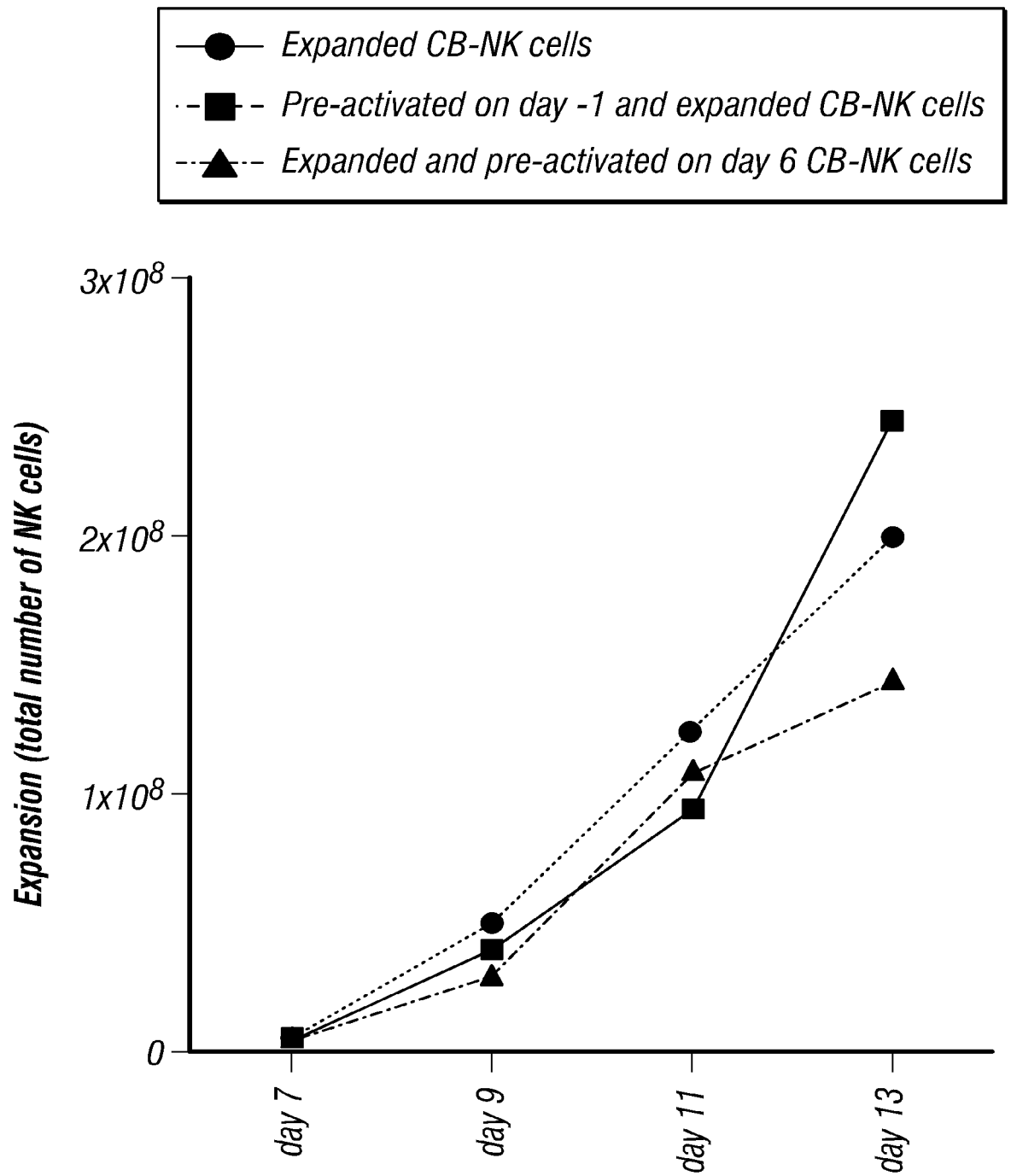
FIG. 9: Quantification of NK cells numbers following 13 days of expansion alone, pre-activation followed by expansion, or expansion followed by pre-activation. The approach of pre-activation first followed by expansion resulted in superior numeric expansion of NK cells.
Figure 9:
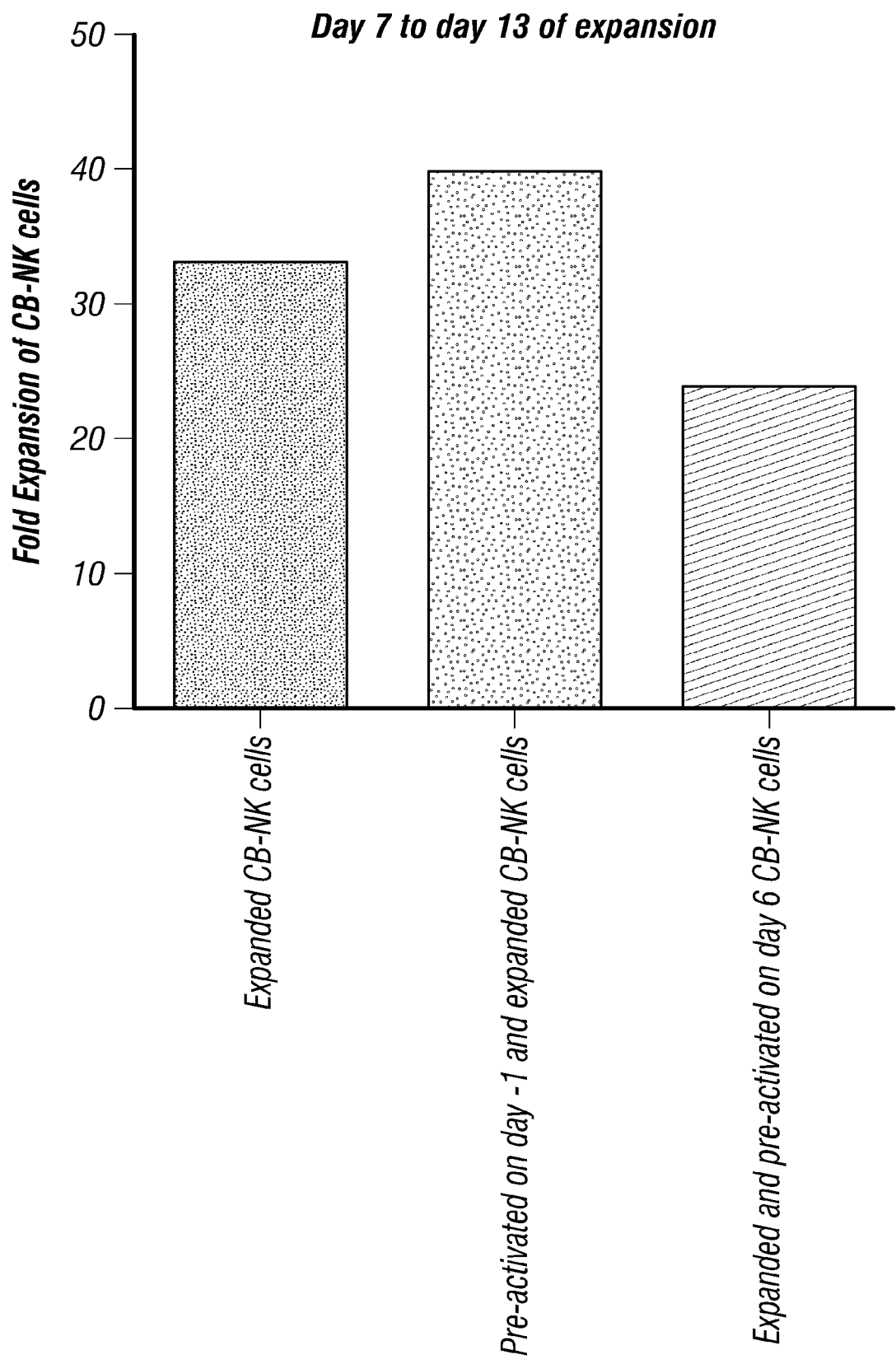

Studies were performed to determine if the order of expansion and activation effected the cytotoxic activity against targets. It was observed that pre-activation followed by expansion showed better cytotoxicity against Raji targets compared to expansion followed by pre-activation (FIG. 8). This was confirmed by analysis of the NK cell expansion. The pre-activation followed by expansion method resulted in better proliferation than the method of expansion followed by pre-activation (FIG. 9). Thus, the present methods of pre-activation followed by expansion provided increased numbers of NK cells with increased cytotoxic activity (FIG. 9).

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

International Publication No. WO2007/103009
Leong et al., *Biol Blood Marrow Transplant.* 20(4):463-73, 2014.
Singh et al., *Cancer Research,* 71:3516-3527, 2011.
U.S. Pat. No. 4,690,915
U.S. Pat. No. 6,225,042
U.S. Pat. No. 6,355,479
U.S. Pat. No. 6,362,001
U.S. Pat. No. 6,410,319
U.S. Pat. No. 6,790,662
U.S. Pat. No. 7,109,304
U.S. Patent Publication No. 2009/0004142
U.S. Patent Publication No. 2009/0017000

What is claimed is:

1. An in vitro method for expanding natural killer (NK) cells comprising:
    (a) pre-activating a population of cord blood (CB) NK cells in a pre-activation culture comprising an effective concentration of IL-12, IL-15, and IL-18 to obtain pre-activated NK cells; and then
    (b) expanding the pre-activated NK cells in an expansion culture comprising artificial antigen presenting cells (aAPCs) expressing CD137 ligand, thereby producing expanded NK cells,
    wherein the expanded NK cells display enhanced antibody-dependent cellular cytotoxicity (ADCC) when compared with a control.

2. The method of claim 1, wherein the CB is pooled from 2 or more individual cord blood units.

3. The method of claim 1, wherein the population of NK cells are further defined as $CD56^+$ NK cells.

4. The method of claim 1, wherein the aAPCs further express a membrane-bound cytokine.

5. The method of claim 4, wherein the membrane-bound cytokine is membrane-bound IL-21 (mIL-21) or membrane-bound IL-15 (mIL-15).

6. The method of claim 1, wherein the aAPCs have no expression of endogenous HLA class I, II, or CD1d molecules.

7. The method of claim 1, wherein the aAPCs express ICAM-1 (CD54) and LFA-3 (CD58).

8. The method of claim 1, wherein the aAPCs are further defined as leukemia cell-derived aAPCs.

9. The method of claim 8, wherein the leukemia-cell derived aAPCs are K562 cells engineered to express CD137 ligand, mIL-21, or both CD137 and mIL-21.

10. The method of claim 9, wherein the K562 cells are engineered to express CD137 ligand and mIL-21.

11. The method of claim 9, wherein the aAPCs have been engineered by retroviral transduction.

12. The method of claim 1, wherein the aAPCs are irradiated.

13. The method of claim 1, wherein the pre-activating step is for 10-20 hours.

14. The method of claim 1, wherein the pre-activated NK cells and aAPCs are present in the expansion culture at a ratio of 3:1 to 1:3.

15. The method of claim 1, wherein the expansion culture further comprises IL-2.

16. The method of claim 1, wherein the NK cells are engineered to express a chimeric antigen receptor (CAR).

* * * * *